US010078400B2

(12) United States Patent
Yanase et al.

(10) Patent No.: US 10,078,400 B2
(45) Date of Patent: Sep. 18, 2018

(54) TOUCH SENSOR PANEL AND METHOD CORRECTING PALM INPUT

(71) Applicant: NLT Technologies, Ltd., Kanagawa (JP)

(72) Inventors: Jiro Yanase, Kanagawa (JP); Hiroshi Haga, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 136 days.

(21) Appl. No.: 14/135,970

(22) Filed: Dec. 20, 2013

(65) Prior Publication Data

US 2014/0176498 A1  Jun. 26, 2014

(30) Foreign Application Priority Data

Dec. 21, 2012 (JP) ................... 2012-279817
Aug. 7, 2013 (JP) ................... 2013-164256
Nov. 21, 2013 (JP) ................... 2013-240766

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ...... G06F 3/044; G06F 3/0416; G06F 3/0418; G06F 3/03545; G06F 3/041; G06F 3/04883; G06F 3/0488; G06F 3/0481; G06F 3/0428; G06F 3/047; G06F 3/045; G06F 3/0421; G06F 3/03547; G06F 3/0412;

(Continued)

(56) References Cited

U.S. PATENT DOCUMENTS

2002/0039094 A1   4/2002  Yamada et al.
2004/0095336 A1*  5/2004  Hong ............... G06F 3/045
                                              345/173

(Continued)

FOREIGN PATENT DOCUMENTS

CN     102455833 A    5/2012
JP     01-19176 B2    4/1989

(Continued)

OTHER PUBLICATIONS

Communication dated May 4, 2017, from the State Intellectual Property Office of the P.R.C. in counterpart Chinese application No. 201310714147.2.

(Continued)

*Primary Examiner* — Mrunalini Yerneni Mummalaneni
(74) *Attorney, Agent, or Firm* — Sughrue Mion, PLLC

(57) ABSTRACT

The present invention calculates a first detected position influenced by the palm and an accurate second detected position from which the influence of the palm is eliminated immediately after a touch-on is judged, and calculates a correction value based on the first detected position and the second detected position. In a period from the point at which the touch-on is judged to the point at which a touch-off is judged, the first detected position influenced by the palm is calculated once successively, and the first detected position is corrected by the correction value to calculate a third detected position to improve the position accuracy at the time of the drag operation thereby.

15 Claims, 43 Drawing Sheets

(58) Field of Classification Search
CPC .......... G06F 3/042; G06F 3/038; G06F 3/046;
G06F 3/017; G06F 2203/04104; G06F
2203/04808; G06F 2203/04106; G06F
2203/04103; G06F 2203/04111; G06F
2203/04112; G06F 2203/04105; G06F
2203/04101; G06F 2203/04108; G06F
2203/04109; G06F 2203/04113; G06F
1/1643; G06F 1/3262; G06F 1/1616;
G02F 1/13338; G02F 1/1343; G09G
5/003
See application file for complete search history.

(56) References Cited

U.S. PATENT DOCUMENTS

2011/0279169 A1\* 11/2011 Salaverry .............. G06F 3/0416
327/517

2012/0092296 A1\* 4/2012 Yanase .................. G06F 3/0416
345/174
2012/0182238 A1\* 7/2012 Lee ....................... G06F 3/0418
345/173

FOREIGN PATENT DOCUMENTS

| JP | 2001-356879 A | 12/2001 |
|---|---|---|
| JP | 2008-543226 A | 11/2008 |
| JP | 2011-053928 A | 3/2011 |
| JP | 2012-104102 A | 5/2012 |
| JP | 2012-146026 A | 8/2012 |
| KR | 100823518 B1 | 4/2008 |

OTHER PUBLICATIONS

Communication dated Jul. 11, 2017 from the Japanese Patent Office in counterpart application No. 2013-240766.

\* cited by examiner

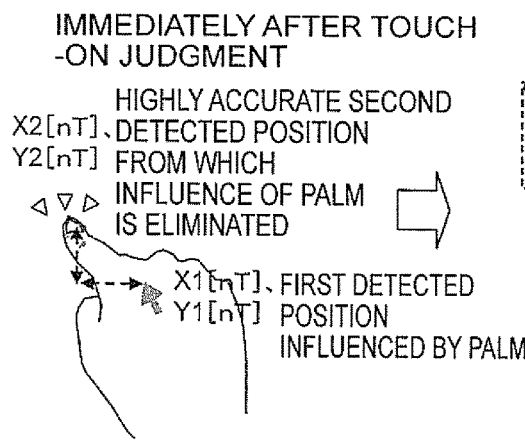
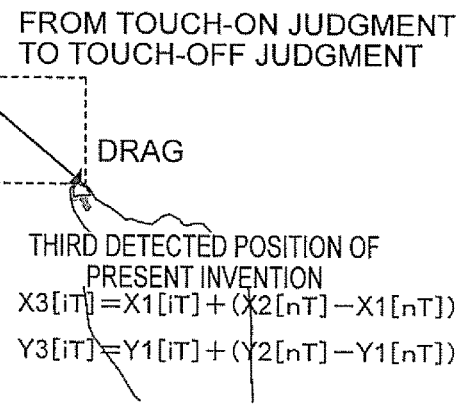
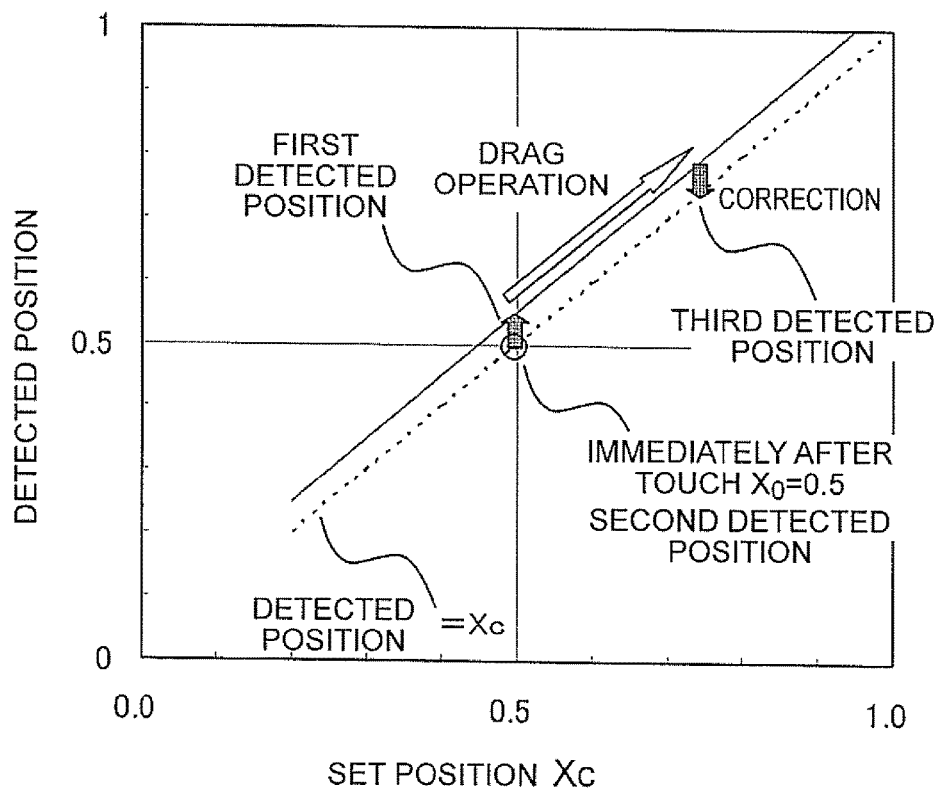

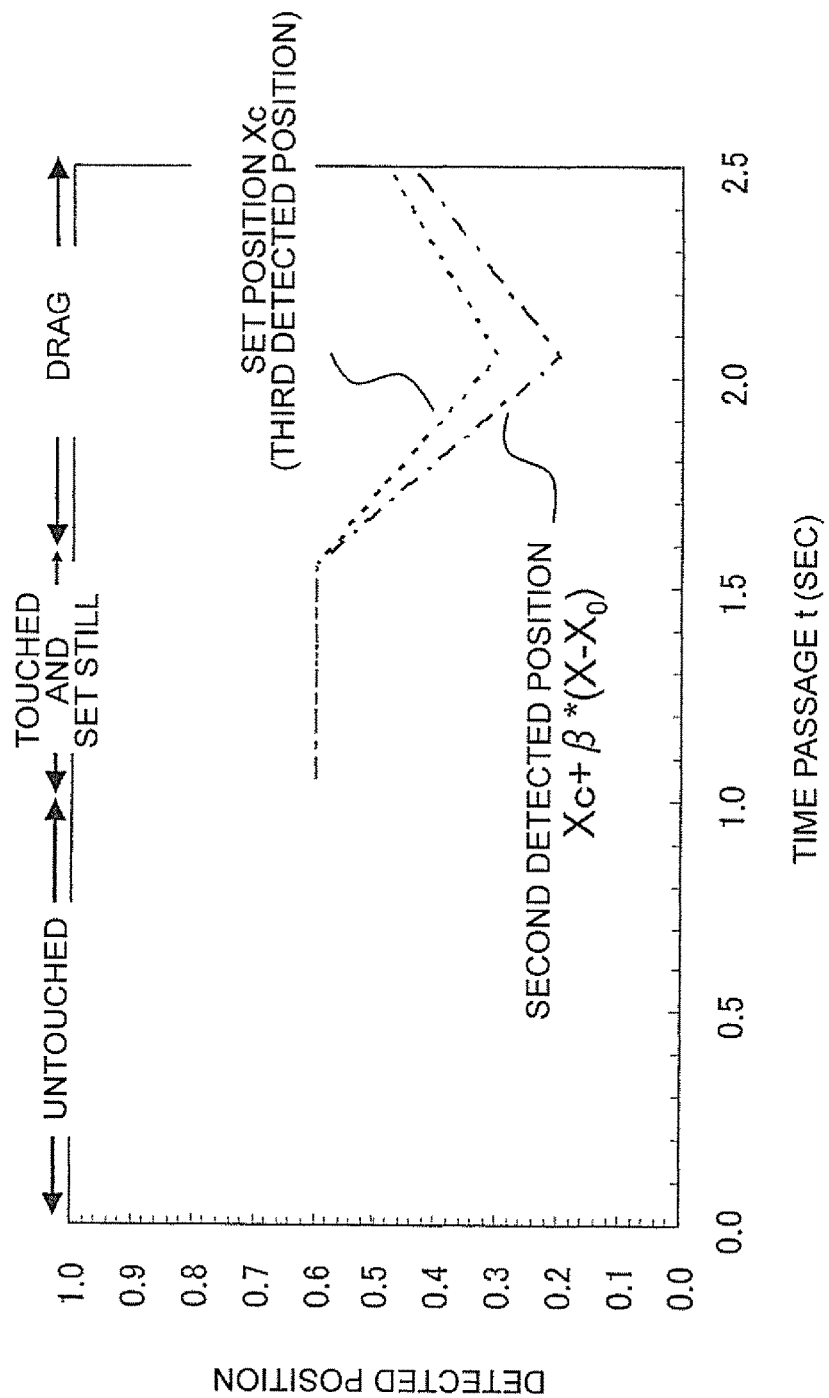

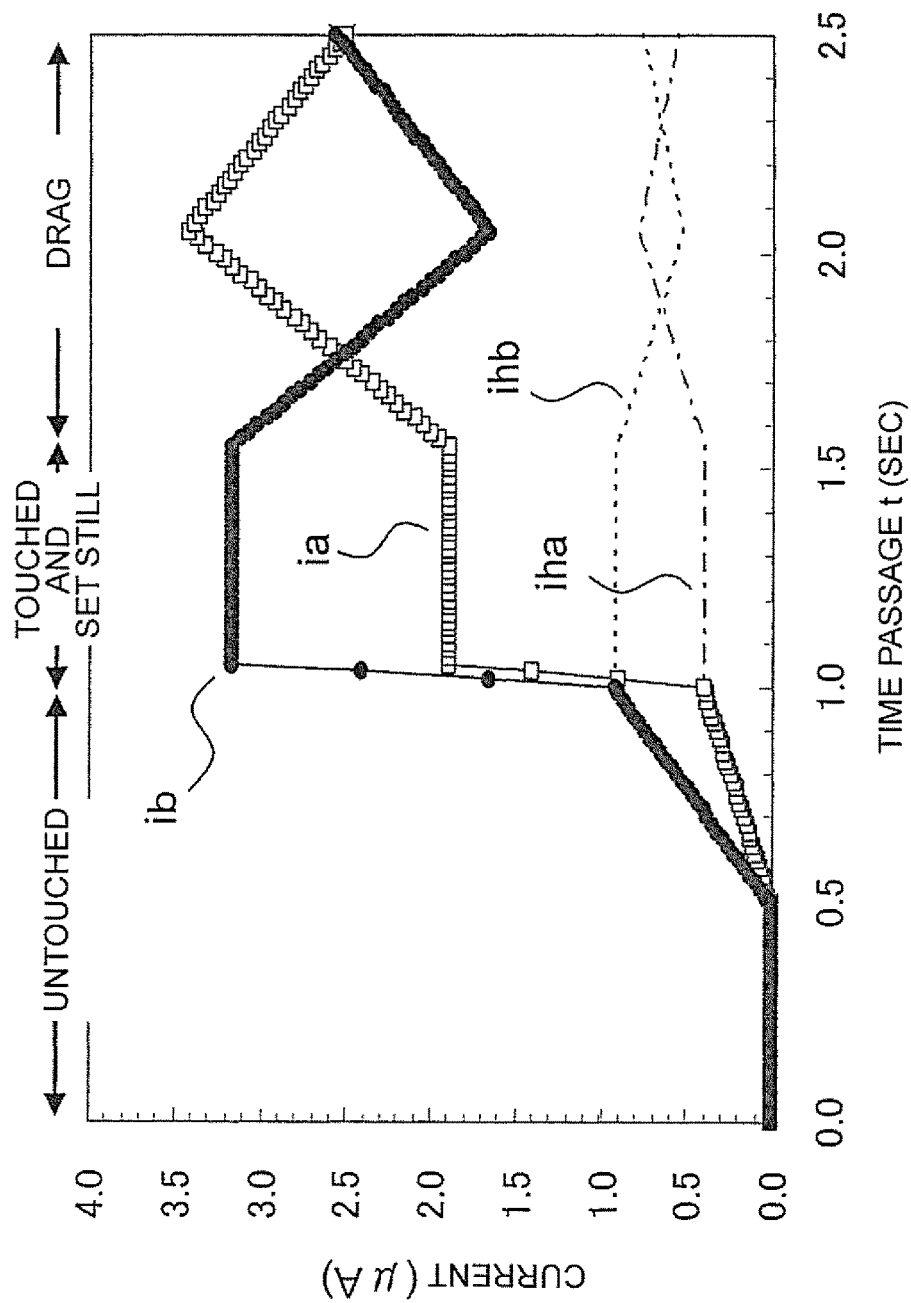

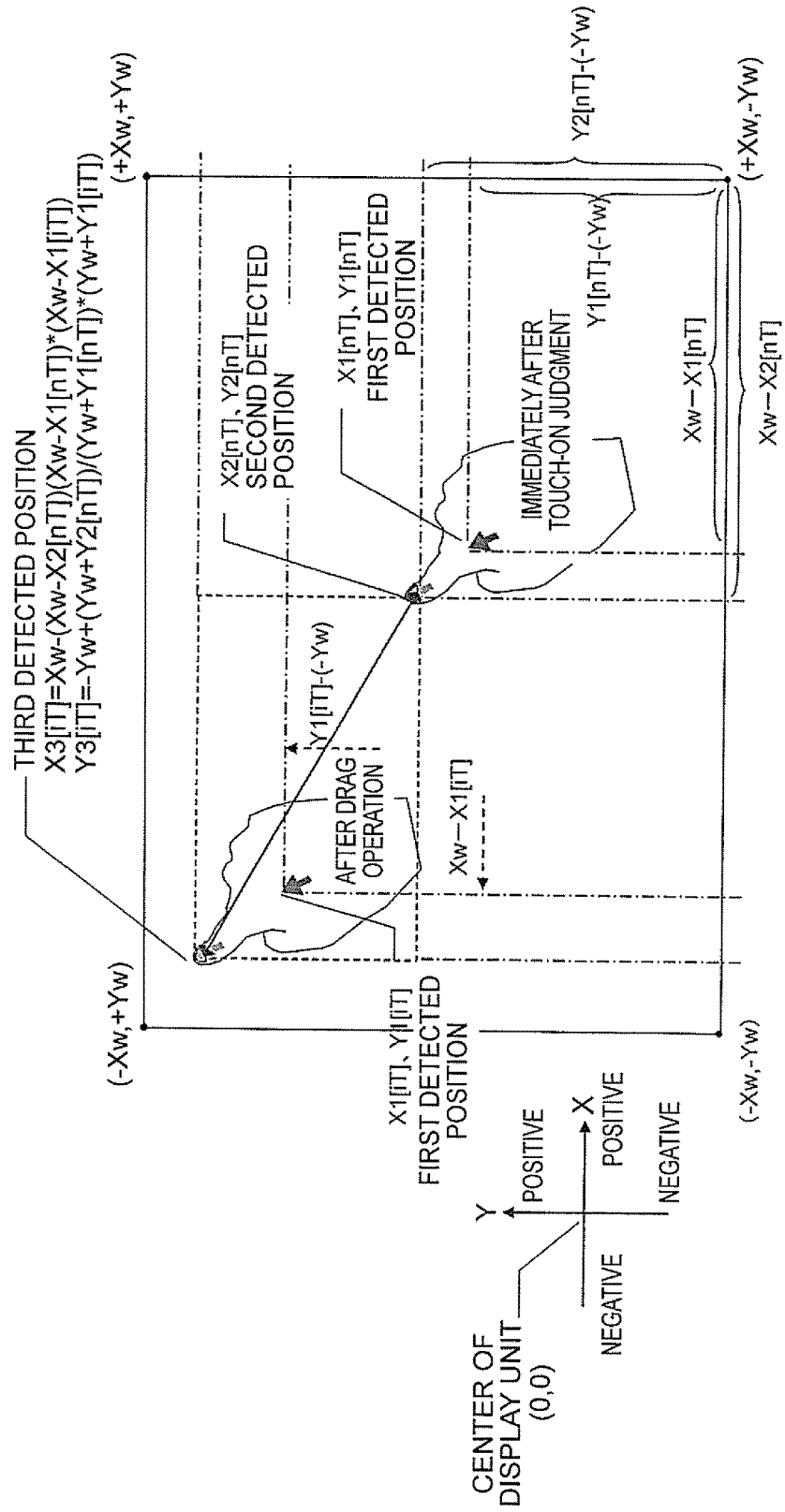

FIG. 33

|  | IMMEDIATELY AFTER TOUCH | AFTER DRAG OPERATION | AFTER LIFTING UP INDICATOR IMITATING PALM | \|(ACTUALLY MEASURED VALUE −ESTIMATED VALUE)/ SHIFT VALUE\| |
|---|---|---|---|---|
| SET POSITION $X_c$ | 0.6 | 0.3 | 0.3 | — |
| ESTIMATED VALUE | 0.6 | 0.3 | 0.274 | — |
| FIRST DETECTED POSITION | 0.626 | 0.326 | 0.3 | 1 |
| SECOND DETECTED POSITION | 0.6 | 0.197 | 0.171 | 3.96 |
| THIRD DETECTED POSITION | 0.6 | 0.3 | 0.274 | 0 |

FROM TOUCH-ON JUDGMENT TO TOUCH-OFF JUDGMENT

DRAG OPERATION $X3[iT] = X1[iT] + (X2[nT] - X1[nT])$
$Y3[iT] = Y1[iT] + (Y2[nT] - Y1[nT])$
THIRD DETECTED POSITION OF PRESENT INVENTION

IMMEDIATELY AFTER TOUCH-ON JUDGMENT $X1[nT], Y1[nT]$
FIRST DETECTED POSITION INFLUENCED BY PALM $X2[nT], Y2[nT]$
HIGHLY ACCURATE SECOND DETECTED POSITION FROM WHICH INFLUENCE OF PALM IS ELIMINATED

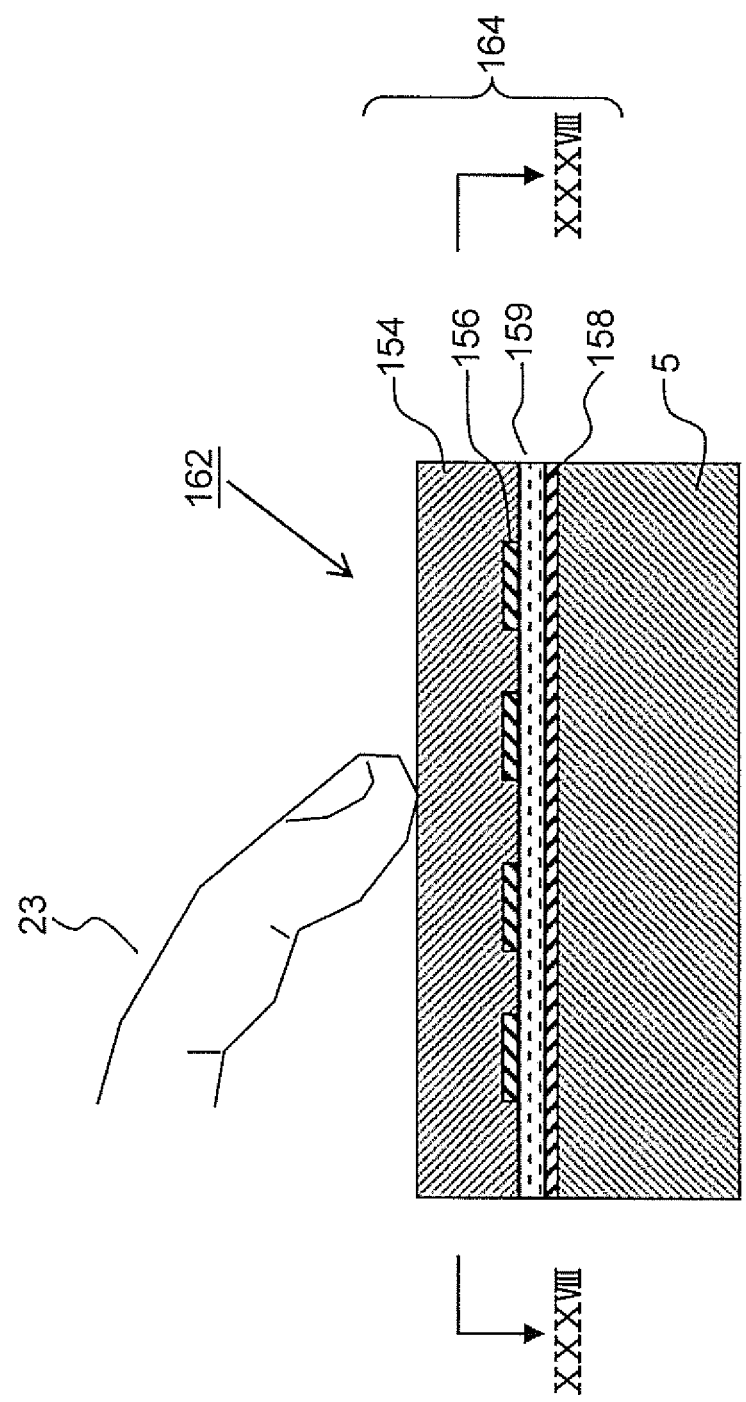

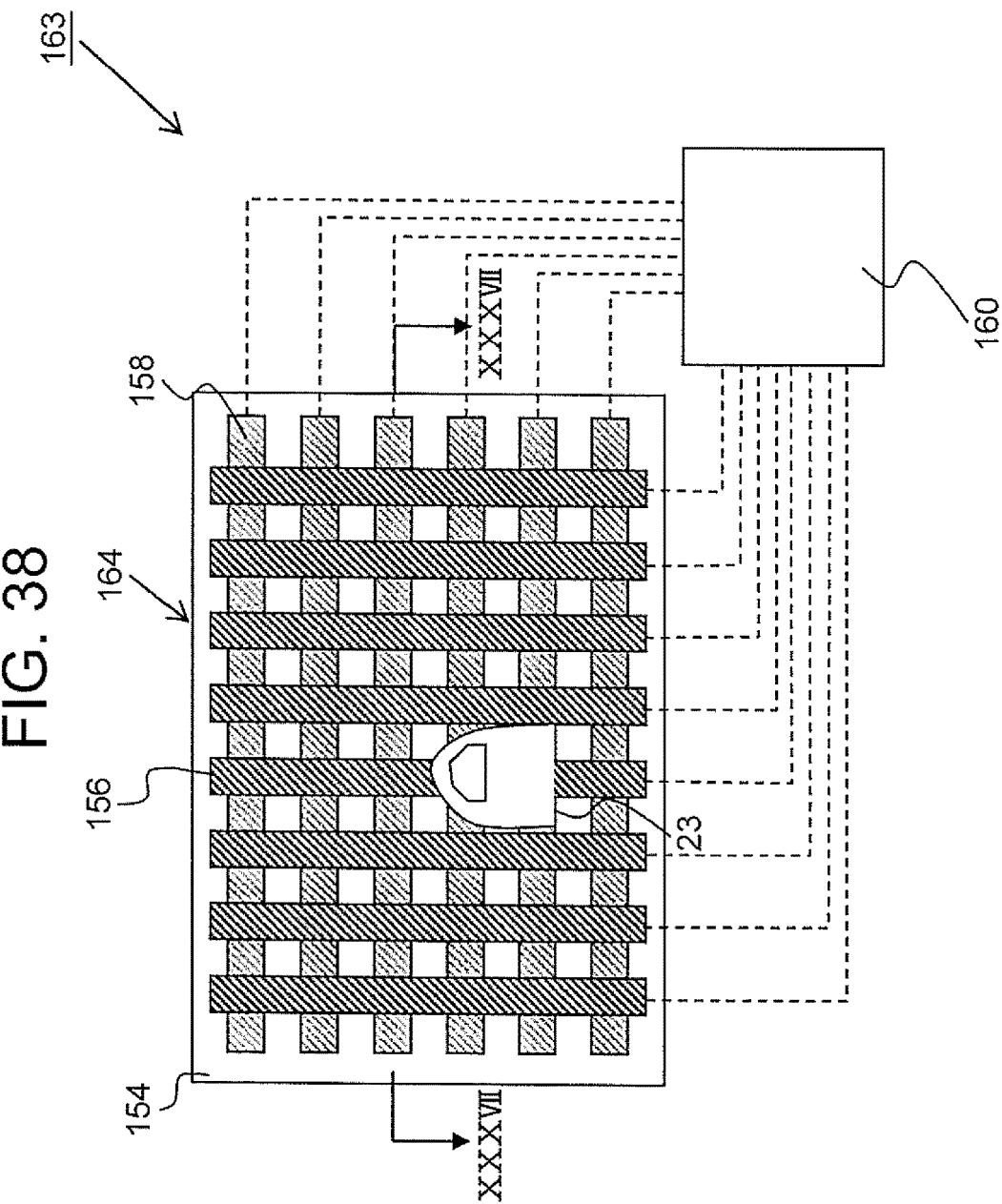

TOUCH SENSOR PANEL AND METHOD CORRECTING PALM INPUT

CROSS-REFERENCE TO RELATED APPLICATION

This application is based upon and claims the benefit of priority from Japanese patent application No. 2012-279817, filed on Dec. 21, 2012, No. 2013-164256, filed on Aug. 7, 2013 and No. 2013-240766, filed on Nov. 21, 2013, the disclosure of which is incorporated herein in its entirety by reference.

BACKGROUND OF THE INVENTION

1. Field of the Invention

The present invention relates to a capacitive type touch sensor device. Further, the present invention relates to an electronic apparatus which is provided with the touch sensor device.

2. Description of the Related Art

The touch sensor device is a device which detects position coordinates pointed by using an indicator such as a fingertip or a pen or detects existence of pointing actions. Normally, it is used in combination with a surface display device such as a liquid crystal display (referred to as "LCD (Liquid Crystal Display)" hereinafter), a plasma display (referred to as "PDP (Plasma Display Panel)" hereinafter), or an organic electroluminescence display (referred to as "organic EL display" hereinafter).

A user-friendly man-to-machine interface can be achieved by controlling the display content of the display device and controlling the apparatus with a computer through inputting the output of the touch sensor device to the computer. Currently, it is broadly used in everyday life such as for game machines, mobile information terminals, ticket-vending machines, ATMs (Automatic Teller Machines), car navigation systems, and the like. Further, in accordance with the improvement in the performance of the computers and spread of the network-connected environments, services supplied with electronic apparatuses are diversified. In accordance with that, the needs for the display device provided with the touch sensor device are continuously expanding.

As the types of the touch sensor device, there are a capacitive type, a resistance film type, an infrared ray type, an ultrasonic type, an electromagnetic induction type, and the like are known. Among the touch sensor devices, the capacitive type touch sensor device is capable of detecting a contact of an indicator through thin glass, plastics, and the like and capable of detecting the touch even when it is not pressed strongly. Thus, the capacitive type touch sensor device exhibits the excellent resistance for repeated inputs (contacts). Because of such characteristics, the capacitive type touch sensor device is broadly used in many application regions such as for industrial products and white household appliances.

The capacitive type touch sensor devices are classified into a projected capacitive type and a surface capacitive type.

The projected capacitive type is a type in which X-Y transparent electrodes are formed in a matrix form. The X transparent electrodes and the Y transparent electrodes are formed via glass and an insulating layer. When an indicator approaches the X-Y transparent electrodes, the capacitance between the electrodes is increased. A controller detects the change in the capacitance in the X-Y line, and detects the position of the indicator.

In the meantime, the surface capacitive type is constituted with an insulating transparent substrate, a uniform transparent conductive layer formed on the surface thereof, and a thin insulating layer (a protection layer) formed on the top surface thereof. When driving the touch sensor device, an alternating current voltage is applied to the four corners of the transparent conductive layer. When the surface of the touch sensor device is touched by an indicator via the capacitance formed by the transparent electrode layer and the indicator, a small current is flown into the indicator. The small current flows to the point at which the indicator touches from each of the four corners of the transparent conductive layer. Then, a signal processing circuit detects existence of a contact from the sum of those currents. Further, the coordinate of the touched position is calculated from the ratio of those currents. Note here that the current flown in each corner of the transparent conductive layer is converted to a signal proportional to the current by the signal processing circuit. The technique regarding such surface capacitive type is disclosed in Japanese Examined Patent Publication Hei 01-019176 (Patent Document 1), for example.

However, when the surface of the touch sensor device and a fingertip makes a contact, the entire hand or the arm (referred to as "palm" hereinafter) as a part of the human body other than the fingertip actually comes in close to the surface of the touch sensor device. Thus, a capacitance is also formed between the transparent conductive layer and the palm. When the capacitance is formed also between the transparent conductive layer and the palm as described above, a current generated according to the approach of the palm flows and is superimposed on the current detected by the signal processing circuit. Thus, the detected position is shifted from the position coordinate indicated by the fingertip when the detected position is acquired as it is. For example, techniques for improving the accuracy of the touched position on the touch screen are disclosed in Japanese Patent Application Publication 2008-543226 (Patent Document 2) and Japanese Unexamined Patent Publication 2012-104102 (Patent Document 3), for example. Patent Document 2 discloses a technique which corrects the position according to the chronic characteristic of the signal before and after a contact of a fingertip.

Patent Document 3 discloses a technique which estimates a signal generated according to the approach of a palm based on the tendency of the signal changes immediately before a fingertip touches the surface of the touch sensor device, and calculates the position by subtracting the estimated signal generated according to the approach of the palm from the acquired entire signals.

Japanese Unexamined Patent Publication 2012-146026 (Patent Document 4) discloses a projected type touch panel. Depicted therein is that the detected touch position is shifted due to the influence of a capacitance generated by the approach of a palm, specifically the untouch part that is the part from the second joint of a finger to the base part. In order to overcome such inconvenience, the tilt direction and tilt angle of the indicator are estimated from the extent of the generated capacitance of the sensor whose generated capacitance is the greatest and the extent of the generated capacitance of the peripheral sensors to correct the generated capacitance of the sensor. Note, however, that a plurality of sensors are required for employing the technique depicted in Patent Document 4 as in the case of the projected capacitive type. That is, it is necessary for the plurality of sensors formed by the transparent conductors to be separated from each other. Therefore, the technique depicted in Patent Document 4 cannot be employed for the surface capacitive type that has a single sensor.

The following analysis can be given based on the viewpoint of the present invention. With the detected position calculation method depicted in Patent Document 3, the position accuracy is improved for the operation called a tap which is an action of lightly hitting on the surface of the touch sensor device by a fingertip and an operation of pressing the screen with a fingertip and setting still for a while. However, when a finger is slid while making a contact with the screen by the fingertip, i.e., a drag operation, the shift of the detected position becomes greater as the touched position touched down by the finger leaves away from the finger position. Thus, the position accuracy regarding the drag operation is rather deteriorated compared to the case where the technique depicted in Patent Document 3 is not employed.

In a case where the technique of Patent Document 3 is employed, the reason why the position accuracy is poor with the drag operation is analyzed as follows. When a drag operation is conducted after a touch, the position coordinate of the fingertip changes on the touch screen. The four touch signals acquired by the signal processing circuit change in accordance with the change in the position coordinate of the fingertip. However, the position of the palm also changes, so that the position of the capacitance formed between the touch sensor (the transparent conductive layer) and the palm on the touch screen changes as well. Therefore, the signals generated in accordance with the approach of the palm superimposed on each of the four signals acquired by the signal processing circuit also change. That is, during the drag operation, both the signal generated according to the contact of the fingertip and the signal generated according to the approach of the palm change. Thus, the detailed breakdown of those is unknown. However, in Patent Document 3, the detected position is acquired by using the changing signal acquired by the signal processing circuit and the estimated fixed-value signal generated according to the approach of the palm. Therefore, the difference between the signal generated according to the approach of the palm estimated immediately before a "touch-on" judgment and the signal generated according to the approach of the palm after the drag operation is conducted and the position is changed deteriorates the position accuracy.

Therefore, the issue to be overcome by the present invention is that the position accuracy at the time of the drag operation is poor due to the influence of the approach of the palm.

SUMMARY OF THE INVENTION

The touch sensor device according to an exemplary aspect of the invention includes: a touch panel whose impedance changes according to existence of a touch of an indicator having an accompanying part and a touch position of the indicator; a detection circuit which outputs a detection signal based on the impedance of the touch panel for every specific time; a touch-on judging unit which judges a touch-on showing that the indicator touched the touch panel based on the detection signal outputted from the detection circuit; a touch-off judging unit which judges a touch-off showing that the indicator detached from the touch panel based on the detection signal outputted from the detection circuit; a first position calculating unit which calculates a first detected position that is the touch position influenced by the accompanying part based on the detection signal outputted from the detection circuit; a second position calculating unit which calculates a second detected position that is the touch position from which the influence of the accompanying part is eliminated based on the detection signal outputted from the detection circuit; a correction value calculating unit which calculates a correction value for acquiring the touch position from which the influence of the accompanying part is eliminated based on the first and second detected positions calculated by the first and second position calculating units; and a third position calculating unit which calculates a third detected position by correcting the first detected position by using the correction value calculated by the correction value calculating unit while calculating the first detected position based on the detection signal outputted from the detection circuit during a period from a point at which the touch-on is judged by the touch-on judging unit to a point at which the touch-off is judged by the touch-off judging unit.

The electronic apparatus according to another exemplary aspect of the invention includes the touch sensor device according to the present invention.

BRIEF DESCRIPTION OF THE DRAWINGS

FIGS. 13A to 13C are conceptual charts for describing the algorithm of FIG. 10 and FIG. 11 according to the first exemplary embodiment;

FIG. 14 is a graph showing the time passage of a position X when a drag operation is conducted after a touch according to the first exemplary embodiment;

FIG. 15 is a graph showing the time passage of a current when a drag operation is conducted after a touch according to the first exemplary embodiment;

FIG. 16 is a conceptual chart for describing a program for operating a touch sensor device according to a second exemplary embodiment;

FIG. 33 is a table of list of the results of detected positions acquired by using the inspection device in EXAMPLE 2;

FIGS. 36A and 36B show plan views regarding the outline of correcting a position coordinate by the projected capacitive type touch sensor device according to the fourth exemplary embodiment, in which FIG. 36A shows a state immediately after a touch-on judgment and FIG. 36B shows a state from the touch-on judgment to a touch-off judgment;

FIG. 37 is a sectional model view showing an LCD provided with a cover-glass projected capacitive type touch panel taken along a line XXXVII-XXXVII of FIG. 38 according to the fourth exemplary embodiment;

FIG. 38 is a plan model view showing a cover-glass unified projected capacitive type touch sensor device in an LCD that is provided with the cover-glass unified projected capacitive type touch sensor device which constitutes an electronic apparatus of the fourth exemplary embodiment;

DETAILED DESCRIPTION OF THE EMBODIMENTS

First Exemplary Embodiment

Figure 1:
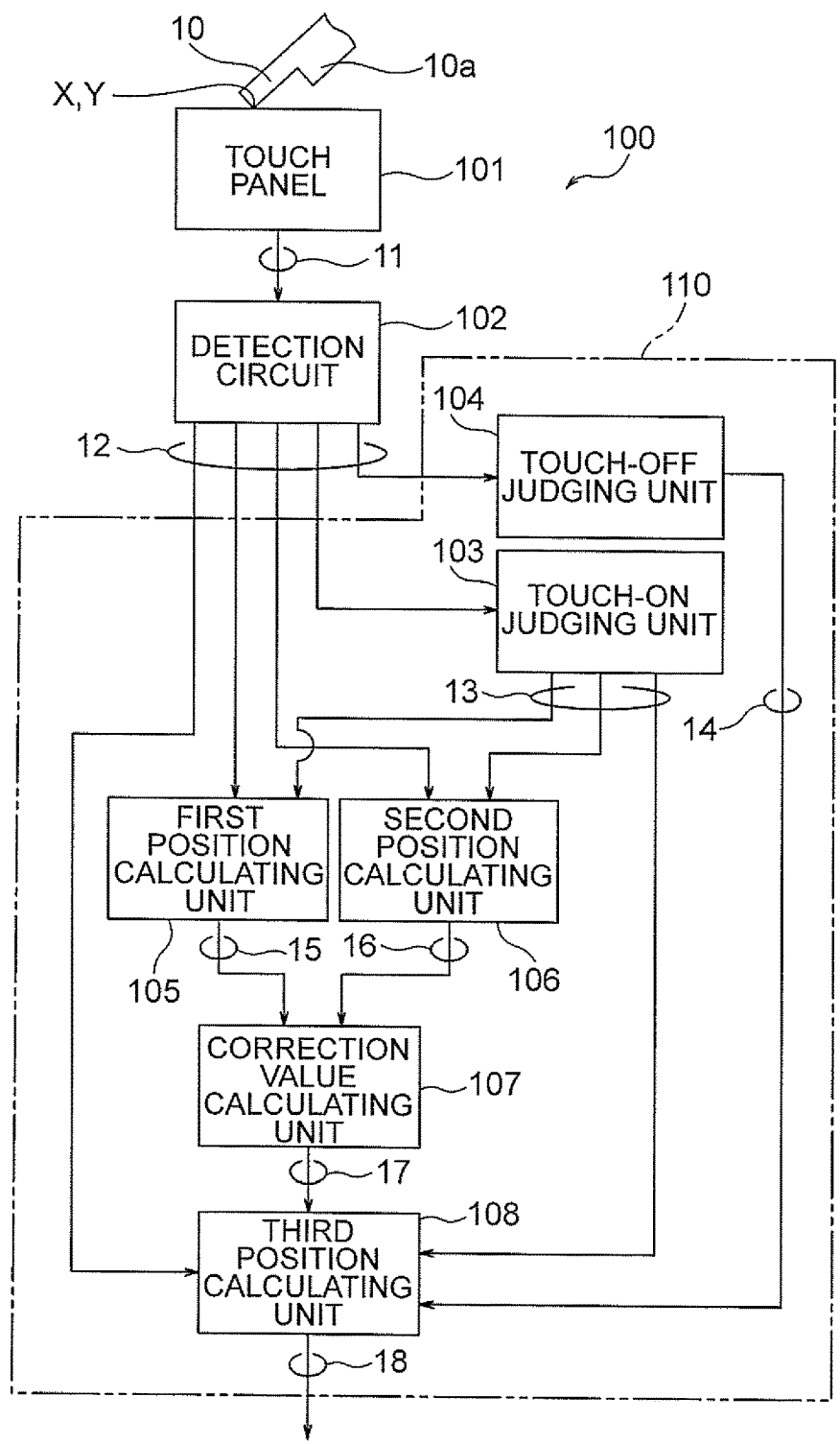
FIG. 1 is a functional block diagram showing a touch sensor device according to a first exemplary embodiment.

FIG. 1 is a functional block diagram showing a touch sensor device according to a first exemplary embodiment. Hereinafter, explanations will be provided by referring to the drawing. A touch sensor device 100 according to the first exemplary embodiment includes: a touch panel 101 in which an impedance 11 changes according to existence of a touch made by an indicator 10 having an accompanying part 10*a* and touched position X, Y of the indicator 10; a detection circuit 102 which outputs a detection signal 12 based on the impedance 11 of the touch panel 101 at a specific time interval; a touch-on judging unit 103 which judges a touch-on 13 indicating that the indicator 10 touched the touch panel 101 based on the detection signal 12 outputted from the detection circuit 102; a touch-off judging unit 104 which judges a touch-off 14 indicating that the indicator 10 leaves away from the touch panel 101 based on the detection signal 12 outputted from the detection circuit 102; a first position detecting unit 105 which calculates a first detected position 15 that is the touched position X, Y influenced by the accompanying part 10*a* based on the detection signal 12 outputted from the detection circuit 102; a second position detecting unit 106 which calculates a second detected position 16 that is the touched position X, Y from which the influence of the accompanying part 10*a* is eliminated based on the detection signal 12 outputted from the detection circuit 102; a correction value calculating unit 107 which calculates a correction value 17 for acquiring the touched position X, Y from which the influence of the accompanying part 10*a* is eliminated based on the first and second detected positions 15, 16 calculated by the first and second position calculating units 105, 106 immediately after the touch-on 13 is judged by the touch-on judging unit 103; and a third position calculating unit 108 which calculates a third detected position 18 through correcting the first detected position 15 by using the correction value 17 calculated by the correction value calculating unit 107 while calculating the first detected position 15 based on the detection signal 12 outputted from the detection circuit 102 during a period from the point where the touch-on 13 is judged by the touch-on judging unit 103 to the point where the touch-off 14 is judged by the touch-off judging unit 104. Note here that the impedance 11 shows the impedance from the point corresponding to the touched position coordinate to each electrode 38 on an impedance surface 39 shown in FIG. 5.

The first and third position calculating units 105 and 108 may be defined to: take the detection signal 12 under a state where the indicator 10 is sufficiently isolated from the touch panel 101 as a baseline; calculate a first signal acquired by subtracting the base line from the detection signal 12 after the touch-on 13 is judged by the touch-on judging unit 103; and calculate the first detected position 15 based on the first signal.

The second position calculating unit 106 may be defined to: calculate the signal generated in accordance with the approach of the accompanying part 10a based on a change in the detection signal 12 generated according to a gradual increase of the capacitance contained in the impedance 11 immediately before the touch-on 13 is judged by the touch-on judging unit 103; calculate a second signal by subtracting the signal generated according to the approach of the accompanying part 10a from the detection signal 12 immediately after the touch-on 13 is judged by the touch-on judging unit 103; and calculate the second detected position 16 based on the second signal.

The first detected position 15 and the second detected position 16 used when the correction value calculating unit 107 calculates the correction value 17 may be calculated based on the detection signals 12 outputted at the same timing from the detection circuit 102.

The first detected position 15 and the second detected position 16 used when the correction value calculating unit 107 calculates the correction value 17 may be calculated based on the detection signals, which are from the detection signals 12 outputted at the same timing to the sixth detection signals 12 outputted in the sixth order from the same timing.

The first detected position 15 used when the correction value calculating unit 107 calculates the correction value 17 may be calculated based on the detection signals from the detection signals 12 outputted at the same timing to the detection signals 12 outputted in the sixth order from the same timing, and calculate the first detected position 15 based on the average value.

The second detected position 16 used when the correction value calculating unit 107 calculates the correction value 17 may be calculated based on the detection signals from the detection signals 12 outputted at the same timing to the detection signals 12 outputted in the sixth order counted from the same timing, and calculate the second detected position 16 based on the average value.

The first and second position calculating units 105, 106 may be defined to calculate the first detected position $(X1[nT], Y1[nT])$ and the second detected position $(X2[nT], Y2[nT])$ based on the detection signals 12; the correction value calculating unit 107 may be defined to calculate a correction value $(X2[nT]-X1[nT], Y2[nT]-Y1[nT])$ based on the first detected position $(X1[nT], Y1[nT])$ and the second detected position $(X2[nT], Y2[nT])$; the third position calculating unit 108 may be defined to calculate the first detected position $(X1[iT], Y1[iT])$ based on the i-th detection signal 12 from the point where the touch-on 13 is judged by the touch-on judging unit 103, and calculate the third detected position $(X3[iT], Y3[iT])$ by using following expressions which correct the first detected position $(X1[iT], Y1[iT])$ by using the correction value $(X2[nT]-X1[nT], Y2[nT]-Y1[nT])$.

$$X3[iT]=X1[iT]+(X2[nT]-X1[nT])$$

$$Y3[iT]=Y1[iT]+(Y2[nT]-Y1[nT])$$

Figure 2:
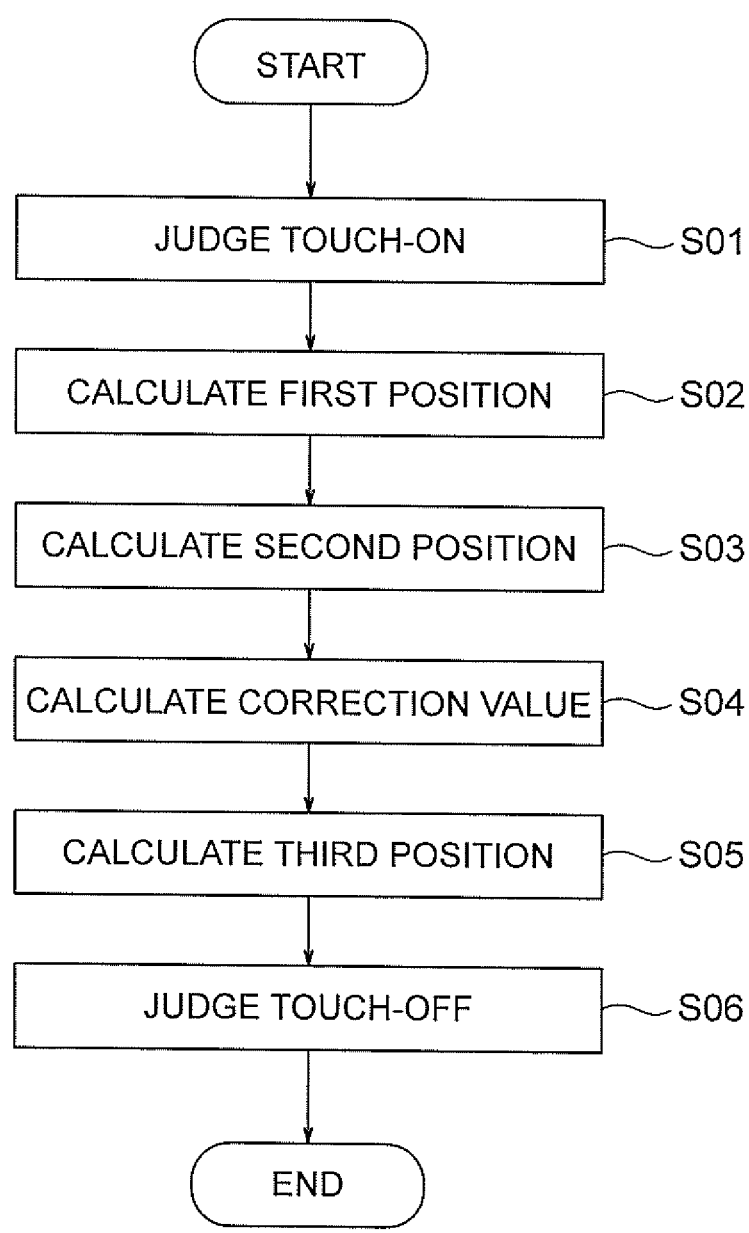
FIG. 2 is a flowchart showing a position calculation method and a position calculation program according to the first exemplary embodiment.

FIG. 2 is a flowchart showing the position calculation method and the position calculation program according to the first exemplary embodiment. Hereinafter, explanations will be provided by referring to FIG. 1 and FIG. 2.

The position calculation method according to the first exemplary embodiment is the actions of the touch sensor device 100 of the first exemplary embodiment considered as the invention of the method. That is, the position calculation method according to the first exemplary embodiment includes: a touch-on judging step S01 which judges the touch-on 13 indicating that the indicator 10 touched the touch panel 101 based on the detection signal 12 outputted from the detection circuit 102; a touch-off judging step S06 which judges a touch-off 14 indicating that the indicator 10 leaves away from the touch panel 101 based on the detection signal 12 outputted from the detection circuit 102; a first position detecting step S02 which calculates the first detected position 15 that is the touched position X, Y influenced by the accompanying part 10a based on the detection signal 12 outputted from the detection circuit 102; a second position detecting step S03 which calculates the second detected position 16 that is the touched position X, Y from which the influence of the accompanying part 10a is eliminated based on the detection signal 12 outputted from the detection circuit 102; a correction value calculating step S04 which calculates the correction value 17 for acquiring the touched position X, Y from which the influence of the accompanying part 10a is eliminated based on the first and second detected positions 15, 16 calculated in the first and second position calculating steps S02, S03 immediately after the touch-on 13 is judged in the touch-on judging step S01; and a third position calculating step S05 which calculates the third detected position 18 by correcting the first detected position 15 by using the correction value 17 calculated by the correction value calculating unit 107 while calculating the first detected position 15 based on the detection signal 12 outputted from the detection circuit 102 during a period from the point where the touch-on 13 is judged in the touch-on judging step S01 to the point where the touch-off 14 is judged in the touch-off judging step S06.

The position detection program according to the first exemplary embodiment is for causing a computer 110 to execute each of the steps of the position calculation method of the first exemplary embodiment. In other words, it is for causing the computer 110 to function as each unit of the touch sensor device 100 of the first exemplary embodiment. The program may be recorded on a non-transitory storage medium such as a semiconductor memory. In that case, the program is read by the computer from the recording medium and executed.

The position calculation method and the position calculation program of the first exemplary embodiment can employ substantially the same exemplary embodiments as the various embodiments of the touch sensor device 100 described above. Further, the position calculation methods and the position calculation programs of other embodiments and EXAMPLES to be described later can also employ substantially the same exemplary embodiments as the embodiments of the touch sensor device.

Hereinafter, the first exemplary embodiment will be described in details and in a specific manner.

(Structure)

The touch sensor device and the electronic apparatus of the first exemplary embodiment will be described.

Figure 3:
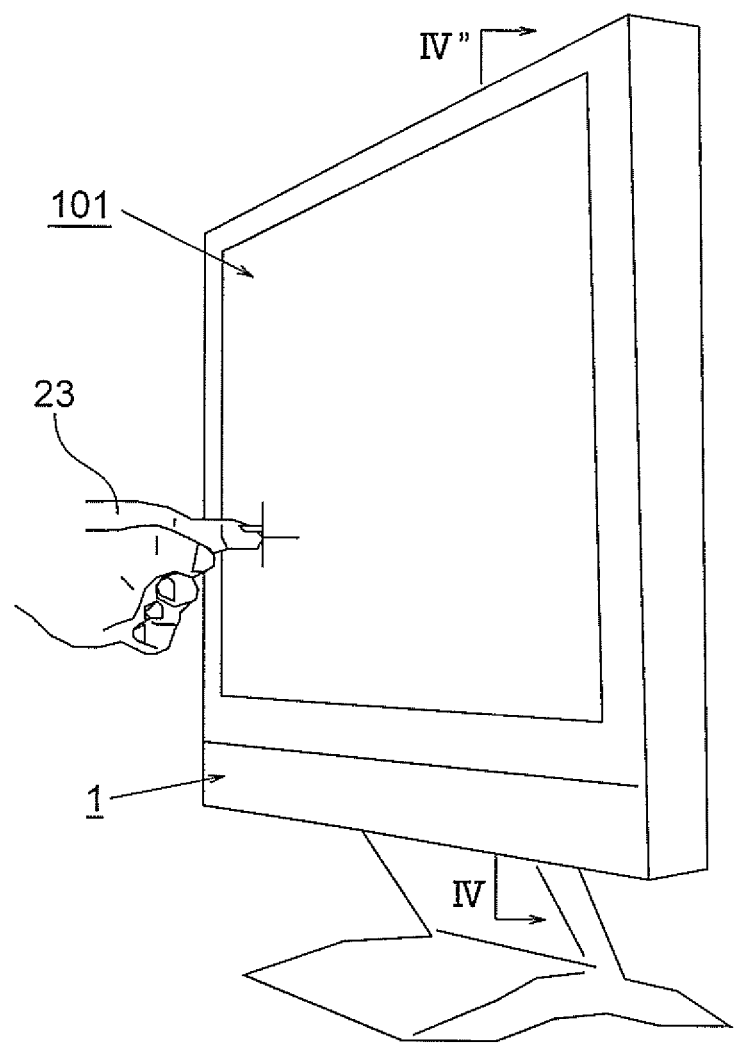
FIG. 3 is a schematic perspective view showing an electronic device according to the first exemplary embodiment.
Figure 4:
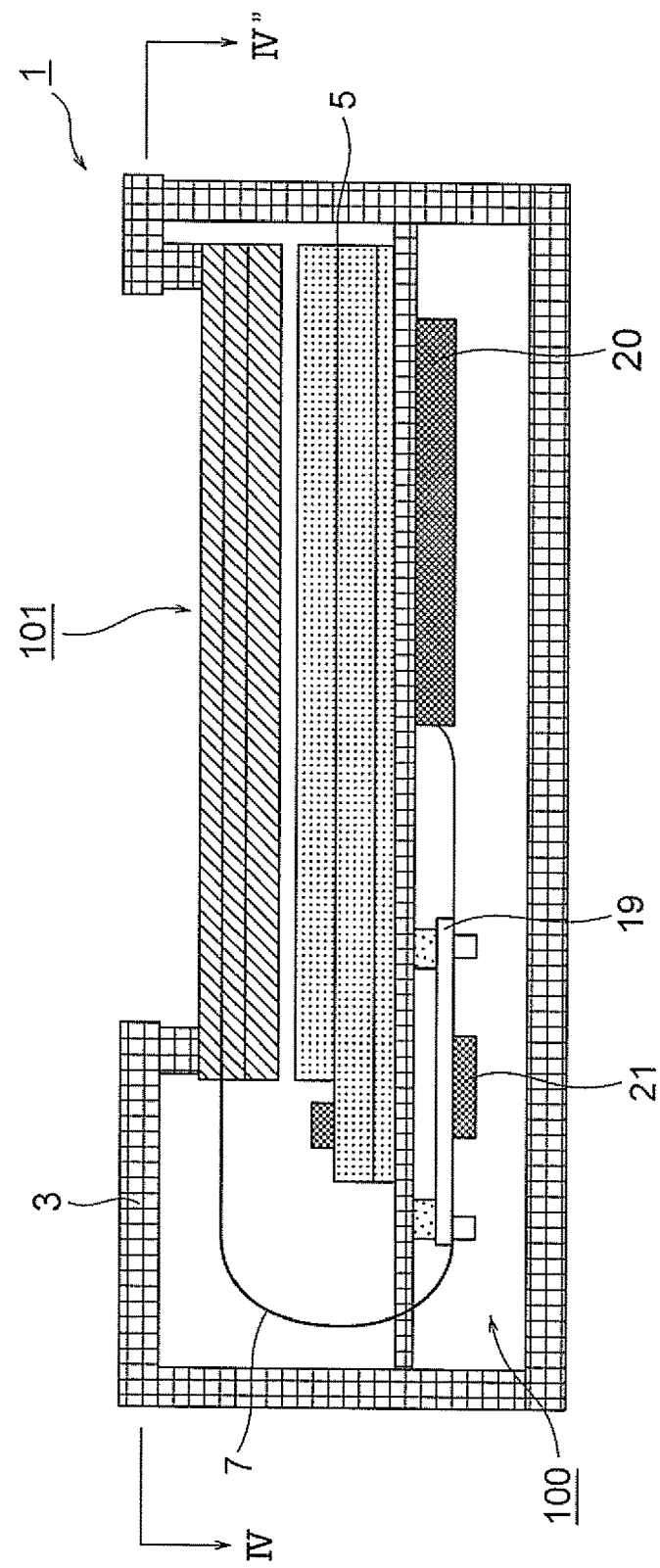
FIG. 4 is a schematic sectional view taken along a line IV-IV" of FIG. 3.
Figure 5:
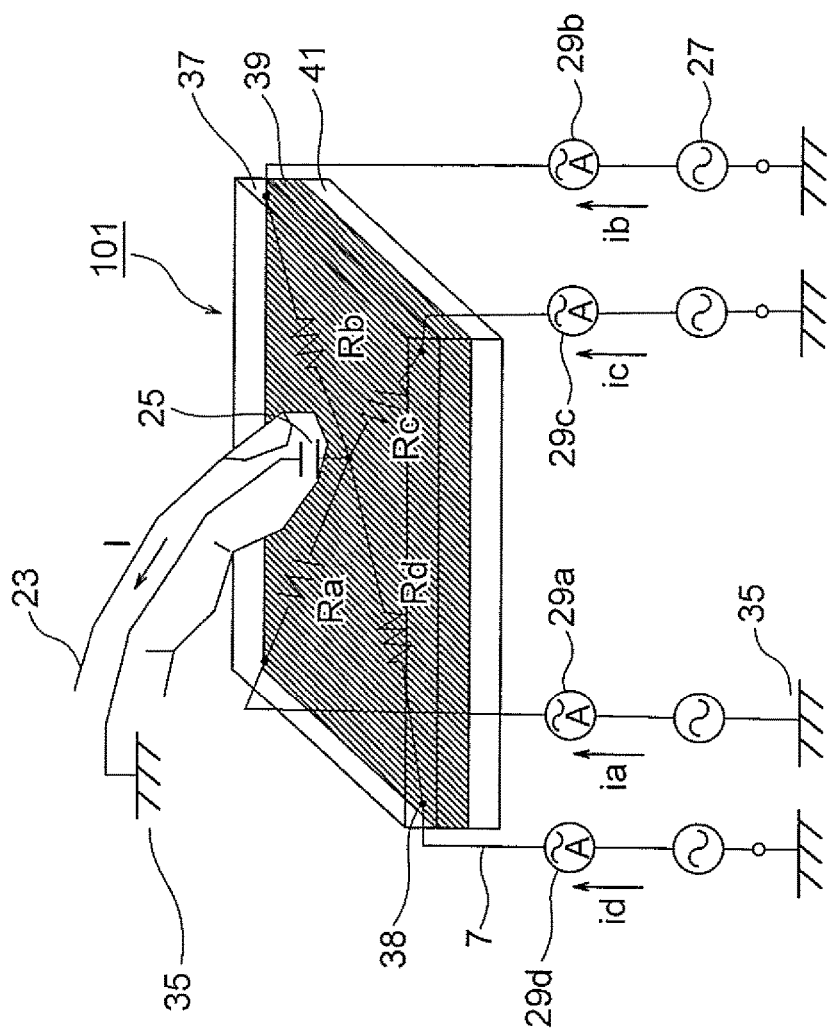
FIG. 5 is an equivalent circuit diagram of a touch sensor function of the electronic device according to the first exemplary embodiment.
Figure 6:
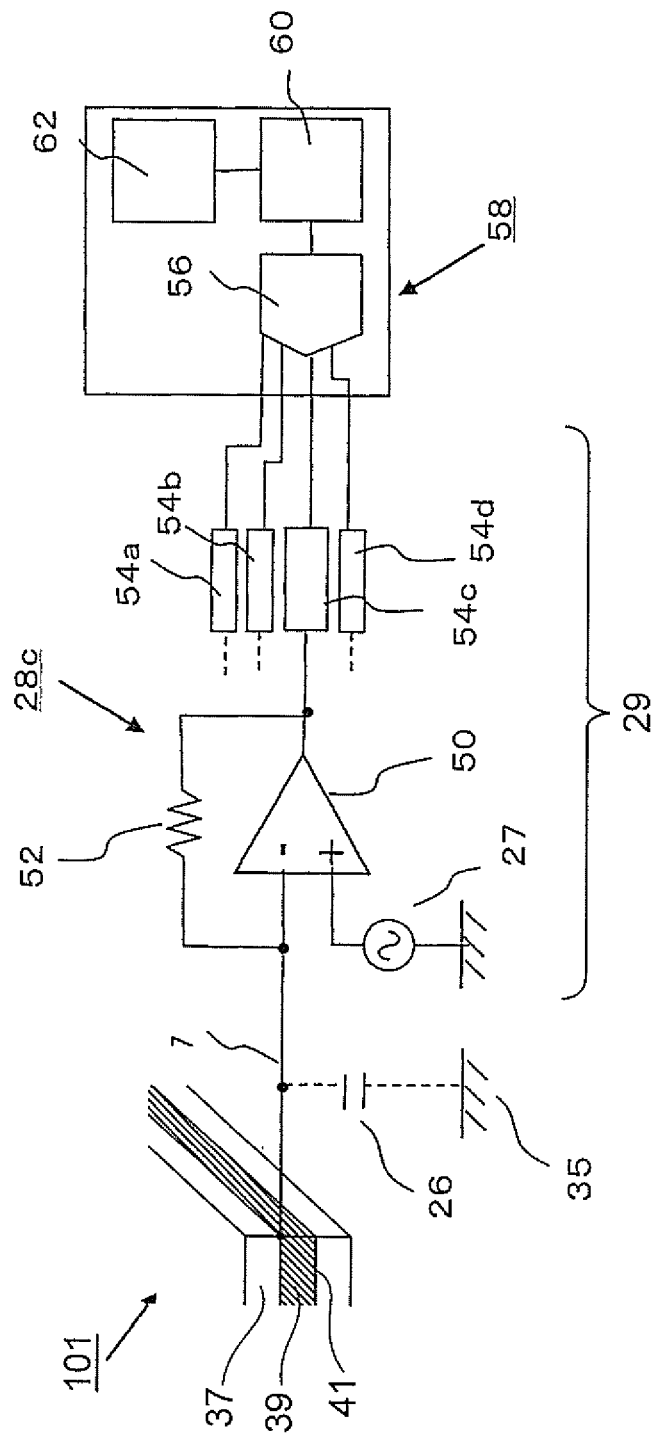
FIG. 6 is a schematic block diagram of a current detection circuit and its peripheral function according to the first exemplary embodiment.

Hereinafter, the electronic apparatus of the first exemplary embodiment will be described by referring to a monitor as a way of example hereinafter. FIG. 3 is a schematic perspective view showing the electronic device according to the first exemplary embodiment. FIG. 4 shows a schematic sectional view of the electronic apparatus according to the first exemplary embodiment taken along a line IV-IV" of FIG. 3. FIG. 5 shows an equivalent circuit diagram of a touch sensor function of the electronic device according to the first exemplary embodiment. FIG. 6 shows a schematic block diagram of a current detection circuit and its peripheral function according to the first exemplary embodiment.

In the schematic sectional view shown in FIG. 4, the electronic apparatus 1 according to the first exemplary embodiment includes the touch sensor device 100 of the first exemplary embodiment. The touch sensor device 100 is constituted with the touch panel 101, an FPC (Flexible Printed Circuit) 7, a power supply device 20, a main substrate 19, and a controller 21.

In the equivalent circuit diagram of the touch sensor function shown in FIG. 5, the touch panel 101 includes, on an insulating transparent substrate 41: the impedance surface 39 such as a transparent conductive layer; a plurality of electrodes 38 provided in the four corners of the impedance surface 39; and a protection layer 37 which covers the surface of the impedance surface 39. An alternate current voltage outputted by an oscillator 27 as an alternate current voltage source is applied to the impedance surface 39 via the plurality of electrodes 38. When an indicator 23 touches (approaches) the surface of the touch panel 101, a capacitance 25 is formed between the indicator 23 and the impedance surface 39. A current detection unit of the touch sensor device 100 includes a plurality of current detection circuits 29a to 29d which respectively detect the current flown in the plurality of electrodes 38. The total sum of the current flown in the plurality of electrodes 38 is proportional to the capacitance 25 formed between the indicator 23 and the impedance surface 39. Each output of the plurality of the current detection circuits 29a to 29d is converted to discontinuous numerical values (digital signals) by sampling and quantization. The signals proportional to the capacitance 25 (referred to as "signals" hereinafter) are calculated based on those numerical values. The signals are output at a specific frequency of 30 to 120 Hz. The impedance surface 39 in the first exemplary embodiment includes even a three dimensional structure, which is a transparent conductive layer that is not patterned in the regions corresponding to the display unit, for example. Hereinafter, the impedance surface 39 is referred to as a transparent conductive layer 39. The current detection circuits 29a to 29d are collectively referred to as the current detection circuits 29.

In the schematic sectional view of the electronic apparatus 1 shown in FIG. 4, the touch panel 101 is supported by bonding the top surface of the outer periphery of the touch panel 101 and the inside of a casing 3 of the electronic apparatus 1. Note here that the material used for the casing 3 may be defined as plastic. The plastic is constituted with a high molecular compound, and it is an insulator. Further, an LCD 5 is provided as a display device on the lower side of the touch panel 101. In FIG. 4, the touch panel 101 and the LCD 5 are isolated. However, the touch panel 101 and the LCD 5 may be laminated through performing laminate processing or the like by using an adhesive film placed therebetween. In that case, there is no air layer inserted between the touch panel 101 and the LCD 5, so that there is an advantage of being able to increase the transmittance of light to the touch panel 101 from the LCD 5. The LCD 5 is thinner and lighter than the other display devices such as CRT (Cathode Ray Tube) and PDP, so that it is suited for being loaded on the electronic apparatus 1. A liquid crystal panel used for the LCD 5 is formed in a structure which displays an image through inserting liquid crystals between two glass plates and increasing/decreasing the light transmittance by changing the directions of the liquid crystal molecules through applying a voltage. For illuminating the liquid crystal, a backlight is provided on the back surface of the liquid crystal panel. The two glass substrates are generally constituted with a TFT (Thin Film Transistor) substrate and a counter substrate. While it has been described by referring to the transmittance type LCD which displays an image by modulating the surface backlight from the back surface on the liquid crystal panel, a reflective type LCD which utilizes surrounding light by forming a metal electrode to be a reflection plate on the TFT substrate described above may be used as well. Further, a transflective type LCD which is used both as transmissive and reflective types may also be used by opening small holes in a halftone dot form on the reflection plate.

As the touch panel 101, it is possible to use a panel in which the transparent conductive layer 39 is formed on the insulating transparent substrate 41 by a sputtering method or the like. ITO (Indium Tin Oxide) may be used as the material for the transparent conductive layer 39, for example. The thickness of the transparent conductive layer 39 may be set as 10 nm to 300 nm, and the sheet resistance may be set as 100Ω to 1000Ω. In the four corners of the transparent conductive layer 39, terminal sections (electrodes 38) of the FPC 7 are connected, respectively, via a conductive adhesive material such as anisotropic conductive film (ACF). Alternatively, electrodes formed with a metal may be formed in the four corners of the transparent conductive layer 39. As the metal in this case, it is preferable to use a material whose contact resistance for ITO is low, e.g., silver or titanium. Further, it is also possible to form a wiring constituted with a metal, which may be drawn around the outer circumference of transparent conductive layer 39. In that case, the ITO under the wiring is pattered or an insulating layer is provided between the wiring and the ITO in order to insulate the wiring and the ITO.

Further, the protection layer 37 for covering the transparent conductive layer 39 is formed. For the protection layer 37, it is possible to use glass, plastic, resin, or the like. Note here that the thickness of the protection layer 37 is preferable to be 2.0 mm or less. Further, it is also possible to omit the protection layer 37 and expose the transparent conductive layer 39 on the surface. Furthermore, the capacitance 25 formed between the touching indicator 23 and the transparent conductive layer 39 is increased as the thickness of the protection layer 37 is formed thinner. Thus, the signal-to-noise ratio (S/N) of the touch sensor function can be increased. In the meantime, the resistance for repeated inputs done through the indicator 23 can be improved as the thickness of the protection layer 37 becomes thicker.

In the exemplary embodiment shown in FIG. 4, the FPC 7 is formed as a wiring for transmitting electric signals since the touch panel 101 and the main substrate 19 are isolated. Herein, it is preferable to use the FPC 7 since there is a section where it is necessary to bend the wiring and the substrate due to the spatial limitation. In general, the FPC 7 is a printed board that is flexible and capable of being deformed greatly. The FPC 7 is a structure in which an adhesive layer is formed on a film-type insulating transparent substrate of 12 to 50 μm in thickness, and a conductive foil is formed thereon further. The part of the FPC 7 other than the terminal sections and the soldered sections are protected by providing an insulator covered thereon.

The other terminal section of the FPC 7 extruded out from the transparent conductive layer 39 via the electrode 38 is connected to the input side of the controller 21 of the touch sensor device 100 via a connector on the main substrate 19. The main substrate 19 is connected to an LCD module constituted with the liquid crystal panel, the backlight, and the like via the connector (not shown). The power supply device 20 is connected to the main substrate 19 without using the connector. It is possible to connect the wirings of positive supply voltages of +3 V to +15 V, negative supply voltages of −15 V to −3 V, and the reference voltage of 0 V between the power supply device 20 and the substrate 19.

Further, the main substrate 19 is constituted with a surface mounted board. Mounted thereof are: an IC chip having a micro controller 58 and a flash memory of the exemplary embodiment shown in FIG. 6; an IC for the interface of the display; a power control IC; a controller 21 for the touch sensor device 100; a chip provided with the main function of the oscillator circuit IC; and the like. Alternatively, the main substrate 19 may be mounted on a thin-type printed wiring board having the controller 21 provided on the FPC 7.

In the exemplary embodiment shown in FIG. 5, the four current detection circuits 29a to 29d are electrically connected to the four corners of the transparent conductive layer 39, respectively, via the electrodes 38. Further, the output terminals of the oscillator circuit IC (oscillator 27) is electrically connected to the four corners of the transparent conductive layer 39 via the current detection circuits 29. Note here that the alternate current voltage is defined as a sine wave voltage. The amplitude thereof can be set to fall within the range of 0.5 V to 2 V, and the frequency thereof can be set to fall within the range of 20 kHz to 200 kHz.

In the exemplary embodiment shown in FIG. 6, the current detection circuit 29c includes a current-voltage converter circuit 28c as a pre-stage and an AC-DC converter circuit 54c as a post-stage. Further, the output terminals of the AC-DC converter circuit 54c are inputted to an analog-digital converter circuit that is built-in to the micro controller 58. Note here that the analog-digital converter circuit 56 is capable of inputting multi-channels, and four outputs of AC-DC converter circuits 54a to 54d are inputted.

Further, a CPU (Central Processing Unit) 60 is the main processing device of the micro controller 58, and it is connected to the analog-digital converter circuit 56, the flash memory 62, and the like. Programs including the position detection program of the first exemplary embodiment of the touch sensor device 100 are saved in the flash memory 62. For saving the programs, used is a nonvolatile memory such as the flash memory 62 capable of saving the data even when the power is turned off.

The oscillator 27 and the current detection circuits 29 (29a to 29d) are examples of the detection circuit 102 shown in FIG. 1. The micro controller 58 is an example of the computer 110 shown in FIG. 1. The indicator (finger) 23 is an example of the indicator 10 shown in FIG. 1, and "palm" is an example of the accompanying part 10a shown in FIG. 1.

Next, the actions of the electronic apparatus 1 including the touch sensor device 100 will be described in details by mainly referring to the exemplary embodiment shown in FIG. 5.

A sine wave voltage is applied to the transparent conductive layer 39 from the oscillator 27 to keep the transparent conductive layer 39 in a uniform voltage. When the indicator 23 touches the surface of the protection layer 37, the capacitance 25 of 5 pF to 50 pF is formed between the indicator 23 and the transparent conductive layer 39 via the protection layer 37. Further, in a case where the indicator 23 is the fingertip, the capacitance 25 formed by the contact of the indicator 23 is connected to the potential of the human body since the human body contains a great amount of water and is conductive. Furthermore, the human body exhibits the grounding effect, so that one end of the capacitance 25 is grounded. Note here that the impedance of the human body is several kΩ in a case where the frequency of the sine wave voltage outputted from the oscillator 27 is 100 kHz. In the meantime, in a case where the capacitance 25 is 5 pF to 50 pF, the impedance of the capacitance 25 is 30 kΩ to 300 kΩ. Therefore, the influence of the impedance of the human body is ignored since the impedance of the capacitance 25 is higher than the impedance of the human body by about one digit to two digits.

The current generated in accordance with a touch is branched as currents ia to id, respectively, to the current detection circuits 29a to 29d via the transparent conductive layer 39. The currents ia to id are the currents detected by the current detection circuits 29a to 29d of the exemplary embodiments shown in FIG. 5. That is, the current ia is the current detected by the current detection circuit 29a, the current ib is detected by the current detection circuit 29b, the current ic is the current detected by the current detection circuit 29c, and the current id is the current detected by the current detection circuit 29d, respectively. The ratio of the currents ia to id changes according to the resistances Ra to Rd of the transparent conductive layer 39, and the resistances Ra to Rd change according to the position on the touch panel 101 touched by the indicator 23. Examples of arithmetic operations regarding the touched position are following Expressions A1 and A2.

$$X = k1 + k2 \cdot (ib+ic)/(ia+ib+ic+id) \quad \text{(Expression A1)}$$

$$Y = k3 + k4 \cdot (ia+ib)/(ia+ib+ic+id) \quad \text{(Expression A2)}$$

Note here that X is the X coordinate of the touched position, Y is the Y coordinate, and k1 to k4 are constants. The constants k1 to k4 can be acquired by a calibration shown in the followings. A measurement point (X, Y) on the touch panel 101 is touched, and the currents ia to id generated at that time are measured. A relational expression of the constants k1 to k4 can be acquired by substituting X, Y and ia to id to Expressions A1 and A2. When two points are measured as the measurement points, the constants k1 to k4 can be acquired. Further, in a case of more than two measurement points, the constants k1 to k4 are acquired by using the least squares method. As the number of the measurement points increases, the influence of the measurement error is decreased so that the accuracy for calculating the constants k1 to k4 can be improved. Note here that the currents is to id are proportional to detection signals ha[iT] to hd[iT] to be described later acquired by the microcontroller 58.

Figure 7:
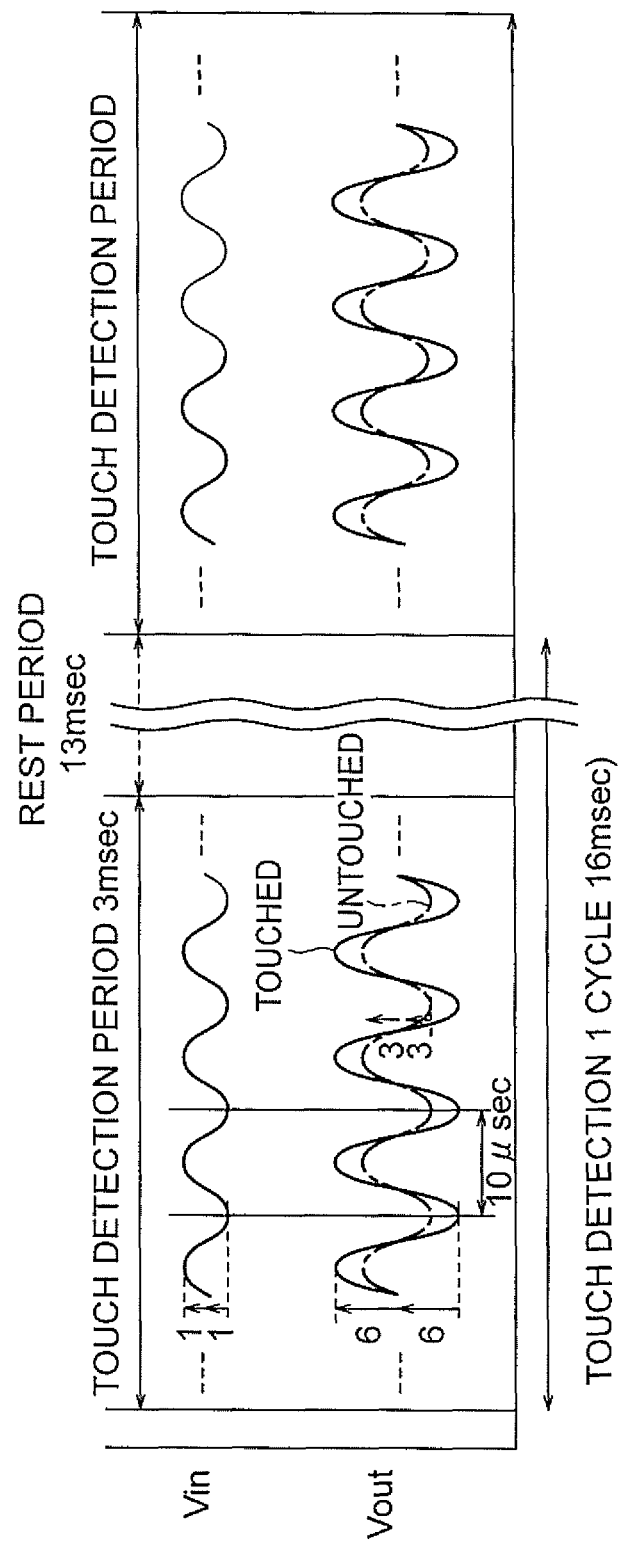
FIG. 7 is a graph showing examples of voltage waveforms of the touch sensor device according to the first exemplary embodiment.

FIG. 7 shows an example of the voltage waveform in the touch sensor device 100. In the example shown in FIG. 7, the touch detection period is set as 3 milliseconds and the cycle of the touch detection period is set as 16 milliseconds. The touch detection period is 3 milliseconds, so that the rest period where the touch detection is not performed is remaining 13 milliseconds. Vin of the example shown in FIG. 7 is the output waveform of the oscillator 27, and Vout is the output waveform of the current-voltage converter circuit 28 included in the current detection circuit 29. Herein, the frequency of Vin is set as 100 kHz, and the amplitude is set as 1V. At this time, when there is no touch, the amplitude of Vout is 3 V, for example. When there is a touch, the amplitude of Vout is 6 V. That is, the amplitude is increased by 3 V in accordance with the touch. Note here that the amplitude 3 V of Vout generated when there is no touch is based on the fact that there is a capacitance other than the human body from the transparent conductive layer 39, i.e., a stray capacitance, and the fact that Vin is outputted to Vout of the current-voltage converter circuit 28. As described, actually, there is a voltage of some extent generated in the output of the analog-digital converter circuit 56 even if there is no approach of the indicator 23 and the human body such as the palm.

In the exemplary embodiment shown in FIG. 6, the output of the current-voltage converter circuit 28c is an alternate current voltage. Thus, the alternate current voltage is converted to the direct current voltage by the AC-DC converter circuits 54a to 54d provided in the post-stage. Further, since the direct current voltage outputs of the AC-DC converter circuits 54a to 54d are analog signals, the analog signals are converted to digital signals by the analog-digital converter circuit 56 provided in the post-stage. Then, arithmetic calculation processing is performed by the CPU 60 based on the converted digital signals. Through the signal processing from the current detection circuits 29 to the CPU 60, each of the currents is to id flown in the current detection circuits 29 is converted to a numerical value (detection signal) proportional to the extent of the current in one period of judging a touch.

The CPU 60 executes the arithmetic calculation regarding detection of existence of a touch and the touched position based on each of the detection signals. After the power is supplied to the electronic apparatus 1, the program (including the position calculation program of the first exemplary embodiment) is read out by the CPU 60 from the flash memory 62, and the operations (including the position calculation method of the first exemplary embodiment) by the micro controller 58 are repeatedly executed. An OS (Operating System) is saved within the flash memory 62. When the OS is read out, the CPU 60 gives a command such as a mouse event via the OS. The mouse events are shift of the mouse (mouse cursor), mouse click down, mouse click up, and the like executed by tap operations according to the detected position calculated based on the touch. In this manner described above, the processing from the analog-digital conversion to the mouse event is automatically operated by the micro controller 58 at a prescribed frequency of 60 Hz.

Next, existence of the stray capacitance (parasitic capacitance) seen from the transparent conductive layer 39 will be described by referring to the exemplary embodiment shown in FIG. 6. The current-voltage converter circuit 28c is constituted with an operation amplifier 50 and a resistance element 52, and the inversion input terminal of the operation amplifier 50 and the transparent conductive layer 39 are electrically connected. The inversion input terminal of the operation amplifier 50 and the transparent conductive layer 39 are connected via a wiring such as the FPC 7, and a parasitic capacitance 26 is formed between the wirings and between with a ground 35. A current is flown to the ground 35 from the FPC 7 via the parasitic capacitance 26, so that the current according to the parasitic capacitance 26 is contained in the current flown in the current-voltage converter circuit 28c.

The current flown in the current-voltage converter circuit 28 is proportional to the detection signal handled by the CPU 60, so that the detection signal includes the signal generated according to the parasitic capacitance 26. The signal according to the parasitic capacitance 26 is irrelevant to the coordinate of the touched position. Thus, there is such an issue that the position is shifted when the detected position is acquired by directly using each of the detection signals.

As a measure for that, executed is a baseline correction with which the signal according to the parasitic capacitance 26 is held as the baseline and it is subtracted from a newly acquired detection signal. Herein, the outputs of the analog-digital conversion circuit 56 corresponding to the current detection circuits 29a to 29d are expressed as detection signals ha(iT) to hd(iT). Note that ha(iT) to hd(iT) are generalized to hch(iT) (ch=a, b, c, d). The total sum of the detection signals ha(iT) to hd(i) is defined as h(iT) (Expression A3).

$$h(iT) = \sum_{ch=a}^{d} hch[iT] \qquad \text{(Expression A3)}$$

Further, the detection signals ha(iT) to hd(iT) acquired when the touch sensor device 100 judges that there is no approach of the indicator 23 and the human body such as the palm are expressed as baselines Ba(iT) to Bd(iT). The total sum of the baselines Ba(iT) to Bd(iT) is defined as B(iT) (Expression A4). Ba(iT) to Bd(iT) are generalized as Bch (iT) (ch=a, b, c, d).

$$B(iT) = \sum_{ch=a}^{d} Bch[iT] \qquad \text{(Expression A4)}$$

Figure 8:
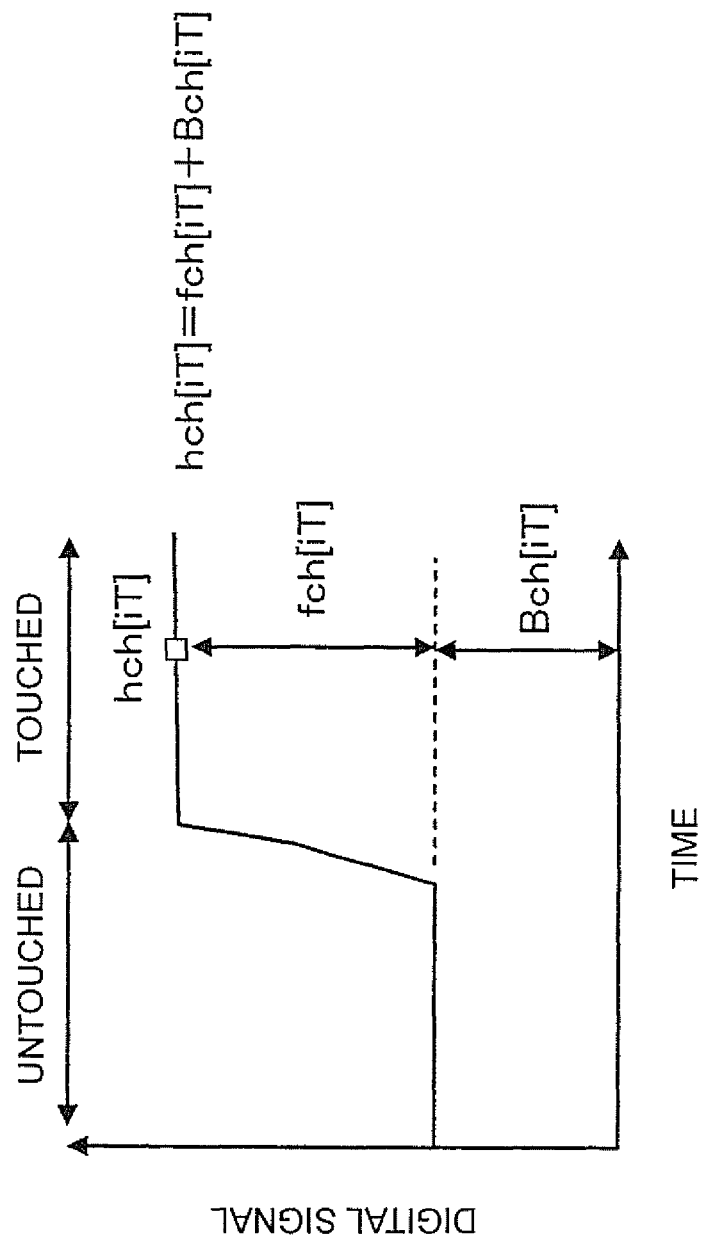
FIG. 8 is a model chart for describing base line correction according to the first exemplary embodiment.

The result acquired by subtracting the baseline Bch(iT) from the detection signal hch(iT) is defined as a first signal fch(iT) (Expression A5). FIG. 8 shows a graph for describing the relation regarding fch(iT), hch(iT), and Bch(iT).

$$hch(iT) = fch(iT) + Bch(iT) \qquad \text{(Expression A5)}$$

Figure 9:
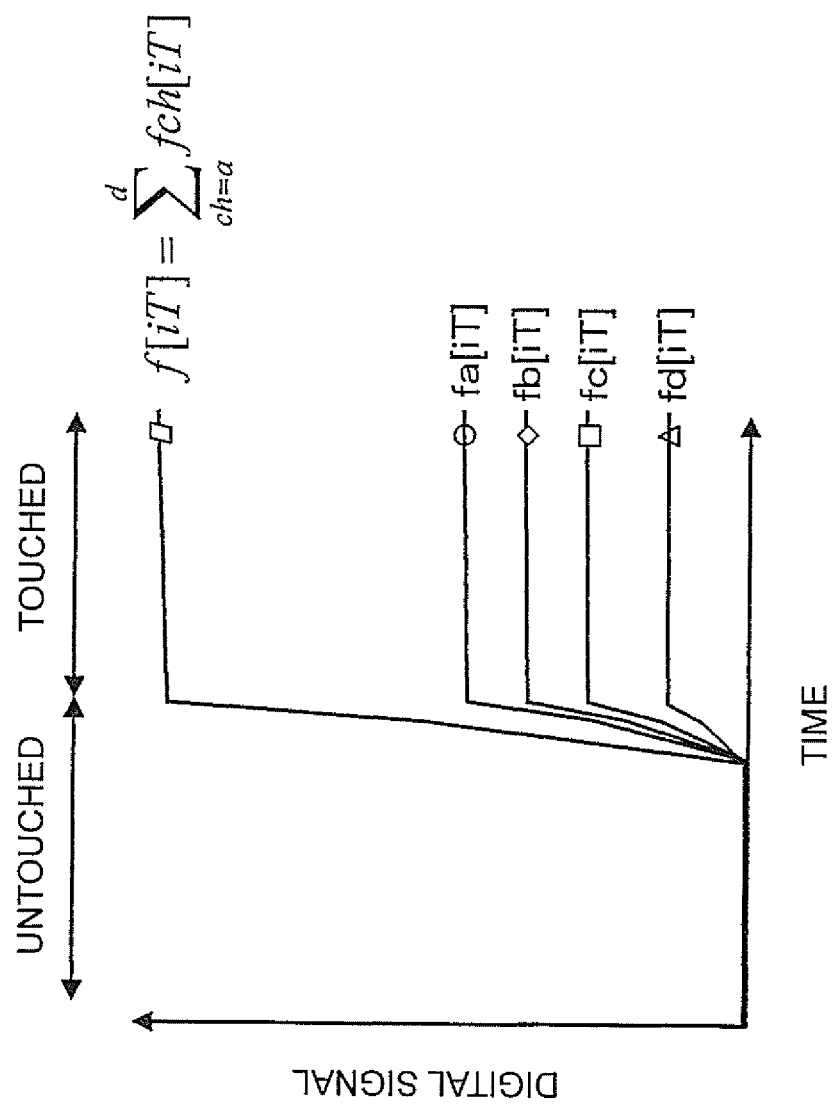
FIG. 9 is a model chart for describing the relation regarding fa(iT) to fd(iT) and f(iT) of the first exemplary embodiment.

Note here that the first signal fch(iT) is a variable acquired by generalizing fa(iT) to fd(iT) (ch=a, b, c, d), and the total sum of fa(iT) to fd(iT) is defined as f(iT) (Expression A6). FIG. 9 shows a graph for describing the relation regarding fa(iT) to fd(iT) and f(iT).

$$f(iT) = \sum_{ch=a}^{d} fch[iT] \qquad \text{(Expression A6)}$$

Figure 10:
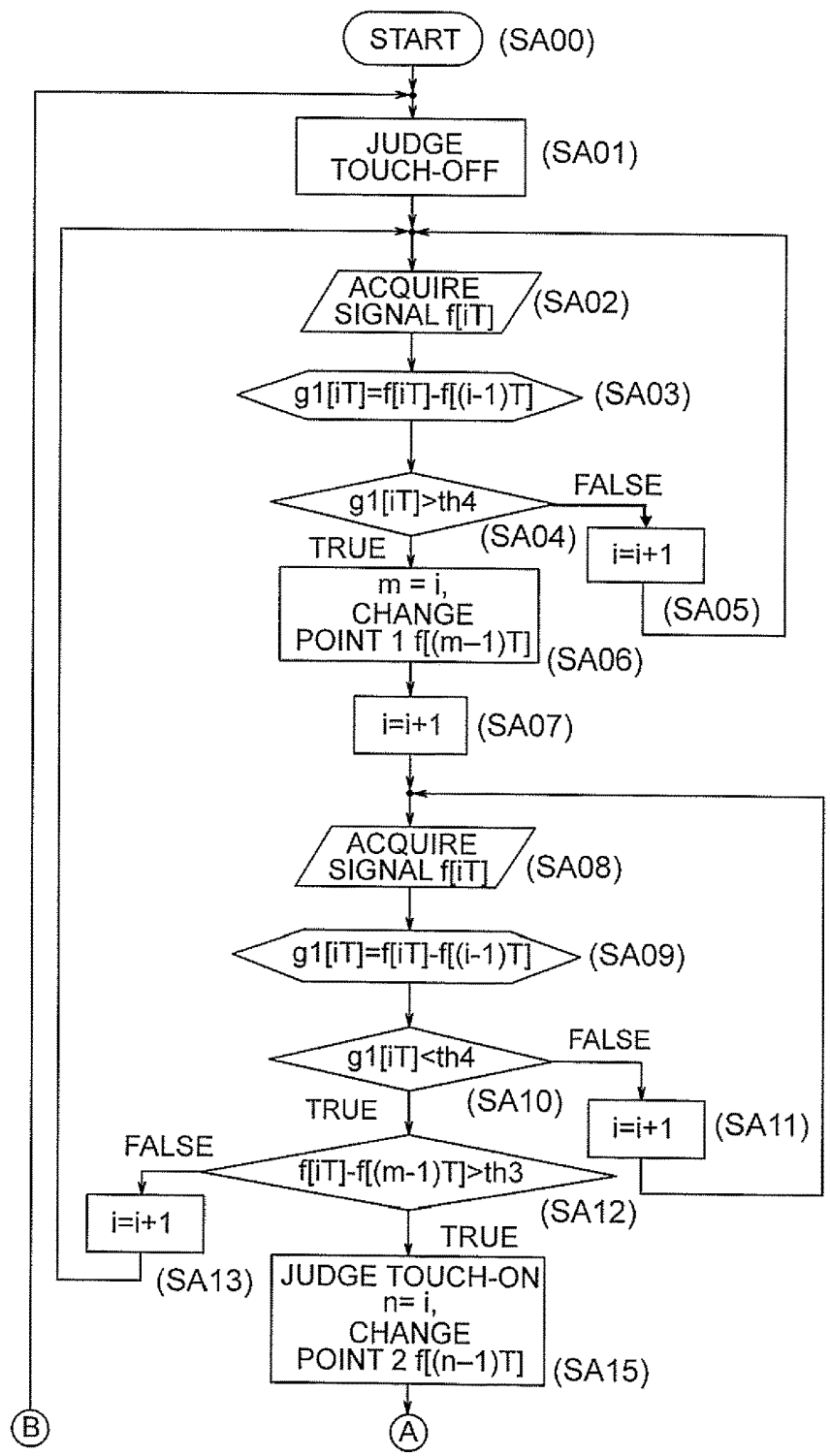
FIG. 10 is a first flowchart for describing actions of the touch sensor device, the control method, and the program for operating the touch sensor device according to the first exemplary embodiment.
Figure 11:
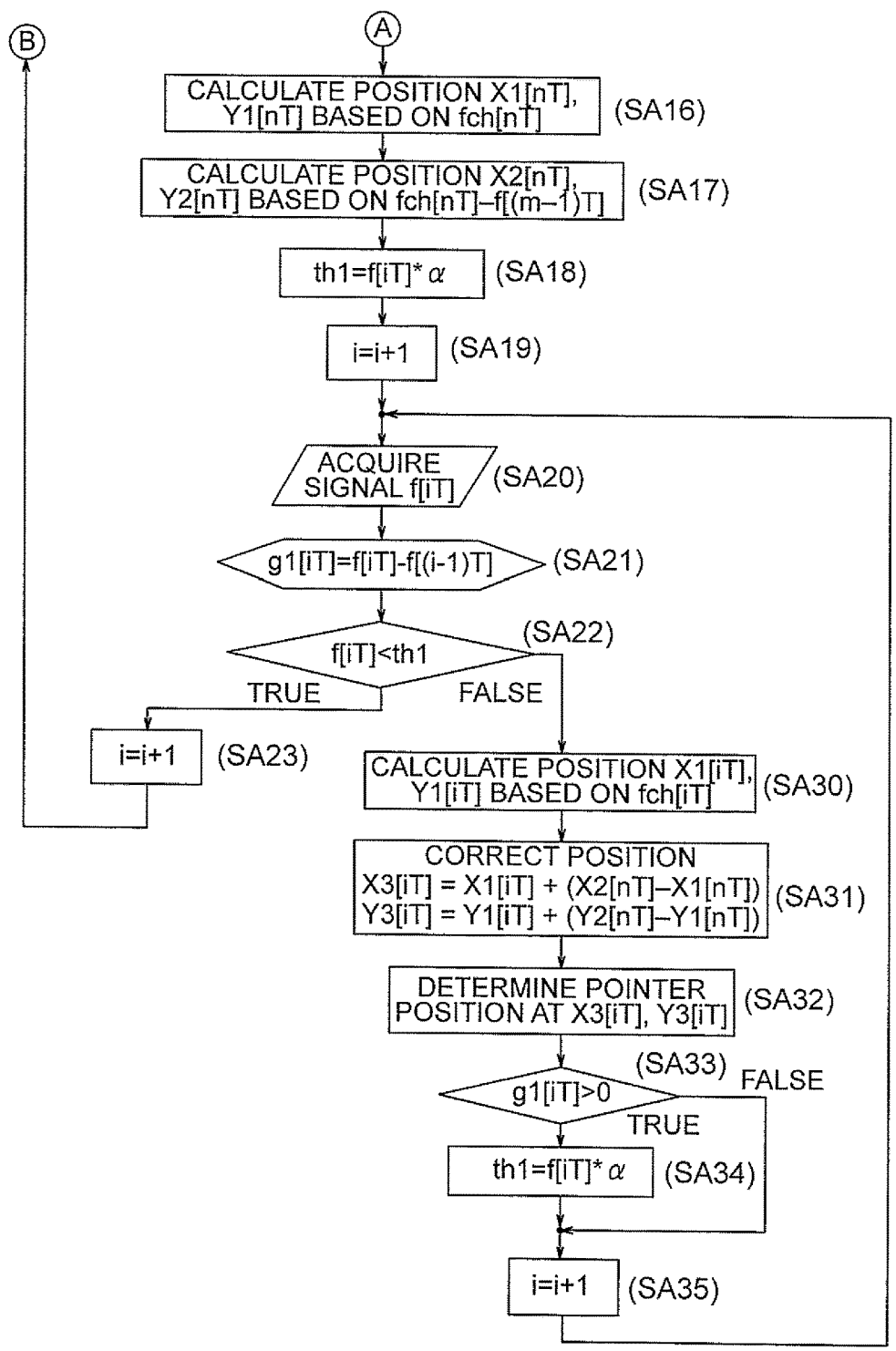
FIG. 11 is a second flowchart for describing actions of the touch sensor device, the control method, and the program for operating the touch sensor device according to the first exemplary embodiment.

Next, the operation and control method of the touch sensor device 100 as an example of the position calculation method of the first exemplary embodiment and the program for operating the touch sensor device 100 as an example of the position calculation program of the first exemplary embodiment will be described. FIG. 10 and FIG. 11 show flowcharts for describing the operation and the control method of the touch sensor device of the first exemplary embodiment as well as the program for operating the touch sensor device.

Figure 12:
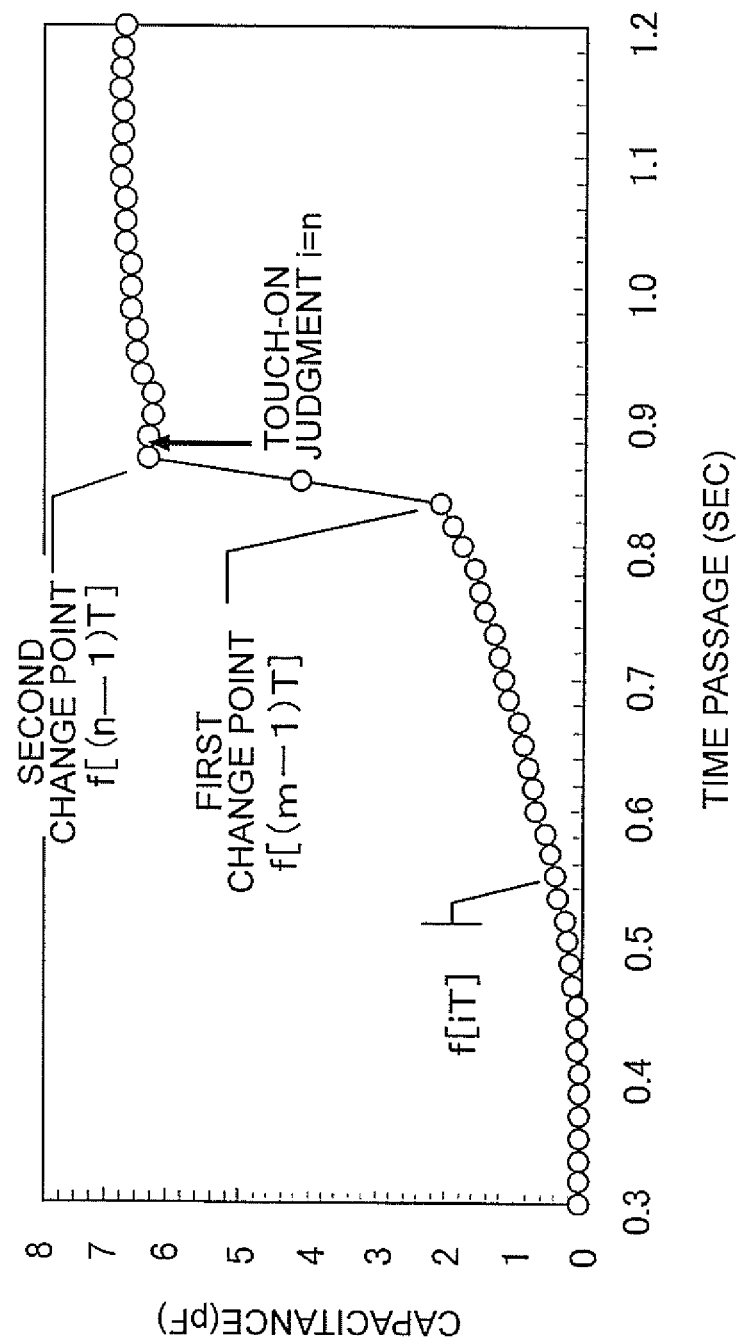
FIG. 12 is a graph showing the chronic change of f(iT) before and after a touch according to the first exemplary embodiment.

In the first exemplary embodiment, the first signal fch(iT) is used only in steps regarding the calculation of the position, and the total value f[iT] of four-channel signals is used as much as possible in explanations of each step of the flowcharts. FIG. 12 shows chronic changes in f[iT] before and after a touch. Note here that f[iT] that is the digitized signal is converted into a capacitance in a procedure shown in the followings. First, in the exemplary embodiment shown in FIG. 5, a capacitor is connected instead of the indicator 23, and the digital signal f[iT] is measured. At this time, the digital signal f[iT] is measured by changing the capacitance of the capacitor, and it is found that the display value of the capacitance of the capacitor and the digital signal f[iT] are in a proportional relation. The conversion coefficient is acquired based on the slope showing the relation between the digital signal f[iT] and the capacitance, and the digital signal f[iT] is converted to the capacitance.

Each of the steps of the program will be described by referring to the exemplary embodiment shown in FIG. 10 to FIG. 12.

First, after starting the program of the touch panel, a touch-off judgment is executed (SA01). Subsequently, in the judgment of the i-th touch, the signal is acquired and the output value f[iT] of the signal is calculated (SA02). Then, a difference value g1[iT] of the signal f[iT] per cycle T=16 milliseconds) is calculated (SA03). The signal difference value g1[iT] is calculated as g1[iT]=f[iT]−f[(i−1)T]. Subsequently, the difference value g1[iT] is compared with a fourth threshold value th4 (SA04). Note here that the fourth threshold value th4 is a threshold value for judging whether or not f[iT] changes gradually, i.e., whether or not the signal changes in accordance with the approach of the palm.

When the difference value g1[iT] is equal to the fourth threshold value th4 or smaller in step SA04, the count is increased by one in step SA05 and the procedure is returned to step SA02. In the meantime, when the difference value g1[iT] is larger than the fourth threshold value th4, i is substituted to m and the first change point at which f[iT] starts to rise sharply is defined as f[(m−1)T] at time (m−1)T that is the time earlier than mT by 1T (SA06, FIG. 12). In the first exemplary embodiment, the first change point f[(m−1)] is taken as the signal according to the approach of the palm.

Alternatively, an extrapolation value extrapolated from the first change point to the time iT based on the gradual increase tendency before the first change point may be acquired to be taken as the signal according to the approach of the palm even after the output value f[iT] of the signal increases sharply after the first change point. Here, the extrapolation value is defined as 2*f[(m−1)T]−f[(2m−i−2)T] based on the unit time (i−m+1)T and the output value f[(m−1)T] of the signal at the first change point. Not only the finger but also the palm approaches the panel surface while the signal is increasing sharply in accordance with the touch of the fingertip to the panel surface, so that the signal according to the approach of the palm can be estimated more accurately through acquiring the extrapolation value and taking the increase in the signal component of the palm in that period into account. In this Description, "*" is a symbol indicating multiplication.

Subsequently, i is counted up by one (SA07), the signal is acquired in the same manner as that of step SA02, and the output value f[iT] of the signal is calculated (SA08). Subsequently, the difference value g1[iT] is calculated in the same manner as that of step SA03 (SA09). Then, the difference value g1[iT] is compared with the fourth threshold value th4 (SA10). Here, when the difference value g1[iT] is equal to the fourth threshold value th4 or larger, i is counted up by one (SA11) and the procedure is then returned to step SA08.

In the meantime, when the difference value g1[iT] is smaller than the fourth threshold value th4, the difference between the output value f[iT] of the signal and the first change point f[(m−1)T] is acquired. Subsequently, the difference (f[iT]−f[(m−1)T]) is compared with a third threshold value th3 (SA12). When the difference (f[iT]−f[(m−1)T]) is equal to the third threshold value th3 or smaller, i is counted up by one (SA13) and the procedure is returned to SA02. This corresponds to redoing the touch-on judgment from the beginning since it has not reached the threshold value of the touch-on judgment.

In the meantime, when the difference (f[iT]−f[(m−1)T]) is larger than the third threshold value th3, i is substituted to n and the touch-on judgment is executed (SA15). Note here that the time for judging the touch-on is (n−m)T. Further, the third threshold value th3 can be given by Expression A7 in the followings by using the fourth threshold value th4.

$$th3 = th4 * \max(n-m) \quad \text{(Expression A7)}$$

Note here that max (n−m) is the upper limit of (n−m), and the upper limit of (n−m)T is defined as max {(n−m)T}. For example, when it is set as T=16 milliseconds and max (n−m)=5, acquired is max {(n−m)T}=5*16 milliseconds=80 milliseconds. When the third threshold value th3 is set as 1.5 pF, the fourth threshold value th4 becomes 0.3 pF (=th3/max (n−m)=1.5 pF/5).

Subsequently, the first detected position X1[nT], Y1[nT] is calculated based on the first signal fch[nT] (SA16). Note here that Expression A1 and Expression A2 are used for calculating the detected position. While Expression A1 and Expression A2 are also used for calculating the detected position based on the signal hereinafter, depiction of those will be omitted for convenience. Further, the position coordinate calculated based on the first signal fch[iT] in a cycle i is defined as the first detected position X1[iT], Y1[iT].

Subsequently, the second detected position X2[nT], Y2[nT] is calculated based on the second signal (fch[nT]−fch[(m−1)T]) (SA17). Here, the position coordinate calculated based on the second signal (fch[iT]−fch[(m−1)T]) in the cycle i is defined as the second detected position X2[iT], Y2[iT].

The first detected position X1[nT], Y1[nT] and the second detected position X2[nT], Y2[nT] are used for correcting the position in step SA31 described later. Like the first detected position X1[nT], Y1[nT] and the second detected position X2[nT], Y2[nT] are calculated in the cycle i=n in which the touch-on is judged, it is preferable to calculate those within the same cycle i. This is because there is no error generated between the first signals to be used and a more accurate correction value can be calculated when set to calculate those within the same cycle i, since the common value fch[iT] is used for the first signals that are used when acquiring the first detected position and the second detected position.

Further, the first detected position and the second detected position used for correcting the position are preferable to be calculated in any of the cycles i in which the touch-on is judged, i.e., the cycle i=n−1 to n+6. First, the basis of the fact that the lower limit of the cycle i is set as n−1 will be described. In the cycle i=n−1, g1[iT]<th4 of step SA10 becomes FALSE. However, in the cycle i=n, g1[iT]<th4 of step SA10 becomes TRUE. Thus, in the cycle i≥n−1, the first signal fch[iT] becomes almost fixed after a sharp increase, and the change from the first signal fch[(n−1)T] to fch[nT] is as small as equal to or less than th4. When the first signal fch[iT] becomes almost fixed after a sharp increase in accordance with a touch, the ratio (fch[nT]−fch[(m−1)T]/ fch[(m−1)T] of the second signal (fch[nT]−fch[(m−1)T] with respect to the signal fch[(m−1)T] generated according to the approach of the palm becomes almost maximum. The so-called signal-to-noise ratio (S/N) becomes high, so that the second detected position calculated based on the second signal from which the influence due to the approach of the palm is eliminated becomes more accurate. Further, the more correct the second detected position after the touch-on judgment is, the more accurate the correction value becomes.

In the meantime, the basis of the fact that the upper limit of the cycle i is set as n+6 will be described. There is a possibility of conducting a drag operation after a touch, and the detected position changes immediately after the touch-on judgment when the drag operation is conducted. In general, it takes 0.1 seconds for the human being to shift to the drag operation after making the touch. Thus, the upper limit of the number of cycles taken for shifting to the drag operation becomes as follows: the upper limit value=n+0.1 sec/T (16 ms)≈n+6.

Further, the first signal fch[iT] fluctuates because the noise mixed from an alternate current power line is superimposed thereon. Through averaging the first signals fch [(n−1)T] to fch[(n+6)T] corresponding to the cycle numbers i=n−1 to n+6 in any of the ranges, the random noise can be offset. Therefore, it is preferable to acquire the first detected position by using the averaged first signal or to acquire the second detection signal by using the averaged second signal.

Subsequently, f[nT]*α is stored as the first threshold value th1 of a touch-off judgment (SA18). Note here that α is a constant for calculating the first threshold value th1 at the time of a touch-off judgment. For example, α is set as 0.6 in advance. Subsequently, i is counted up by one (SA19). The touch-on judgment is settled up to this point, so that a touch-off judgment is conducted subsequently. Then, the output value f[iT] of the signal is acquired in the same manner as that of step SA02 (SA20). Subsequently, the difference value g1[iT] is calculated in the same manner as that of step SA03 (SA21).

Then, the output value f[iT] of the signal is compared with the first threshold value th1 (SA22). When the output value f[iT] of the signal is smaller than the first threshold value th1, i is counted up by one (SA23) and the procedure is returned to step SA01 thereafter. That is, a touch-off judgment is conducted and a next touch-on is to be expected.

In the meantime, when the output value f[iT] of the signal is equal to the first threshold value th1 or larger, the position is calculated without conducting a touch-off judgment (SA30 to SA35). In step SA30, the first detected position X1[iT], Y1[iT] is calculated based on the first signal fch[iT].

Subsequently, a correction is performed by using the first detected position X1[nT], Y1[nT] calculated in step SA16 and the second detected position X2[nT], Y2[nT] calculated in step SA17 by taking the first detected position X1[iT], Y1[iT] as the base. It is calculated as the third detected position X3[iT]=X1[iT]+(X2[nT]−X1[nT]) and Y3[iT]=Y1[iT]+(Y2[nT]−Y1[nT]) (SA31). Note here that the corrected position coordinate of the first exemplary embodiment is defined as the third detected position.

Subsequently, the position of the pointer is settled at the third detected position X3[iT], Y3[iT] (SA32). Subsequently, the difference value g1[iT] calculated in SA21 is compared with 0 (SA33). When the difference value g1[iT] is equal to 0 or smaller, the procedure is advanced to step SA35 without going through step SA34. In the meantime, when the difference value g1[iT] is larger than 0, f[iT]*α is taken as a new first threshold value th1 of a touch-off judgment (SA34). Subsequently, i is counted up by one in step SA35, and the procedure is then returned to step SA20.

Next, the conceptual chart of the algorithm of FIG. 10 and FIG. 11 according to the first exemplary embodiment is shown in FIG. 13. The working effects of the algorithm shown in FIG. 10 and FIG. 11 will be described by using the conceptual chart shown in FIG. 13. In a case where the forefinger of the right hand touches the screen, the palm of the right hand is on the right near side with respect to the fingertip of the forefinger of the right hand. Thus, the calculated first detected position is shifted to the right near side due to the influence of the palm. In the period where a touch is made and a drag operation is conducted thereafter, the touching hand does not change from the right hand to the left hand and from the forefinger of the right hand to other fingers of the right hand. That is, while the palm moves in accordance with the drag operation, the relative positional relation between the fingertip and the palm is kept as almost constant. The algorithm is based on the idea that the influence of the palm to the position is constant during the period from the point at which touch is made to the point at which the drag operation is conducted. The correction value is calculated immediately after the touch-on judgment, and it is used for correction of the position calculation until a touch-off is judged.

(Actions)

The actions are simulated by using the algorithm shown in FIG. 10 and FIG. 11. The principle of an analog (surface) capacitive type one-dimensional (X direction) position calculation is used, and expressions derived or variables defined in EXAMPLE 1 to be described later are used. FIG. 14 shows the time passage of the detected position when a drag operation is conducted after a touch. FIG. 15 shows the time passage of each current of that state.

Referring to the time passage of the detected position shown in FIG. 14, the section where the time passage is 0 to 1.05 seconds is an untouch section. Thus, the detected position is not calculated. The detected position is calculated in a touch section where the time passage is 1.05 to 2.5 seconds. "Set position Xc" in the graph shown in FIG. 14 shows the accurate position coordinate where the fingertip actually touched.

Referring to the time passage of each current shown in FIG. 15, the human body is sufficiently away from the touch panel in the section where the time passage is 0 to 0.5 seconds, so that the currents ia and ib are both 0 μA. Note here that the capacitance of other than the human body seen from the transparent conductive layer 39, i.e., the stray capacitance (current), is cancelled by the baseline correction.

In the section where the chronic passage is 0.5 to 1.0 seconds, the palm approached the touch panel so that the currents ia and ib increased. In this section, the fingertip does not touch the panel, so that the current component according to the contact of the fingertip is expressed as ifa=ifb=0. From Expression K24 shown in EXAMPLE 1 to be described later, the current ia is constituted with the current ifa according to the contact of the fingertip and the current iha according to the approach of the palm, so that it is expressed as ia=iha. Similarly, the current ib can be expressed as ib=ihb. At the point where the time passage is 1.0 seconds, ia=iha=0.39 μA, and ib=ihb=0.91 μA.

In a relatively short section where the time passage is 50 milliseconds from 1.0 to 1.05 seconds, the currents ia and ib sharply increased in accordance with the touch of the fingertip, and the currents changed to ia=1.9 μA and ib=3.17 μA at the time passage of 1.05 seconds. Thereby, the currents ia and ib became constant for the time passage. After 16 milliseconds where the time passage was 1.066 seconds, a touch-on was judged. The third detected position calculated at this time by the algorithm shown in FIG. 10 and FIG. 11 was 0.6 by referring to the time passage of the detected position shown in FIG. 14, which was consistent with the set position Xc. In the section where the time passage is 1.05 to 1.55 seconds, the fingertip is in contact with the surface of the touch panel and stands still. Thus, the currents ia, ib and the third detected position calculated by the algorithm shown in FIG. 10 and FIG. 11 do not change.

In the section where the time passage is 1.55 to 2.05 seconds, the fingertip moves from Xc=0.6 to 0.3 by a drag operation. During that period, the third detected position calculated by the algorithm shown in FIG. 10 and FIG. 11 became consistent with the set position Xc. In that section, referring to the time passage of the currents shown in FIG. 15, the current ia changes largely from 1.9 $\mu A$ to 3.42 $\mu A$, iha changes from 0.39 $\mu A$ to 0.78 $\mu A$, ib changes from 3.17 $\mu A$ to 1.65 $\mu A$, and ihb changes from 0.91 $\mu A$ to 0.52 $\mu A$. The reason that the currents iha and ihb change is because the position of the palm (capacitance) also moves according to the drag operation.

Next, as the measure depicted in paragraphs 0163 to 0188 of Patent Document 3, the cause for shifting the second detected position as the position coordinate after a drag operation was analyzed. The purpose for adding the current generated according to the approach of the palm to the time passage of the current shown in FIG. 15 is for describing that the current according to the approach of the palm also changes at the time of the drag operation.

In the time passage of the current shown in FIG. 15, the set position Xc after the drag operation is already-known and the currents iha, ihb according to the approach of the palm are calculated based on Xc. However, actually, only the currents ia and ib are acquired in the current detection circuits 29 and following signal processing, and iha and ihb cannot be acquired. That is, only the currents ia and ib can be used for acquiring the detected position. As in the section where the time passage is 1.55 to 2.05 seconds, it is impossible to calculate the details of the changes when both the "current generated according to the contact of the fingertip" and the "current generated according to the approach of the palm" change according to the drag operation. Therefore, with the measure depicted in Patent Document 3 with which the "current generated according to the contact of the fingertip" is extracted, it is not possible to acquire the detected position accurately in a case where the position coordinate after the drag operation is changed.

Next, when a drag operation is conducted in the section where the time passage is 2.05 to 2.5 seconds and the fingertip is returned in the opposite direction from 0.3 to 0.5, the third detected position calculated by the algorithm of the first exemplary embodiment was also consistent with the set position Xc. As in the section where the time passage is 1.55 to 2.05 seconds, the currents ia, iha, ib, and ihb largely change. It shows that the detected position at the time of a drag operation can be acquired accurately by using the algorithm for correcting the position shown in FIG. 10 and FIG. 11.

Then, the position accuracy at the time of the drag operation was measured by using a 12.1-inch touch panel. The center of the touch panel was touched by using the forefinger of the right hand and a drag operation was conducted in order towards the points (48 reference points) of the equivalent intervals on the touch panel, and the detected positions were acquired thereafter. The average value of the difference (shift) of the detected positions from the 48 reference points was calculated. In a case where the algorithm shown in FIG. 10 and FIG. 11 according to the first exemplary embodiment was not applied, the average value of the shift was as large as +7.2 mm in the X direction and −10.7 mm in the Y direction. Here, by taking the center of the touch panel as the origin (X, Y)=(0 mm, 0 mm), the upper direction of the touch panel was defined as the positive (+) direction of Y, and the right direction of X was defined as the positive (+) direction of the touch panel. In the meantime, when the algorithm shown in FIG. 10 and FIG. 11 according to the first exemplary embodiment was applied, the shift largely decreased such as +3.0 mm in the X direction and −1.0 mm in the Y direction. Further, the average value of the shift when the algorithm shown in Patent Document 3 was applied was +33.4 mm in the X direction and +11.5 mm in the Y direction, which was rather worsened than the case where the algorithm shown in FIG. 10 and FIG. 11 according to the first exemplary embodiment is not applied.

As described above, through using the algorithm shown in FIG. 10 and FIG. 11 according to the first exemplary embodiment, the position accuracy can be improved even during the drag operation against the influence generated according to the approach of the palm.

As an exemplary advantage according to the invention, it is possible to improve the position accuracy even during the drag operation of the indicator against the influence of the approach of the accompanying part of the indicator.

Second Exemplary Embodiment

Next, a touch sensor device according to a second exemplary embodiment will be described. First, the outline of the second exemplary embodiment will be described by referring to FIG. 1. The correction value calculating unit 107 adjusts the correction value 17 by using a preset adjustment value which corresponds to the first detected position 15. The third position calculating unit 108 calculates the third detected position 18 through correcting the first detected position 15 calculated by the third position calculating unit 108 by using the adjusted correction value 17. Hereinafter, the second exemplary embodiment will be described in more details.

Figure 17:
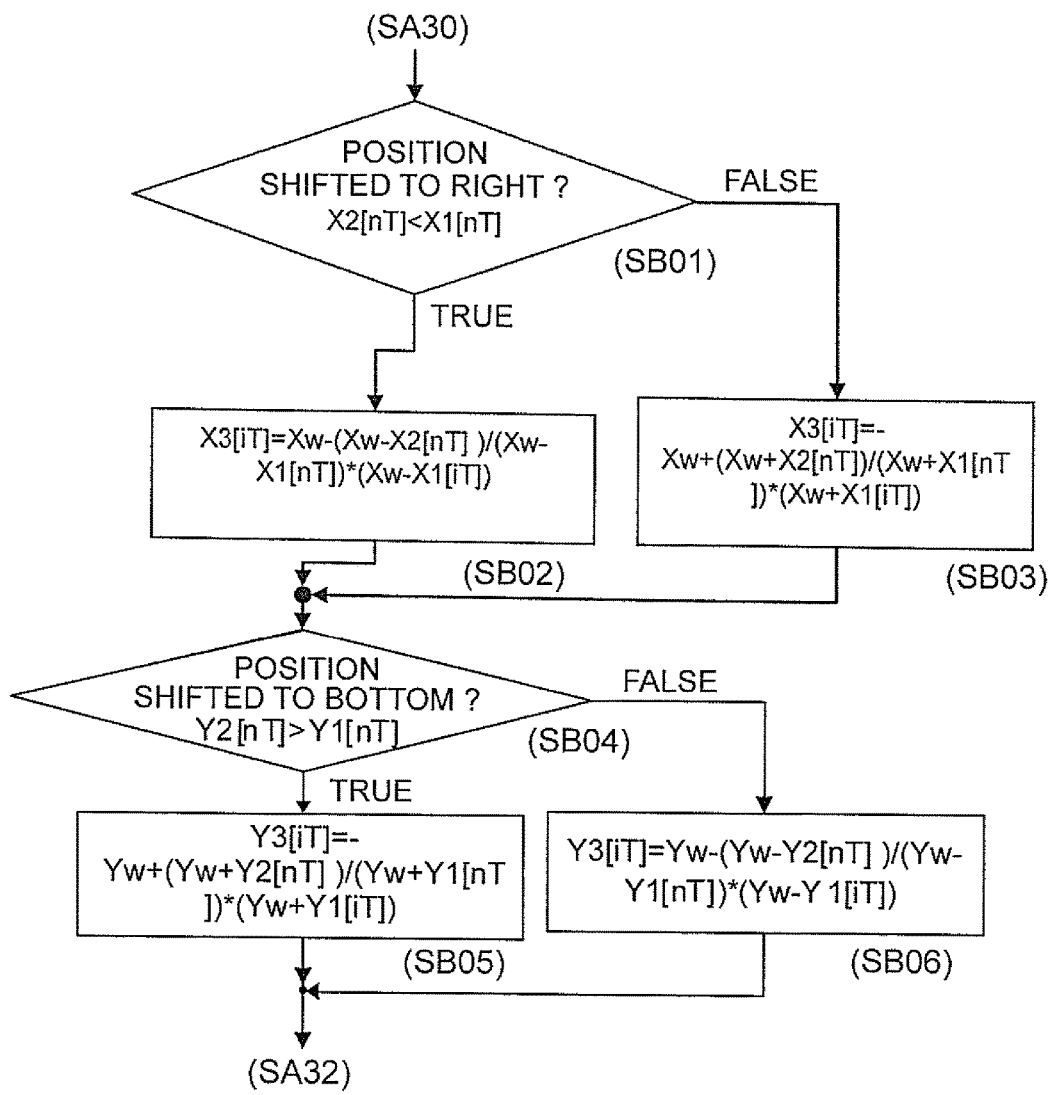
FIG. 17 is a flowchart for describing the program for operating the touch sensor device according to the second exemplary embodiment.

FIG. 16 shows a conceptual chart regarding actions of the touch sensor device according to the second exemplary embodiment, a control method thereof, and a program for operating the touch sensor device. FIG. 17 shows a flowchart of the program related to FIG. 16. Hereinafter, same reference numerals are used for substantially the same structures as those of the first exemplary embodiment, and mainly the points different from those of the first exemplary embodiment will be described.

When the program of the first exemplary embodiment shown in FIG. 10 and FIG. 11 is executed and a drag operation is conducted after a touch, the position accuracy is deteriorated in the peripheral part of the touch panel compared to the position accuracy in the vicinity of the center of the touch panel. This is because the palm also moves along with the drag operation, and the influence of the palm varies depending on the touched point within the touch panel. Specifically, when a touch is made on the lower end of the touch panel, the palm and the arm connected to the touching finger are hidden by the frame so that the influence of the palm is small. In the meantime, when a touch is made on the upper end of the touch panel, the palm and the arm connected to the touching finger are to cover a larger area of the touch panel so that the influence due to the approach of the palm and the arm is great.

For that, in the second exemplary embodiment, the first detected position influenced by the palm immediately after a touch-on judgment and the second detected position from which the influence of the palm is eliminated are calculated, and the correction value is acquired as in the case of the first exemplary embodiment. Then, the correction value is adjusted with the position coordinate within the touch panel of the first detected position influenced by the palm calculated successively during the period from the point at which the touch-on is judged to the point where a touch-off is judged.

Specifically, this will be described by referring to a flowchart shown in FIG. 17. SA00 to SA30 and SA32 to SA35 of the flowcharts shown in FIG. 10 and FIG. 11 according to the first exemplary embodiment are the same, so that those common steps are omitted in the flowchart of FIG. 17.

Referring to the flowchart shown in FIG. 17, first, the first detected position X1[iT], Y1[iT] is calculated based on fch[iT] in step SA30. Subsequently, in step SB01, in a case where the second detected position X2[nT]<the first detected position X1[nT], the procedure is advanced to step SB02 considering that the first detected position is shifted in the right direction in accordance with the approach of the palm. In step SB02, the third detected position X3[iT] is acquired by following Expression B1.

$$X3[iT]=Xw-(Xw-X2[nT])/(Xw-X1[nT])*(Xw-X1[iT])$$ (Expression B1)

Note here that Xw was set as 123 (mm) in the conceptual chart shown in FIG. 16. 123 (mm) is the length that is a half of the size H=264 (mm) of the display unit in the X direction. In the case of the conceptual chart shown in FIG. 16, the correction value becomes zero in the right end of the display unit while the correction value becomes the maximum in the left end of the display unit. Further, it is preferable to set Xw in the range of H/2 to 2*H. In the conceptual chart shown in FIG. 16, in a case where Xw=123 (mm), when a touch is made in the area of the right end of the display unit where the correction value is small and then a drag operation is conducted towards the left end of the display unit where the correction value is large, the correction in the left end of the display unit may become excessive in some cases. In such case, the excessive correction can be eased by increasing the value of Xw.

In the meantime, when FALSE in step SB01, the procedure is advanced to step SB03 where the third position X3[iT] is calculated with following Expression B2.

$$X3[iT]=-Xw+(Xw+X2[nT])/(Xw+X1[nT])*(Xw+X1[iT])$$ (Expression B2)

After calculating the third detected position X3[iT] in step SB02 or SB03, the procedure is advance to step SB04. In step SB04, in a case where the second detected position Y2[nT]>the first detected position Y1[nT], the procedure is advanced to step SB05 considering that the first detected position is shifted in the lower direction in accordance with the approach of the palm. In step SB05, the third detected position is acquired by following Expression B3.

$$Y3[iT]=-Yw+(Yw+Y2[nT])/(Yw+Y1[nT])*(Yw+Y1[iT])$$ (Expression B3)

Note here that Yw was set as 92 (mm) in the conceptual chart shown in FIG. 16. 92 (mm) is the length that is a half of the size V=184 (mm) of the display unit in the Y direction. Referring to the conceptual chart shown in FIG. 16, as in the case of the X direction, the correction value becomes zero in the lower end of the display unit while the correction value becomes the maximum in the upper end of the display unit. As in the case of Xw, it is preferable to set Yw within the range of V/2 to 2*V.

In the meantime, when FALSE in step SB04, the procedure is advanced to step SB06 where the third position Y3[iT] is calculated with following Expression B4.

$$Y3[iT]=Yw-(Yw-Y2[nT])/(Yw-Y1[nT])*(Yw-Y1[iT])$$ (Expression B4)

After calculating the third detected position Y3[iT] in step SB05 or SB06, the procedure is advance to step SA32.

The operation of the second exemplary embodiment is to adjust the correction value within the touch panel while taking the phenomenon where the influence of the palm becomes small in the near side of the panel because the palm and the arm are hidden by the frame and the influence of the palm becomes great on the upper side of the touch panel into account. By using the second exemplary embodiment, it is possible to detect the position more accurately by correcting the difference of the influence of the palm within the touch panel surface.

Third Exemplary Embodiment

Next, a touch sensor device according to a third exemplary embodiment will be described. First, the outline of the third exemplary embodiment will be described by referring to FIG. 1. A pair of first constants for a case where the indicator 10 is an ideal indicator having no accompanying part 10a and a plurality of pairs of second constants for a case where the indicator 10 is a finger of a human being are defined in advance. The first and a second position detection units 105, 106 calculate the first and second detected positions 15, 16 based on the detection signal 12 by using the pair of first constants. The third position detection unit 108 selects one pair of second constants from the plurality of pairs of second constants according to the relation regarding the values of the first and second detected positions 15, 16 calculated by the first and second position calculating units 105, 106, and calculate the first detected position 15 based on the detection signal 12 by using the pair of second constants. Hereinafter, the third exemplary embodiment will be described in more details.

Figure 18:
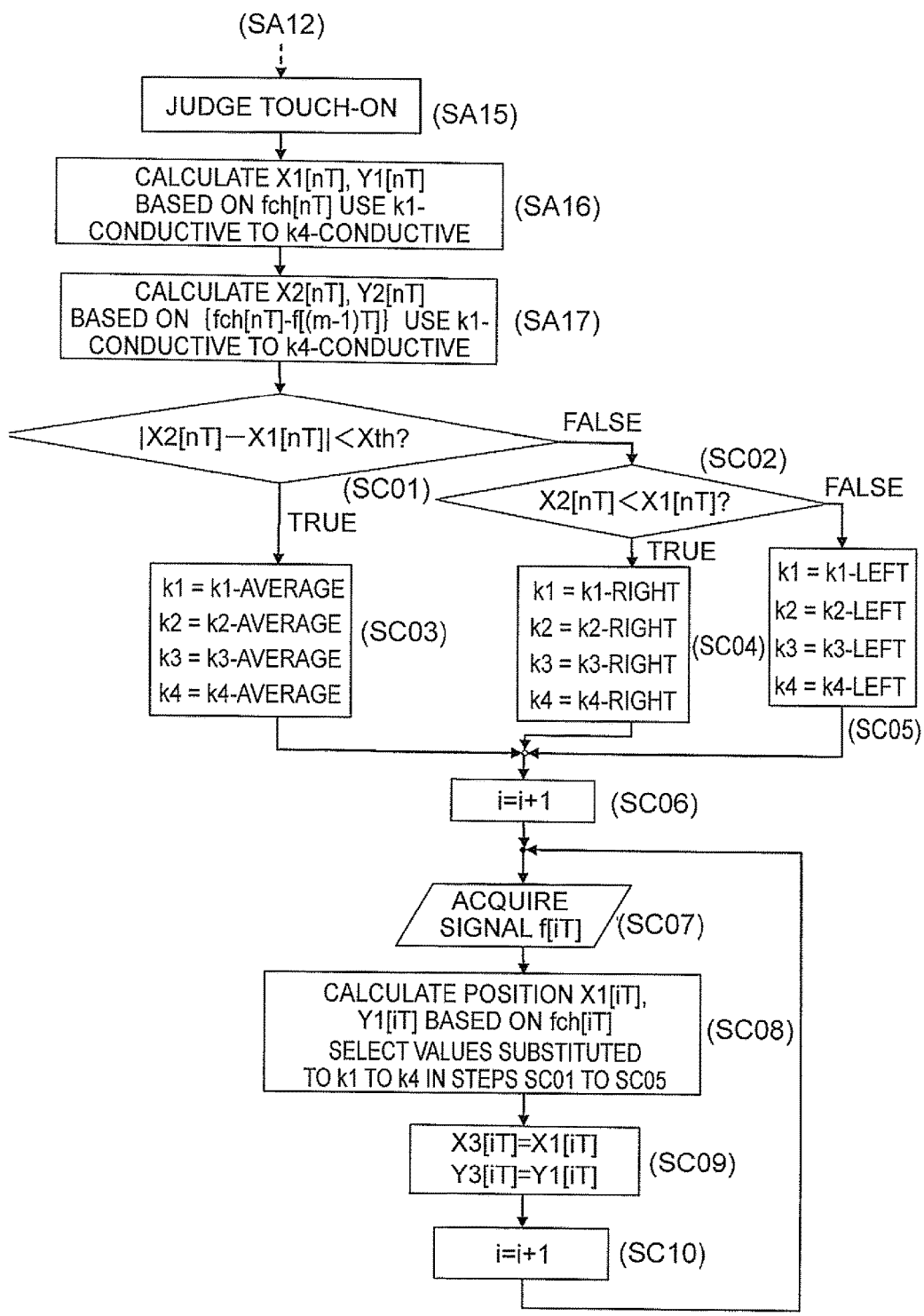
FIG. 18 is a flowchart for describing a program for operating a touch sensor device according to a third exemplary embodiment.

FIG. 18 shows a flowchart regarding actions of the touch sensor device according to the third exemplary embodiment, a control method thereof, and a program, for operating the touch sensor device. Hereinafter, same reference numerals are used for substantially the same structures as those of the first exemplary embodiment, and mainly the points different from those of the first exemplary embodiment will be described.

As described in the explanations of the second exemplary embodiment, when the program shown in FIG. 10 and FIG. 11 according to the first exemplary embodiment is executed, the influence of the palm varies depending on the touched points. For that, in the third exemplary embodiment, a calibration is performed by using a finger actually for the indicator, and the constants of Expression A1 and Expression A2 are acquired. The constants acquired herein are defined as the second constants and used for calculating the position at the time of drag operation.

However, the influence generated according to the approach of the palm varies depending on whether the touching hand is the right hand or the left hand. Thus, immediately after a touch-on is judged, whether the touching hand is the right hand or the left hand is judged automatically. When executing the automatic judgment, an ideal indicator that does not contain the influence of the palm such as a conductor is used and constants acquired in advance are used. The acquired constants are defined as the first constants. Further, the second constants acquired by the judged hand are used from the point where whether the touching hand is the right hand or the left hand is judged automatically to the point where a touch-off is judged.

First, as in the case of calibration shown in FIG. 1, an ideal indicator that does not contain the influence of the palm such as a conductor is placed at the measurement position (X, Y) on the touch panel 101, and the currents ia to id are measured. The measured X, Y and ia to id are substituted to Expression A1 and Expression A2 to acquire constants k1 to k4. The constants k1 to k4 acquired by using the ideal indicator are defined as k1-conductor to k4-conductor. Further, the currents ia to id measured by actually touching the measurement point (X, Y) on the touch panel 101 by the forefinger of the right hand are defined as ia right to id right. The measured ia right to id right and X, Y are substituted to Expression A1 and Expression A2, and acquired constants k1 to k4 are defined as k-right to k4-right. Similarly, for the left hand, the measured currents ia to id are defined as ia left to id left, and acquired constants k1 to k4 are defined as k1-left to k4-left.

At the time of calibration, actually a finger may be used as an indicator or an indicator imitating the finger and hand may be fabricated and used. Further, when it is difficult to judge whether the touching hand is the left hand or the right hand, constants k1-average to k4-average are used. The constants k1-average to k4-average are calculated as follows. When a standard value U=(ib+ic)/(ia+ib+ic+id) is substituted to X=k1+k2−(ib+ic)/(ia+ib+ic+id) shown in Expression A1, Expression A1 turns out as a following Expression C1.

$$X = k1 + k2 - U \quad \text{(Expression C1)}$$

The current values ia-right to id-right measured with the right hand are substituted to currents ia to id to acquire standard value U-right=(ib-right+ic-right)/(ia-right+ib-right+ic-right+id-right). Similarly, the current values ia-left to id-left measured with the left hand are substituted to currents ia to id to acquire standard value U-left=(ib-left+ic-left)/(ia-left+ib-left+ic-left+id-left). Then, the U-right and the U-left are averaged to acquire standard value U-average as in following Expression C2.

$$\text{Standard value } U\text{-average} = (U\text{-right} + U\text{-left})/2 \quad \text{(Expression C2)}$$

When the standard value U-average shown in Expression C2 is substituted to the standard value U of Expression C1, X=k1-average+k2-average*(U-right+U-left)/2 can be acquired. When ia-right to id-right are substituted to U-right and ia-left to id-left are substituted to U-left, a relational expression between the constant k1-average and the constant k2-average can be acquired. Then, through measuring two points or more on the touch panel, the constants k1-average and k2-average can be acquired.

Further, when the standard value V=(ia+ib)/(ia+ib+ic+id) is substituted to Y=k3+k4−(ia+ib)/(ia+ib+ic+id) shown in Expression A2, Expression A2 turns out as following Expression C3.

$$Y = k3 + k4 \cdot V \quad \text{(Expression C3)}$$

As in the case of the standard value U-average, the standard value V-average turns out as follows.

$$\text{Standard value } V\text{-average} = (V\text{-right} + V\text{-left})/2 \quad \text{(Expression C4)}$$

When the standard value V-average shown in Expression C4 is substituted to V of Expression C3, Y=k3-average+k4-average*(V-right+V-left)/2 can be acquired.

When ia-right to id-right are substituted to V-right and ia-left to id-left are substituted to V-left, a relational expression between the constant k3-average and the constant k4-average can be acquired. Then, through measuring two points or more on the touch panel, the constants k3-average and k4-average can be acquired.

Next, explanations will be provided by referring to the flowchart of the program of the third exemplary embodiment shown in FIG. 18. Steps SA00 to SA12 and the flow (SA33 and the like) regarding steps a touch-off judgment are the same as those of FIG. 10 and FIG. 11 of the first exemplary embodiment, so that those are omitted in the flowchart shown in FIG. 18.

First, after a touch-on is judged in step SA15, the first detected position X1[nT], Y1[nT] is calculated based on the first signal fch[nT] (SA16). Subsequently, the second detected position X2[nT], Y2[nT] is calculated based on the second signal (fch[nT]−f[(m−1)T]) (SA17). When calculating the detected positions in steps SA16 and SA17, respectively, k1-conductor to k4-conductor which are calculated by using the ideal indicator that does not include the palm such as a conductor as the indicator are used.

In step SC01, the first detected position X1[nT] and the second detected position X2[nT] calculated in steps SA16 and SA17 are used to be compared with Xth to judge whether or not |X2[nT]−X1[nT]|<Xth applies. Note here that Xth was set as the display unit X-direction size H×3%. The precision for judging whether the touching hand is the left hand or the right hand was 1 to 5% in the case of setting Xth as the size H×3%. Thus, it is preferable to use the value between the size H×1 to 5% in accordance with the desired accuracy.

In a case where step SC01 is TRUE, the procedure is advanced to step SC03 and k1-average to k4-average are substituted to the constants k1 to k4. The purpose for performing steps SC01 and SC03 is for lightening the influence when there is a misjudgment regarding whether the touching hand is the left and or the right hand.

In a case where the comparison in step SC01 is FALSE, the procedure is advanced to step SC02. In a case where X2[nT]<X1[nT], the procedure is advanced to step SC04 and k1-right to k4-right are substituted to the constants k1 to k4. In the meantime, in case where the comparison in step SC02 is FALSE, the procedure is advanced to step SC05 and k1-left to k4-left are substituted to the constants k1 to k4.

As described, after selecting the values to be substituted to the constants k1 to k4 in steps SC03 to SC05, the cycle i is counted up (SC06).

Subsequently, a signal f[iT] is acquired (SC07). In step SC08, the first detected position X1[iT], Y1[iT] is calculated based on the first signal fch[iT]. Here, the position is calculated by using the constants k1 to k4 to which the numerical values are substituted in steps SC03 to SC05. Subsequently, the first detected position X1[iT], Y1[iT] calculated in step SC08 is substituted to a following third detected position X3[iT]=X1[iT], Y3[iT]=Y1[iT] (SC09).

Further, the third detected position may also be acquired in the same manner as that of step SA31 of the first exemplary embodiment. X3[iT]=X1[iT]+X2[nT]−X1[nT] (SA31). This is also the same for Y3[iT], so that depiction thereof is omitted herein. Further, X1[nT] is calculated by using k1-conductor to k4-conductor in step SA16. However, through acquiring X1[nT] by using the constants k1 to k4 to which the numerical values are substituted in steps SC03 to SC05 and through calculating X3[iT] by substituting it to Expression of step SA31, the error in the detected position immediately after a touch judgment can be corrected. Subsequently, the cycle i is counted up in step SC10, and the procedure is returned to step SC07.

The use of the program according to the third exemplary embodiment makes it possible to perform a correction while taking the influence of the palm by using the finger for the indicator into account in advance, so that there is an effect of being able to detect an accurate position even after a drag operation is conducted.

Example 1

Figure 19:
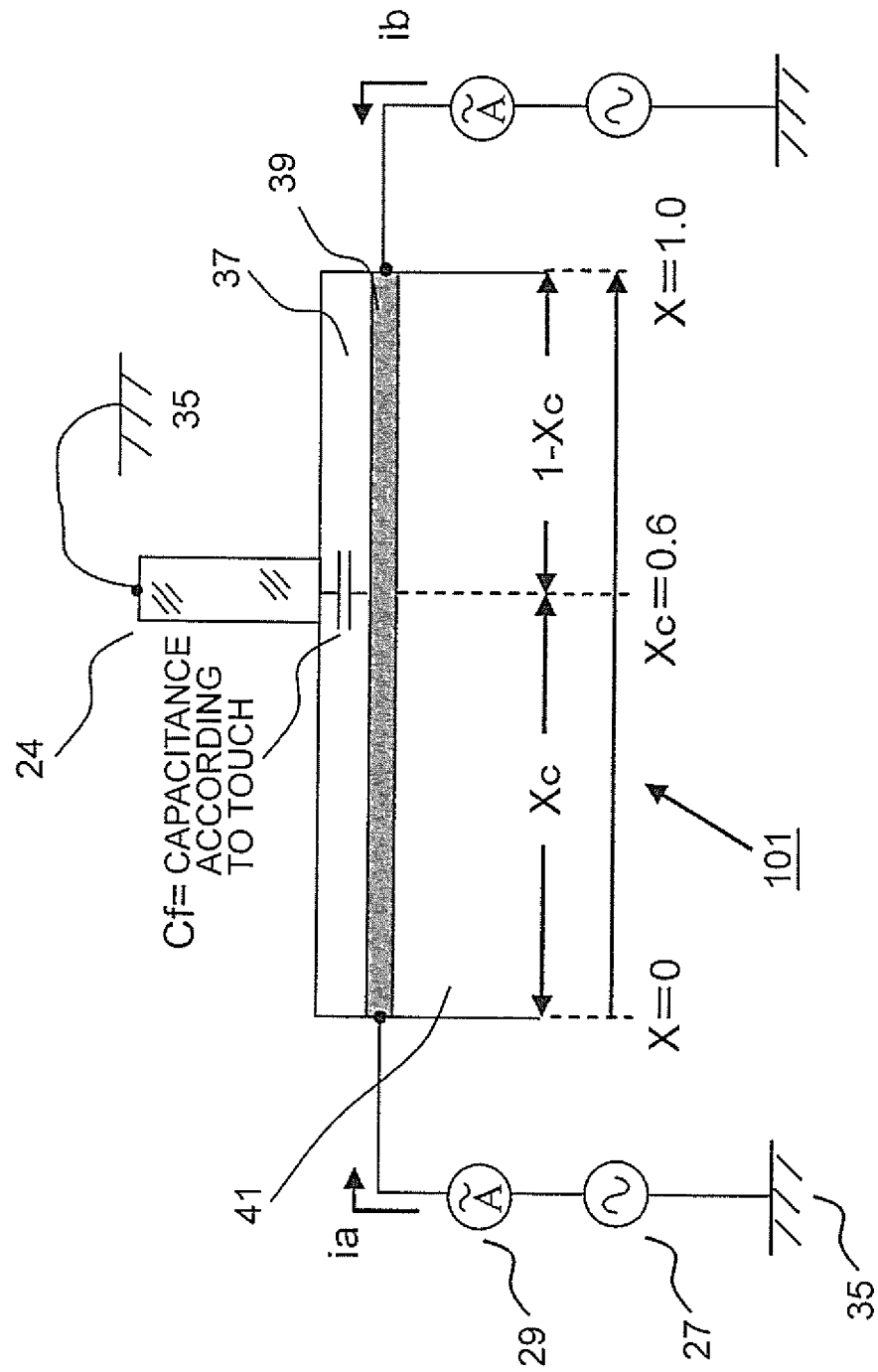
FIG. 19 is a model chart showing one-dimensional position detection in a case where a conductor is used for an indicator in EXAMPLE 1.

In EXAMPLE 1, a numerical expression showing the relation between a current flown in the transparent conductive layer and the position coordinate is derived. Note here that the principle of an analog (surface) capacitive type one-dimensional position calculation is used. While the position coordinate is depicted by using the X coordinate for convenience, it is also possible to calculate the Y coordinate with the calculation method that is same as the method used for the X coordinate. FIG. 19 is a side view showing the one-dimensional principle. In FIG. 19, an ideal indicator (conductor) having no influence of the approach of the palm is used for an indicator 24.

(Calculation of Position when Using Ideal Indicator)

Referring to FIG. 19, a transparent conductive layer 39 is formed on an insulating transparent substrate 41, the coordinate in the left end of the transparent conductive layer 39 is defined as X=0, and the coordinate in the right end is defined as X=1. The impedance on both ends of the transparent conductive layer 39 is defined as R. A current detection circuit 29 and an oscillator 27 are connected in series to each of the both ends of the transparent conductive layer 39. A protection layer 37 is provided on the transparent conductive layer 39. When the indicator 24 touches the surface of the protection layer 37, a capacitance Cf is formed between the indicator 24 and the transparent conductive layer 39 via the protection layer 37. A cuboid shaped indicator is used for the indicator 24 of FIG. 19, and a low-impedance material such as copper is used for the conductor. The upper end of the indicator 24 is connected to a reference potential (GND) 35 of the current detection circuit 29.

Provided that the region of the display unit is defined as X=0.1 to 0.9 and the coordinate of the point touched by the indicator 24 is X, the range of X is X=0.1 to 0.9. In the regions X=0 to 0.1 and 0.9 to 1.0, which are outside of the display region, the protection layer 37 is formed on the transparent conductive layer 39 and the surface of the protection layer 37 is exposed to the outside as in the case of the region of the display unit.

The distance from the left end (X=0) of the transparent conductive layer 39 to the coordinate (Xc) of the point touched by the indicator 24 is Xc, and the impedance Ra of the transparent conductive layer 39 between those is Ra=R*Xc. In the meantime, the distance from the right end (X=1) of the transparent conductive layer 39 to the coordinate (Xc) of the point touched by the indicator 24 is (1−Xc), and the impedance Rb of the transparent conductive layer 39 between those is Rb=(1−Xc)*R.

Figure 20:
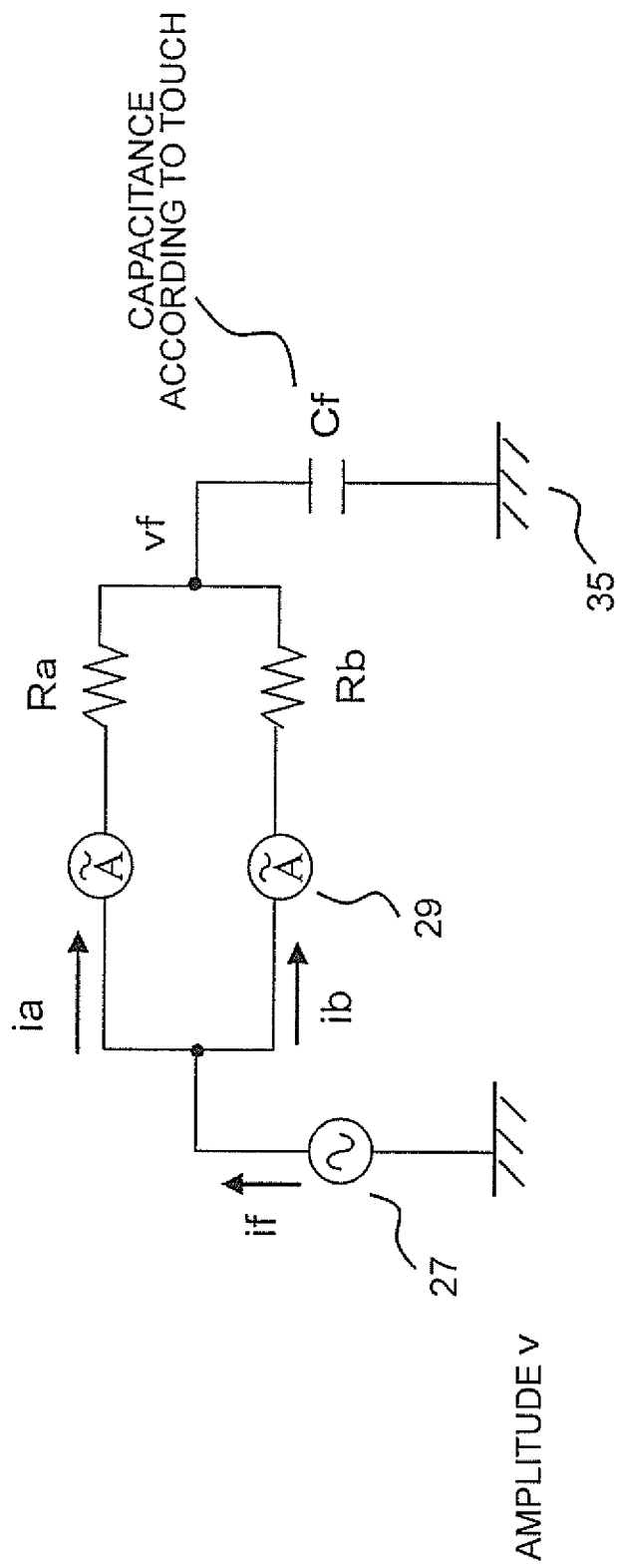
FIG. 20 is an equivalent circuit diagram in the case of the one-dimensional position detection in EXAMPLE 1.

FIG. 20 shows an equivalent circuit diagram corresponding to FIG. 19. The amplitude of the output of the oscillator 27 is defined as v, the frequency is defined as f, and the amplitudes of the currents detected by the current detection circuits 29 are defined as ia, ib, respectively.

Note here that Ra and Rb are connected in parallel, and the current ia flows in Ra and the current ib flows in Rb.

Then, numerical expressions for acquiring the detected position based on the detected ia and ib are derived. The impedance of the capacitance Cf generated according to a touch is $1/(j*\omega*Cf)$. Note here that w is an angular frequency, and $\omega=2*\pi*f$. Note here that j is an imaginary number. The compound resistance of the parallel circuit of Ra and Rb is Ra//Rb. That is, Ra//Rb=(Ra*Rb)/(R+Rb). Then, the impedance of the current detection circuits 29 connected in series to Ra and Rb, respectively, are approximated to 0. $1/(j*\omega*Cf)$ and Ra//Rb are connected in series, so that the series impedance becomes $1/(j*\omega*Cf)$+Ra//Rb. $1/(j*\omega*Cf)$+Ra//Rb is the entire impedance of the equivalent circuit diagram, and the output v of the oscillator 27 is added thereto so that v=if$\{1/(j*\omega*Cf)$+Ra//Rb$\}$ applies. Note here that if is the current flown in the entire equivalent circuit diagram, and if=ia+ib. Following Expression K1 applies for if.

$$if=v/\{1/(j*\omega*Cf)+Ra//Rb)\} \quad \text{(Expression K1)}$$

Then, when the voltage applied to $1/(j*\omega*Cf)$ is defined as vf, the voltage applied to Ra//Rb is (v−Vf). From the relation with respect to the flowing current if, following Expression K2 applies.

$$v-vf=if*Ra//Rb \quad \text{(Expression K2)}$$

Further, v−vf is applied to Ra and Rb, respectively, so that following Expressions K3 and K4 apply.

$$v-vf=ia*Ra \quad \text{(Expression K3)}$$

$$v-vf=ib*Rb \quad \text{(Expression K4)}$$

From Expression K1 to K3, following Expression K5 can be acquired when if and vf are eliminated.

$$ia=v/\{1/(j*\omega*Cf)+Ra//Rb)\}*\{Rb/(Ra+Rb)\} \quad \text{(Expression K5)}$$

Assuming here that Ra=Rb=500Ω, f=100 kHz, and Cf=6 pF, Ra//Rb=250Ω, $|1/(j*\omega*Cf)|\approx 265Ω$, and Ra//Rb<<1/(j*ω*Cf). From Expression K5, it is approximated to $1/(\omega*Cf)$+Ra//Rb≈$1/(\omega*Cf)$. When Ra=R*Xc, Rb=R*(1−Xc) are substituted, Expression K6 of ia is derived.

$$ia=\omega*Cf*v*\{Rb/(Ra+Rb)\}=\omega*Cf*v(1-Xc) \quad \text{(Expression K6)}$$

Regarding ib, following Expression K7 of ib can also be derived in the same manner.

$$ib=\omega*Cf*v*\{Ra/(Ra+Rb)\}=\omega*Cf*v*Xc \quad \text{(Expression K7)}$$

Then, when Expression K6 and Expression K7 are substituted to ib/(ia+ib), following Expression K8 can be acquired.

$$ib/(ia+ib) \quad \text{(Expression K8)}$$

From Expression K8, it is possible to calculate the position coordinate Xc based on ia and ib detected by the current detection circuits 29. Expression K8 does not contain the capacitance Cf generated according to a touch. Thus, the difference in the capacitance Cf generated according to the touch does not influence the position coordinate Xc.

(Derivation of Numerical Expression of First Detected Position)

Figure 21:
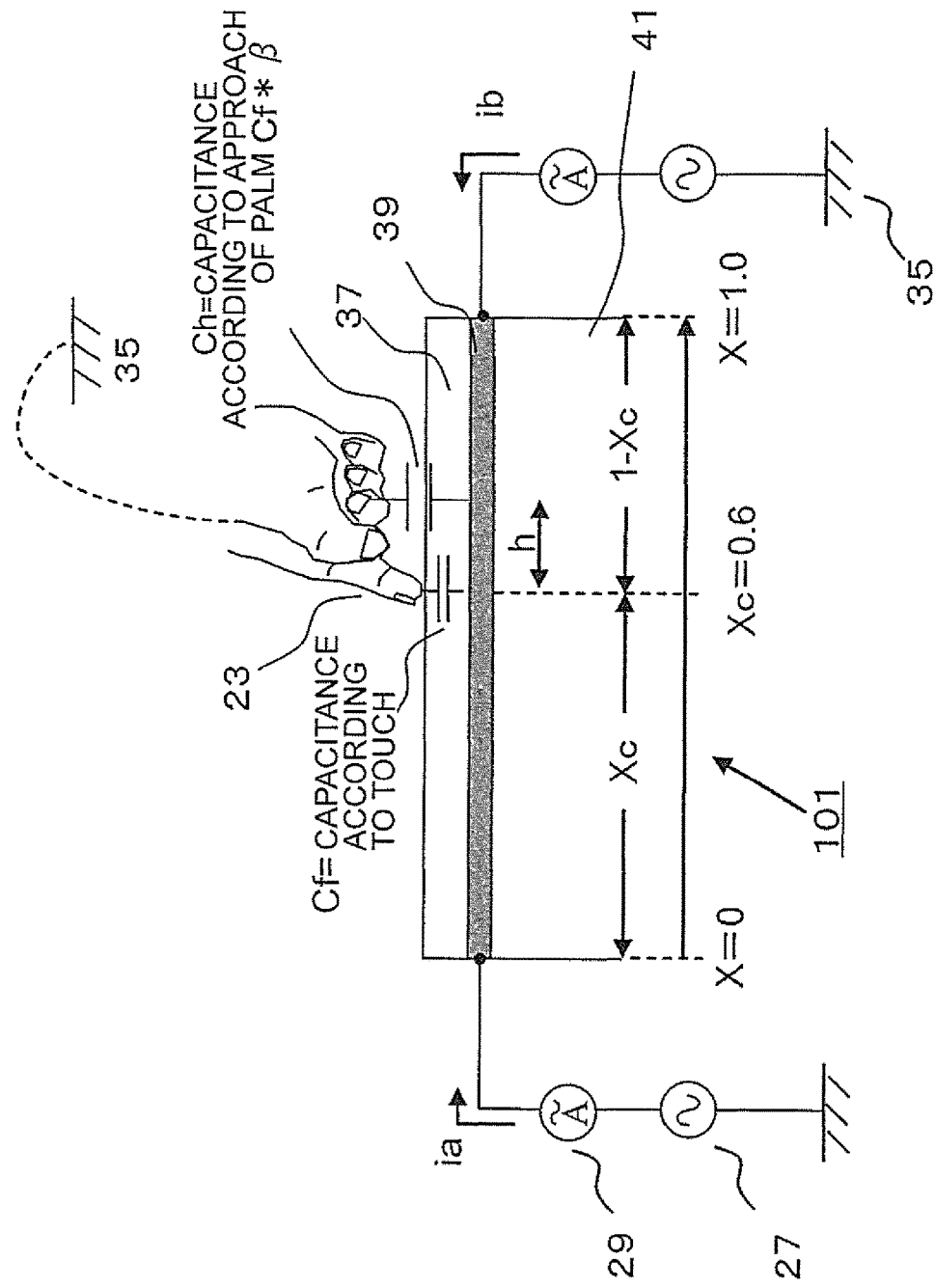
FIG. 21 is a model chart showing one-dimensional position detection in a case where a touch panel is touched by a fingertip in EXAMPLE 1.

Next, a numerical expression of the first detected position influenced by the palm when a touch is made by a finger is derived. FIG. 21 is the side view showing one-dimensional position detection when a touch is made by a finger. The point on the surface of the protection layer 37 at which the fingertip touches is defined as X. Only the part required for overcoming the issue is extracted from the influence generated due to the approach of the human body other than the fingertip and put into an abstraction (put into a model) as follows. The capacitance generated according to the contact of the fingertip is defined as Cf, and the capacitance Ch generated according to the approach of the palm is defined as a value given by following Expression K11.

$$Ch=Cf*\beta \quad \text{(Expression K11)}$$

Note here that $\beta$ is a coefficient of Cf. Provided that it is defined that the palm is away from the fingertip by h when the position of the fingertip is Xc, the position of the palm is Xc+h. Specifically, as shown in FIG. 21, when the touching hand is the right hand, h is a positive value. When the touching hand is the left hand, h is a negative value. Further, the value of h also depends on the size and the like of the palm of the person who touches the panel.

Figure 22:
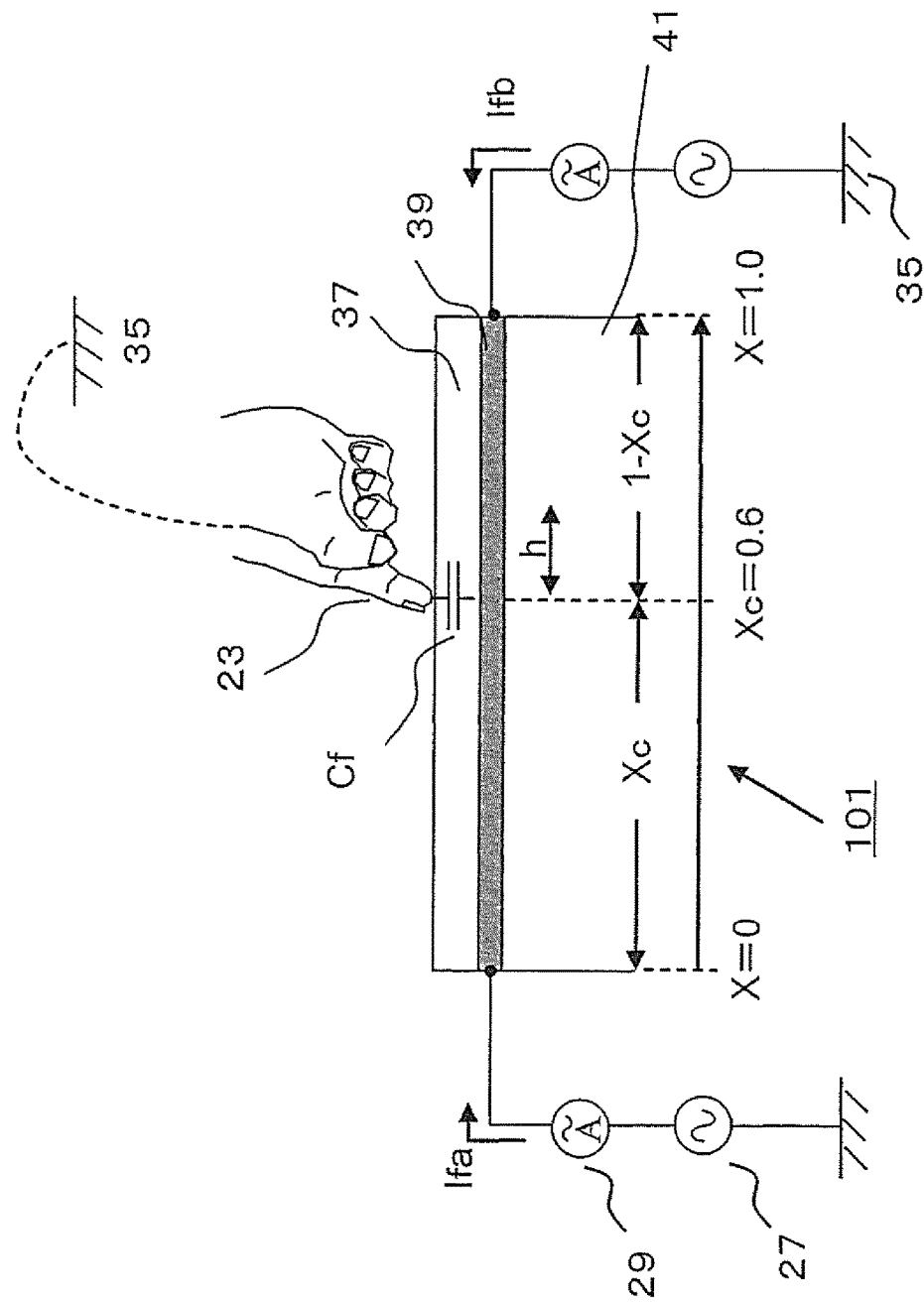
FIG. 22 is a model chart when calculating a current component generated in accordance with a contact of the fingertip in EXAMPLE 1.

The current generated according to the contact of the fingertip and the current generated according to the approach of the palm are contained in ia and ib to be detected. First, currents ifa and ifb generated according to the contact of the fingertip are calculated by eliminating the capacitance Ch generated according to the approach of the palm from FIG. 21 (FIG. 22). As in the case of Expression K6 of ia, ifa can be expressed as in following Expression K20.

$$ifa=\omega*Cf*v*(1-Xc) \quad \text{(Expression K20)}$$

Similarly, ifb can be expressed as in following Expression K21 as in the case of Expression K7 of ib.

$$ifb=\omega*Cf*v*Xc \quad \text{(Expression K21)}$$

Figure 23:
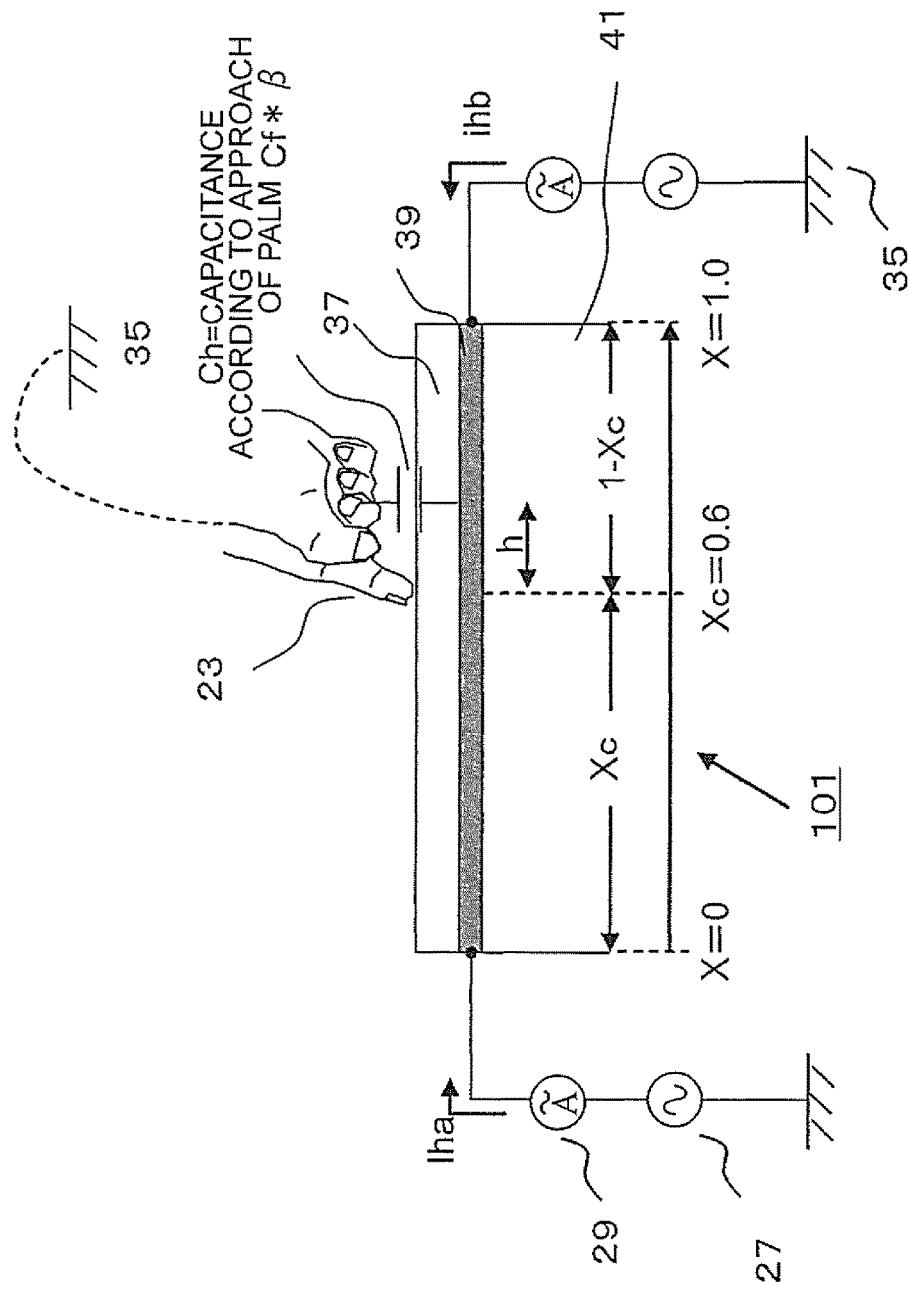
FIG. 23 is a model chart when calculating a current component generated in accordance with an approach of the palm in EXAMPLE 1.

Then, the capacitance Cf generated according to the touch of the fingertip shown in FIG. 21 is eliminated to calculate the currents iha and ihb generated according to the approach of the palm (FIG. 23). When Cf is replaced with Ch and Xc is replaced with (Xc+h), iha can be expressed as in following Expression K22 from Expression K6.

$$iha=\omega*\beta*Cf*v*(1-Xc-h) \quad \text{(Expression K22)}$$

From Expression K7, ihb can be expressed as in following Expression K23.

$$ihb=\omega*\beta*Cf*v*(Xc+h) \quad \text{(Expression K23)}$$

The current to be detected is the sum of the current generated according to the contact of the fingertip and the current generated according to the approach of the palm. Therefore, following Expression K24 and Expression K25 apply.

$$ia=ifa+iha \quad \text{(Expression K24)}$$

$$ib=ifb+ihb \quad \text{(Expression K25)}$$

When Expression K20 and Expression K22 are substituted to Expression K24, ia can be expressed as in following Expression K26.

$$ia=\omega*Cf*v*\{1+\beta-\beta*h-Xc(1+\beta)\} \quad \text{(Expression K26)}$$

When Expression K21 and Expression K23 are substituted to Expression K25, ib can be expressed as in following Expression K27.

$$ib=\omega*Cf*v*\{Xc+\beta(X+h)\} \quad \text{(Expression K27)}$$

When Expression K26 and Expression K27 are substituted to ib/(ia+ib), following Expression K28 of the first detected position X1 influenced by the palm can be acquired.

$$ib/(ia+ib)=Xc+(\beta*h)/(1+\beta)=X1 \quad \text{(Expression 28)}$$

Referring to Expression K28, since the position of the fingertip is Xc, it can be seen that the position is shifted by $(\beta*h)/(1+\beta)$ with respect to Xc according to the approach of the palm. $\beta$ and h used in $(\beta*h)/(1+\beta)$ are elements showing the influence generated according to the approach of the palm. Thus, it can be seen that the position shift depends on the elements $\beta$ and h which show the influence generated according to the approach of the palm.

(Derivation of Detected Position Using Patent Document 3)

Next, a numerical expression of the second detected position to which the technique depicted in paragraphs 0163 to 0188 of Patent Document 3 is employed for the position shift generated according to the approach of the palm will be derived. The measure depicted in Patent Document 3 is to estimate the signal generated according to the approach of the palm based on the tendency of the gradual change of the signal, before the fingertip makes a contact. Specifically, after the contact of the fingertip, the position is calculated based on the numerical value acquired by subtracting the signal generated according to the approach of the palm from the acquired signal.

While the position coordinate at which the fingertip makes contact is defined as Xc, the position after a touch-on judgment is defined as Xo. A case where Xc=Xo is when the position coordinate returns again to the original position coordinate even if the position coordinate changes once after a drag operation is conducted immediately after the touch-on judgment. The purpose for defining the variables of the positions separately as Xc and Xo is as follows. That is, while the position coordinate Xc of the fingertip can be changed arbitrarily after the drag operation, the position of the fingertip when estimating the signal generated according to the approach of the palm necessarily becomes the position Xo that is the position immediately after the touch so that the change after the drag operation is impossible, and Xc and Xo are not necessarily consistent.

Figure 24:
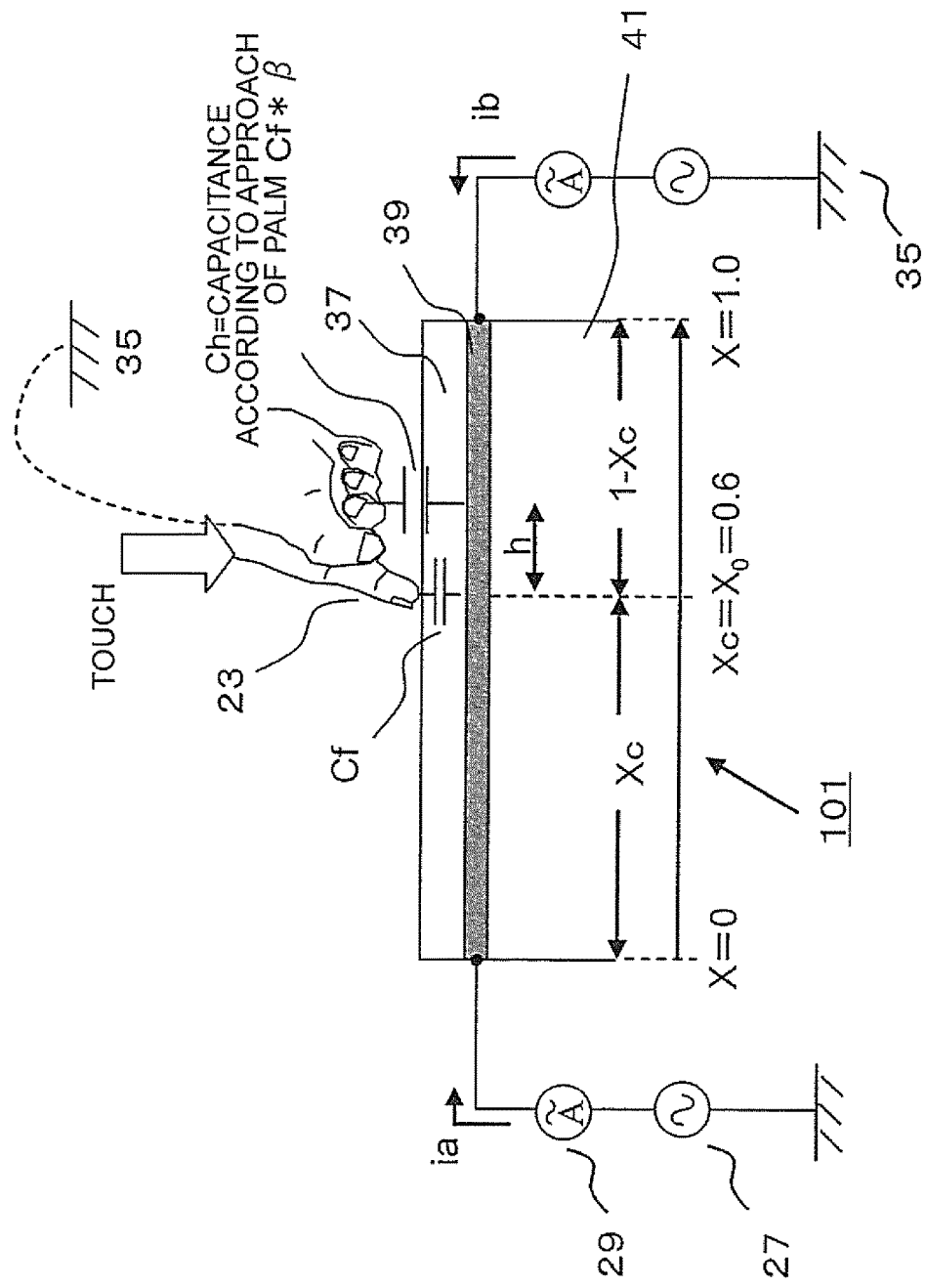
FIG. 24 is a model chart when calculating the position immediately after a touch in EXAMPLE 1.
Figure 25:
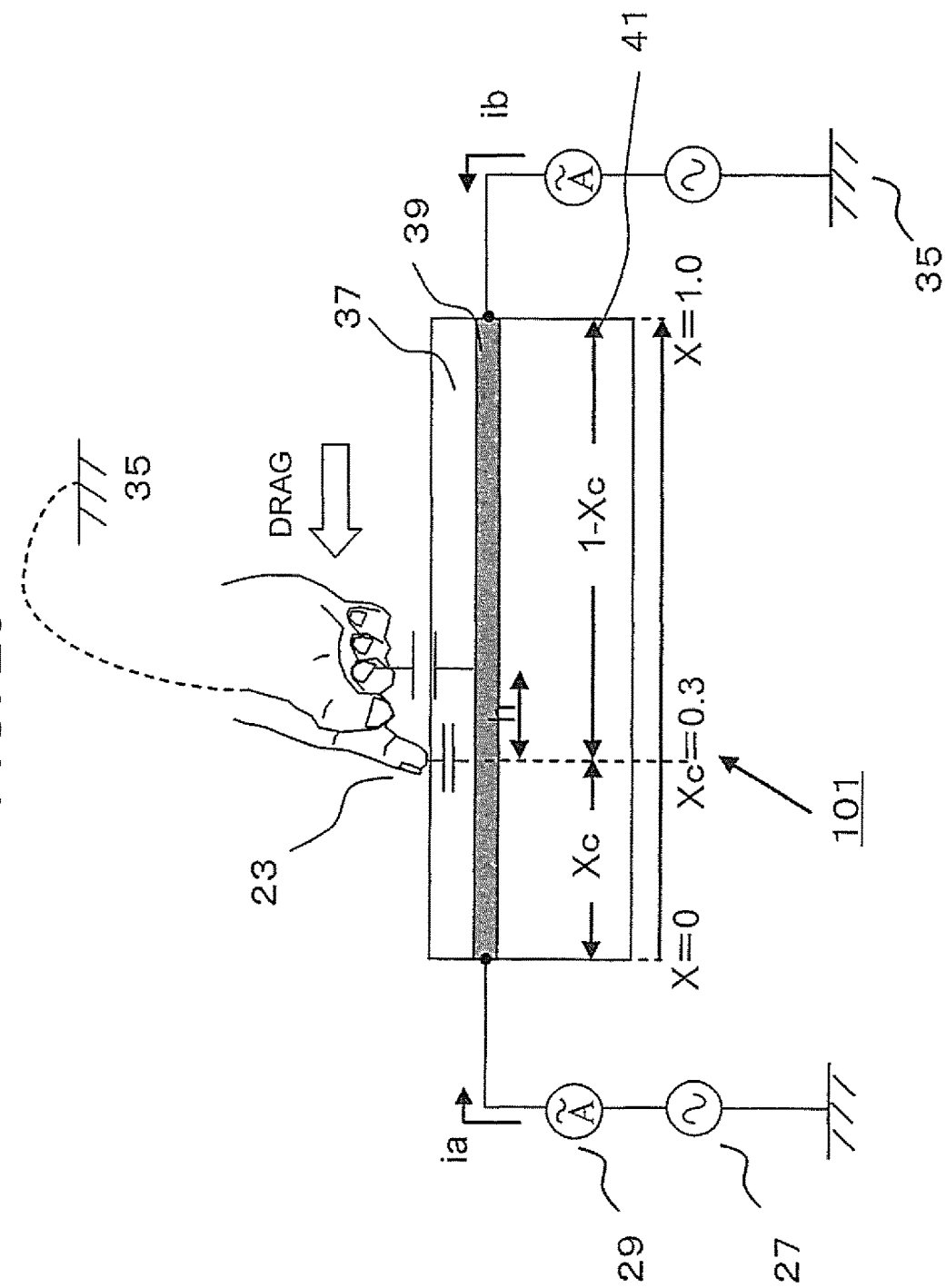
FIG. 25 is a model chart when calculating the position immediately after a drag in EXAMPLE 1.

FIG. 24 is a side view immediately after a touch (Xo=0.6), and FIG. 25 is a side view after a drag operation (Xc=0.3). The current iha(Xo) generated according to the approach of the palm immediately after the touch is acquired. Note here that iha(Xo) is a function of Xo, When Xc=Xo is substituted to Expression K22, following Expression K30 can be acquired.

$$iha(Xo)=\omega*\beta*Cf*v*(1-Xo-h) \quad \text{(Expression K30)}$$

When iha(Xo) shown in Expression K30 is subtracted from ia(X) shown in Expression K26, following Expression K31 can be acquired.

$$ia(Xc)=\{ifa(Xc)+iha(Xc)\}-iha(Xo)=\omega*Cf*v(1-Xc-\beta*Xc+\beta*Xo) \quad \text{(Expression K31)}$$

Regarding ib(x), following Expression K32 is also acquired in the same manner.

$$ib(Xc)=\omega*Cf*v*(C+\beta*Xc-\beta*Xo) \quad \text{(Expression K32)}$$

When Expression K31 and Expression K32 are substituted to ib(Xc)/{ia(X)+ib(Xc)}, following Expression K33 of the second detected position X2 can be acquired.

$$ib(Xc)/\{ia(Xc)+ib(Xc)\}=Xc+\beta(Xc-Xo)=X2 \quad \text{(Expression K33)}$$

(Comparison Regarding Numerical Expressions of Positions)

Next, the numerical expressions derived in EXAMPLE 1 are put into a graph, and effects and issues thereof will be described. The lateral axis of FIG. 26 is the set position Xc, and the longitudinal axis is the detected position acquired by the numerical expressions.

Figure 26:
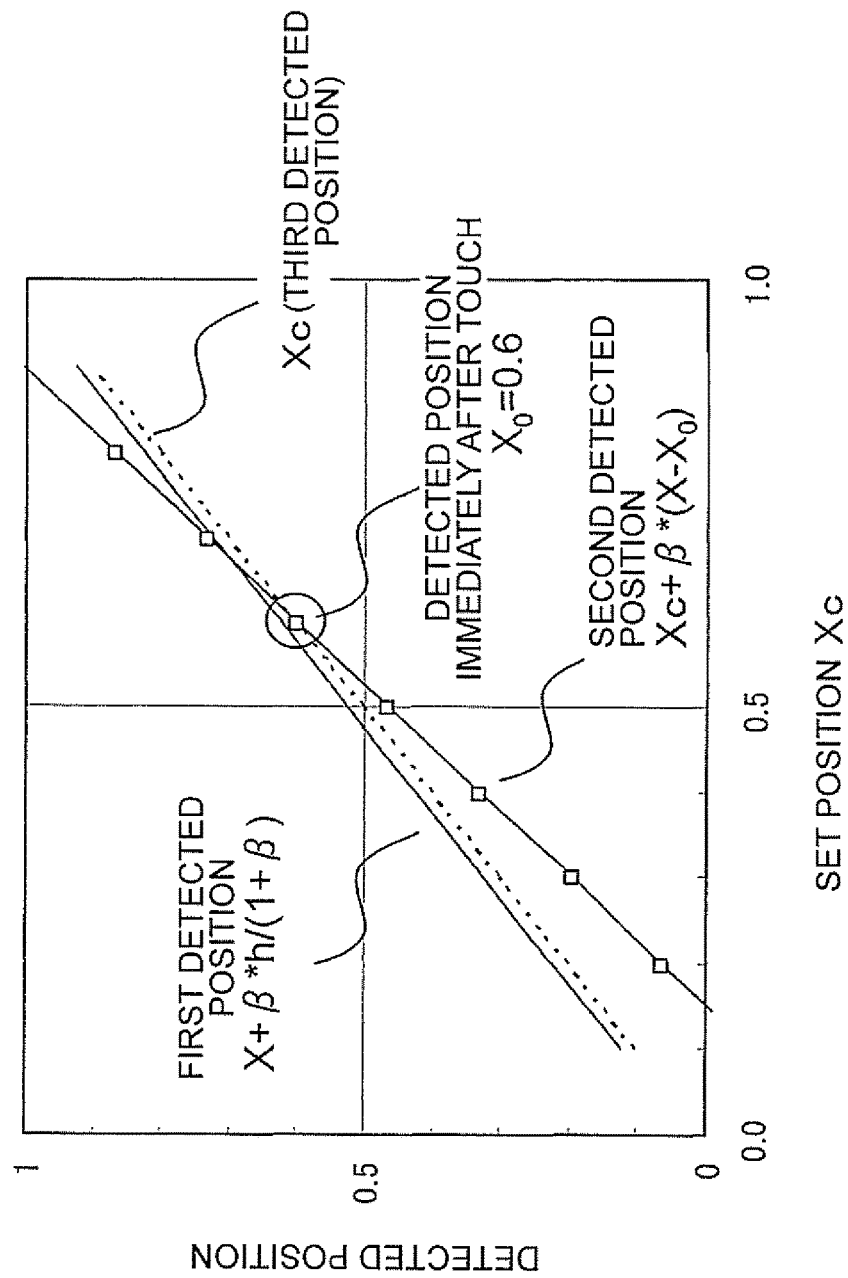
FIG. 26 is a graph showing the relation between the set position and the calculated position in EXAMPLE 1.

FIG. 26 shows the case of using the conductor for the indicator 24 of Expression K8, in which shown are the calculation expression Xc of the accurate position, the first detected position Xc+$(\beta*h)/(1+\beta)$ influenced by the palm shown in Expression K28, and the second detected position Xc+$\beta$(Xc-Xo) shown in Expression K33. Note here that it was so defined that β=0.5, h=0.1, and the initial position was Xo=0.6. Referring to Expression K33, in a case where Xc=Xo at the second detected position, ib(Xo)/{ia(Xo)+ib(Xo)}=Xo applies, which is consistent with the accurate position. However, as the set Xc leaves away from Xo, the second detected position X2 is largely shifted from the accurate position Xc. While the position shift immediately after a touch can be overcome, the position shift is rather worsened when a drag operation is conducted after the touch compared to the position Xc+(β*h)/(1+β) influenced by the palm shown in Expression K28.

(Numerical Expression of Third Detected Position Shown in First Exemplary Embodiment)

Next, numerical expressions of the position when using the algorithm shown in the flowcharts of FIG. 10 and FIG. 11 will be derived. The third detected position X3[iT] of the flowcharts are expressed by following Expression K34 depicted in step SA31.

$$X3[iT]=X1[iT]+X2[nT]-X1[nT] \quad \text{(Expression K34)}$$

Next, X1[iT], X2[nT], and X1[nT] in Expression K34 are acquired individually. At time nT where a touch-on is judged, the first detected position X1[nT] influenced by the palm is expressed as X1[nT]=Xo+(β*h)/(1+β) by substituting Xc=Xo to Expression K28. The second detected position calculated by eliminating the signal generated according to the approach of the palm is expressed as X2[nT]=Xo by substituting Xc=Xo to Expression K33. The first detected position influenced by the palm at time iT is expressed as X1[iT]=Xo+(β*h)/(1+β) from Expression K28. When X1[iT], X2[nT], and X1[nT] are substituted to Expression K34, the third detected position X3[iT] can be acquired by following Expression K35.

$$X3[iT]=\{Xc+(\beta*h)/(1+\beta)\}+Xo-\{Xo+(\beta*h)/(1+\beta)\}=Xc \quad \text{(Expression K35)}$$

The element according to the approach of the palm is eliminated from Expression K35, and it proves that the position at which the finger is touching can be calculated accurately even when the set position changes because a drag operation is conducted after the touch.

Example 2

First, the outline of EXAMPLE 2 will be described by referring to FIG. 1. A first conductor imitating a fingertip is used as the indicator 10, and a second conductor imitating a palm is used as the accompanying part 10a. Then, the first conductor is brought to make a contact with the surface of the touch panel 101, and the second conductor is brought close to the surface of the touch panel 101 at the same time. Through conducting a drag operation of the first conductor on the surface of the touch panel 101 to change the position of the first conductor, and the third detected position 18 calculated in that state is taken as an estimated value. Further, the change of the third detected position 18 calculated by sufficiently isolating the second conductor from the surface of the touch panel 101 is taken as a shift value. At this time, a following inequality applies for the relation regarding the actually measured value, the estimate value, and the shift value of the third detected position 18.

|(Actually Measured Value−Estimate value)/Shift value|<0.5

Hereinafter, EXAMPLE 2 will be described in more details.

Figure 27:
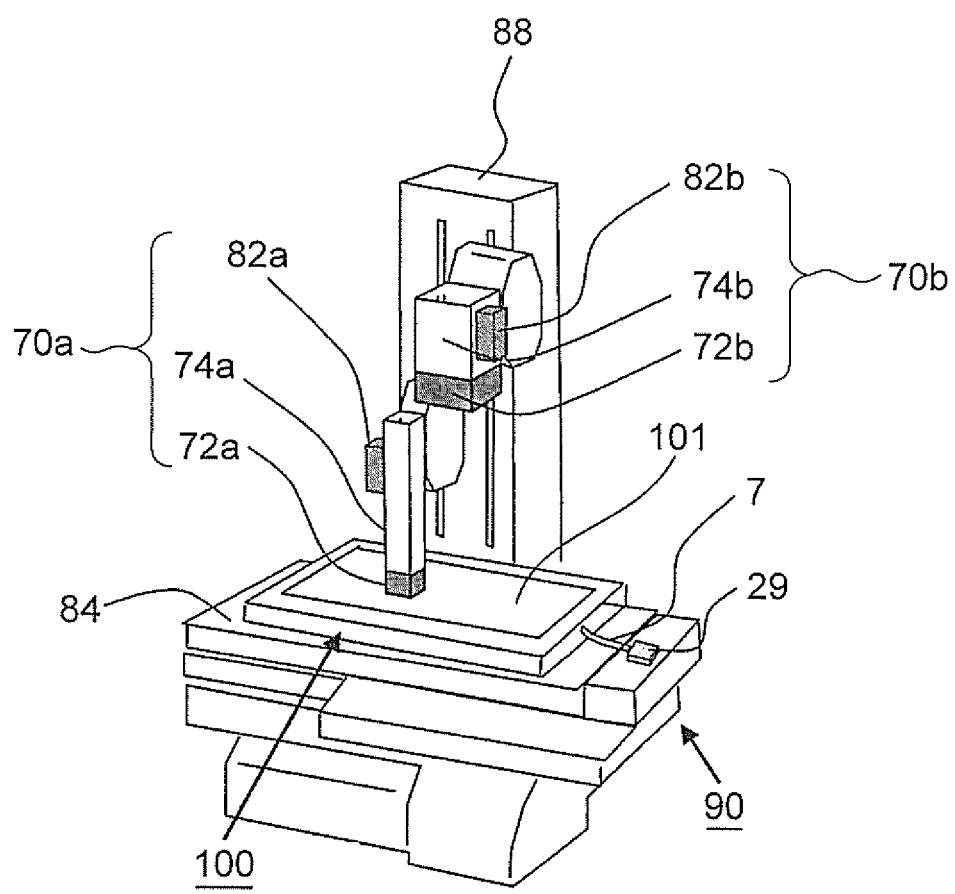
FIG. 27 is a perspective view showing an inspection device used in EXAMPLE 2.

In EXAMPLE 2, the function of the position correction using the algorithm shown in FIG. 10 and FIG. 11 depicted in the first exemplary embodiment was examined. FIG. 27 shows the perspective view of the inspection device used for the examinations. Perspective views for describing the actions of the inspection device are shown in FIG. 28 and FIG. 30 to FIG. 32, respectively. The variables defined in EXAMPLE 1 are used also in EXAMPLE 2.

An inspection device 90 is mainly constituted with a stage 84 and an arm 88. The touch sensor device 100 called a touch panel display is placed on the stage 84 while the surface side of the touch panel 101 being faced up. The algorithm shown in FIG. 10 and FIG. 11 depicted in the first exemplary embodiment is loaded on the touch panel 101 that is loaded on the touch sensor device 100.

The arm 88 includes a built-in AC motor (not shown) for bringing up and down an indicator 70a imitating a fingertip. A tip part 72a of the indicator 70a and the ground (reference potential node) of the circuit of the inspection device 90 are electrically connected. The indicator 70a can be brought down until the bottom surface of the tip part 72a comes in contact with the surface of the touch panel 101.

The surface of a main body part 74a of the indicator 70a imitating the fingertip exhibits the insulating characteristic. A distance sensor device 82a is attached to the side face of the main body part 74a. The distance sensor device 82a measures the distance La from the surface of the touch panel 101 to the bottom surface of the tip part 72a. Through moving the stage 84 in the plane direction, the position coordinate (Xc, Yc) of the indicator 70a on the touch panel 101 can be designated arbitrarily.

A micro controller (not shown) is built-in to the inspection device 90. By a program loaded to the micro controller, controls of the move of the stage 84 in the plane direction, controls for bringing up and down the indicator 70a, measurements of the distance La from the surface of the touch panel 101 to the bottom surface of the tip part 72a by using the distance sensor device 82a, and measurements of the currents by using the current detection circuits 29 can be automatically controlled.

The size of the bottom surface of the tip part 72a of the indicator 70a imitating the fingertip (the first conductor) was set as 6 mm☐. Further, the arm 88 also supports the indicator 70b imitating the palm (the second conductor). Like the indicator 70a imitating the fingertip, the indicator 70b imitating the palm also includes a tip part 72b, a main body part 74b, and a distance sensor device 82b. The size of the bottom surface of the indicator 70b imitating the palm was set as 100 mm☐. The distance sensor device 82b measures the distance Lb from the surface of the touch panel 101 to the bottom surface of the tip part 72b.

First, the capacitance was measured while changing the distance La (Lb) from the touch panel 101 to the indicator 70a (70b). Note here that the capacitance is proportional to the total value of the currents flown in the transparent conductive layer 39 of the touch panel 101. For measuring the currents flown in the transparent conductive layer of the touch panel 101, the touch panel 101 is connected to the inputs of the current detection circuits 29 via the FPC 7. The currents flown in the transparent conductive layer of the touch panel 101 are measured by using the current detection circuits 29. Normally, the FPC 7 is connected to the currents detection circuits 29 within the touch sensor device 100 in a case where the touch sensor device 100 is used.

Figure 28:
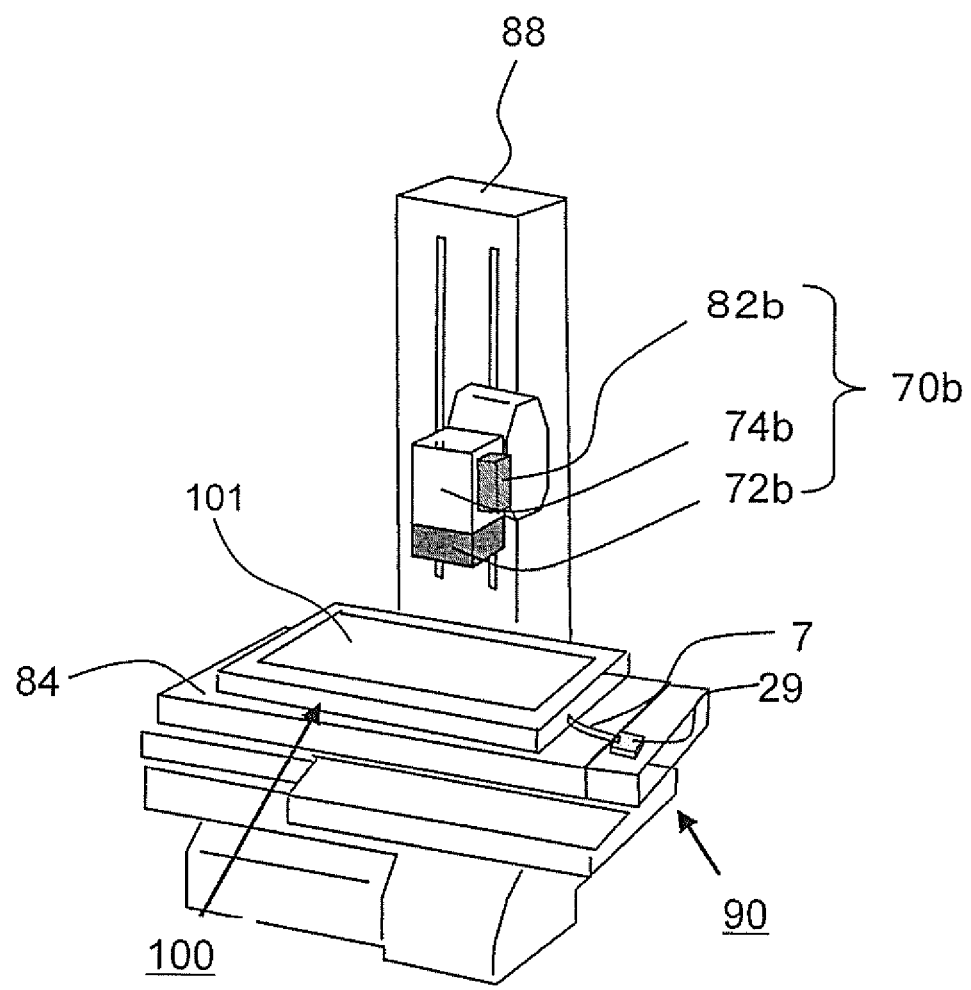
FIG. 28 is a perspective view showing the inspection device at the time of measuring the capacitance by using a detection circuit for each indicator in EXAMPLE 2.
Figure 29:
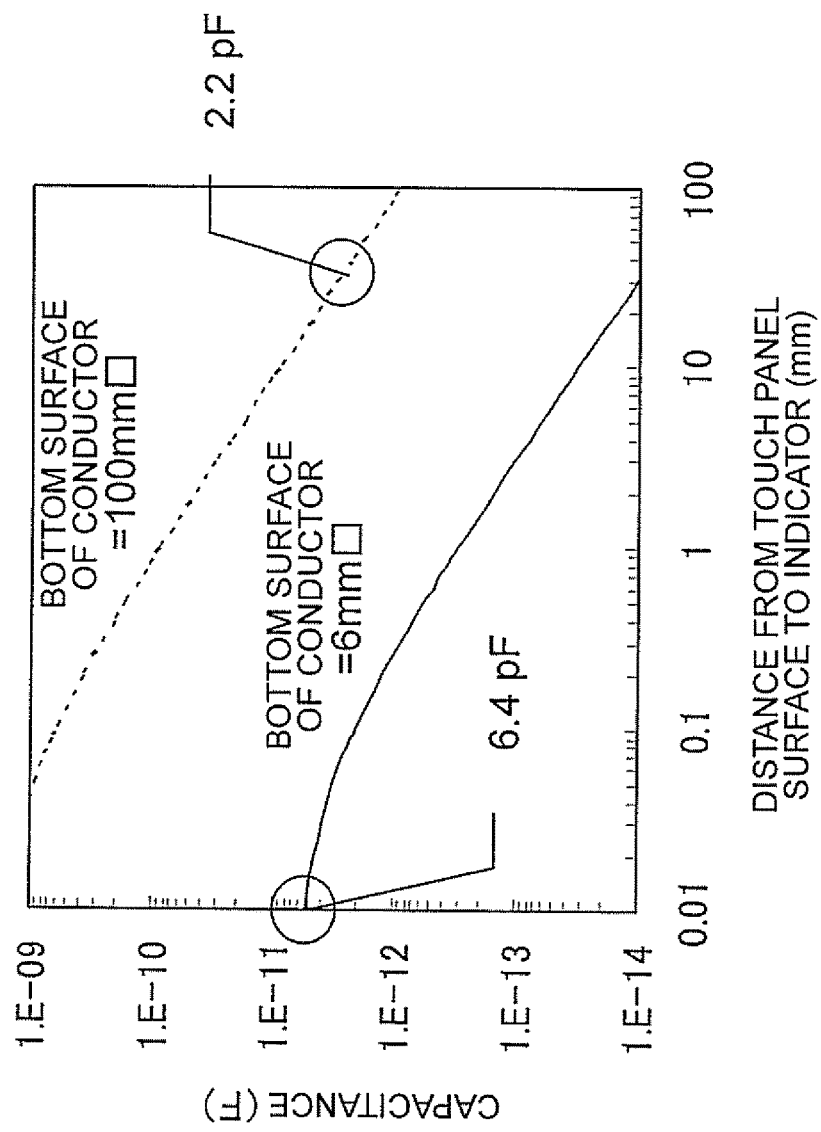
FIG. 29 is a graph showing the relation between the distance from the indicator to the touch panel surface and the capacitance in EXAMPLE 2.

First, in order to ignore the influence of the indicator 70a as shown in FIG. 28, the indicator 70a was detached from the arm 88 and brought away from the touch panel 101 sufficiently to evaluate the indicator 70b. The capacitance was measured based on the currents measured by the current detection circuits 29 at the distance Lb by bringing down the indicator 70b. Measurements were also conducted for the indicator 70a also by detaching the indicator 70b. FIG. 29 shows the measurement results. The longitudinal axis of FIG. 29 shows the capacitance, and the lateral axis shows the distances La, Lb. When the indicator 70a touched the surface of the touch panel 101 (La=0 mm), the capacitance was 6.4 pF. When the indicator 70b made an approach to the point where Lb=40 mm from the touch panel 101, the capacitance was 2.2 pF. From Expression K11, it was calculated as $\beta=Ch/Cf=2.2$ pF/6.4 pF=0.34. The measurement results of the capacitance shown in FIG. 29 depends on the distance from the indicators 70a, 70b to the transparent conductive layer, namely the surface structure of the touch panels 101 such as the thickness of the protection layer 37 (FIG. 5).

The influence generated due to the approach of the palm depends on the extent of the capacitance formed between the indicator 70b imitating the palm and the touch panel 101. The capacitance generated according to the approach of the palm depends on the contact area of the indicator 70b imitating the palm and the distance between the indicator 70b and the touch panel 101. Therefore, the influence generated according to the approach of the palm is an issue that does not depend on the change in the push pressure between the touch panel 101 and the indicator 70b imitating the fingertip. Specifically, even when the push pressure is kept zero or the push pressure is increased in a short period immediately after a touch, there is no change in the issue of the influence generated according to the approach of the palm.

Next, both the indicator 70a and the indicator 70b are attached to the arm 88. Note here that the layout relation of the indicator 70a and the indicator 70b in the X direction was set as h=0.1. The relation where the height of the indicator 70b is higher than the indicator 70a by 40 mm at all times is maintained.

Figure 30:
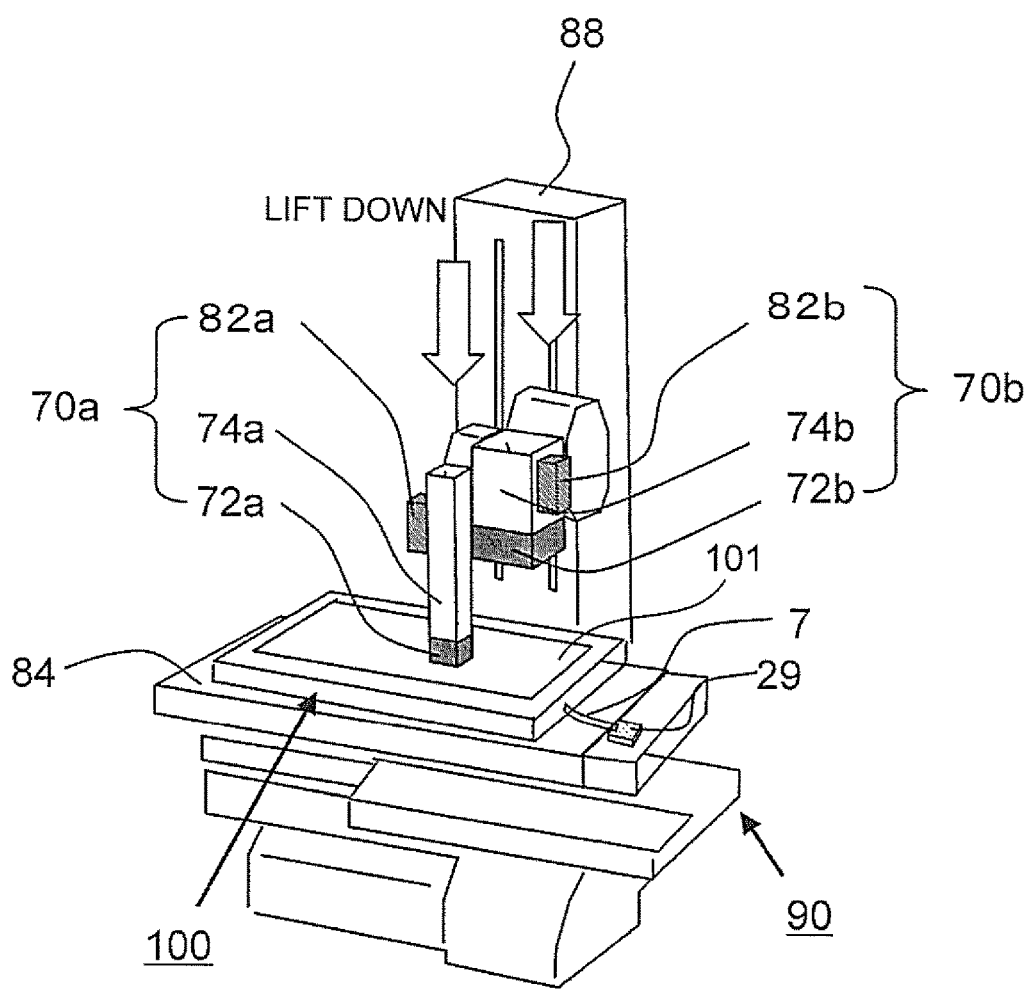
FIG. 30 is a perspective view showing a state where a touch is made (Xo=0.6) by using the inspection device in EXAMPLE 2.

As shown in FIG. 30, the indicator 70a was brought in contact with the surface of the touch panel 101 (La=0 mm) and the indicator 70b was brought down to approach the touch panel 101 (Lb=40 mm) in association with that. The position coordinate of the indicator 70a was set as Xo=0.6 (step 1). Immediately after the indicator 70a touched the surface of the touch panel 101, the pointer (the third detected position) on the touch panel 101 matched the position Xo=0.6 corresponding to the indicator 70a. Thus, it was verified that the detected position immediately after the touch was accurate. FIG. 33 shows the table of the lists of the results of the detected positions acquired by using the inspection device 90.

Figure 31:
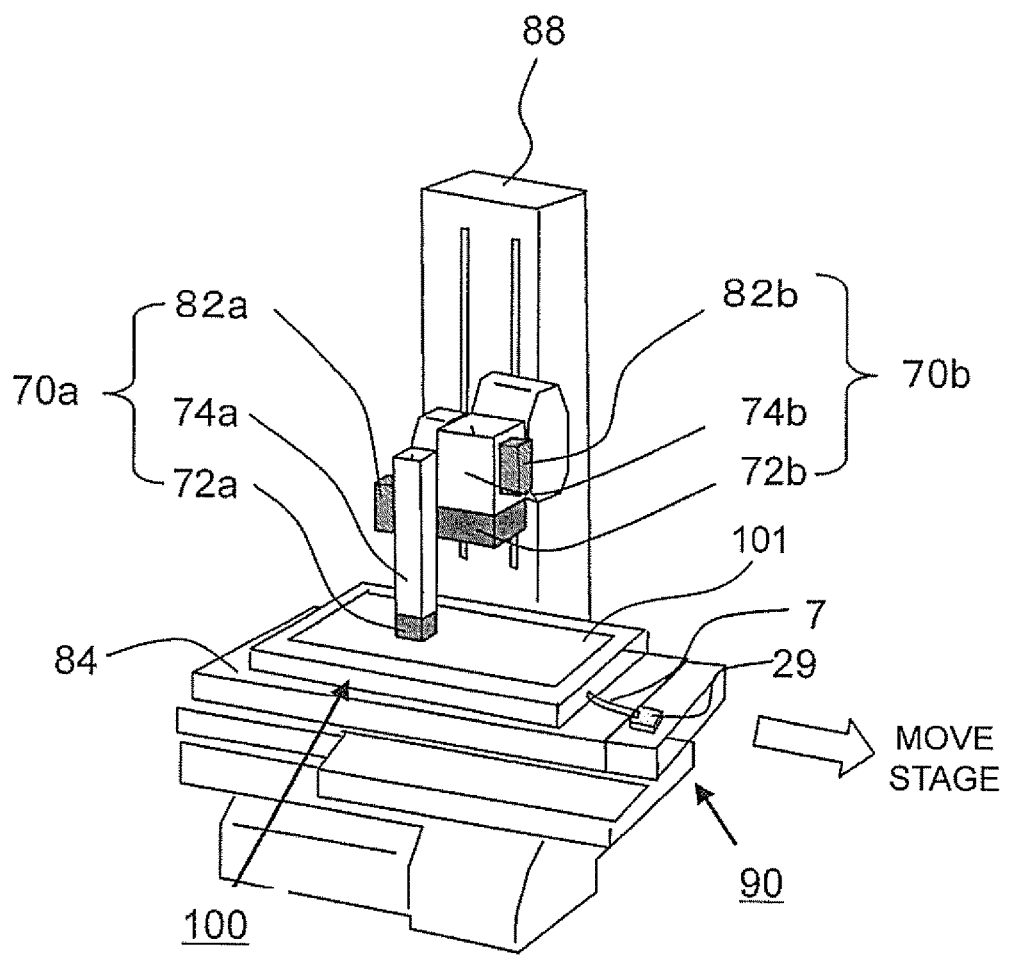
FIG. 31 is a perspective view showing a state where a drag operation is conducted (Xo=0.3) by using the inspection device in EXAMPLE 2.

Then, the stage 84 was moved to set the position coordinate of the indicator 70a as Xc=0.3 (FIG. 31, step 2). Here, the indicator 70a was slid from Xo=0.6 to Xc=0.3 while having the tip part 72a of the indicator 70a in contact with the surface of the touch panel 101. That is, a drag operation was simulated. The third detected position X3 immediately after the drag operation was 0.3, which was consistent with the position coordinate Xc of the indicator 70a.

Figure 32:
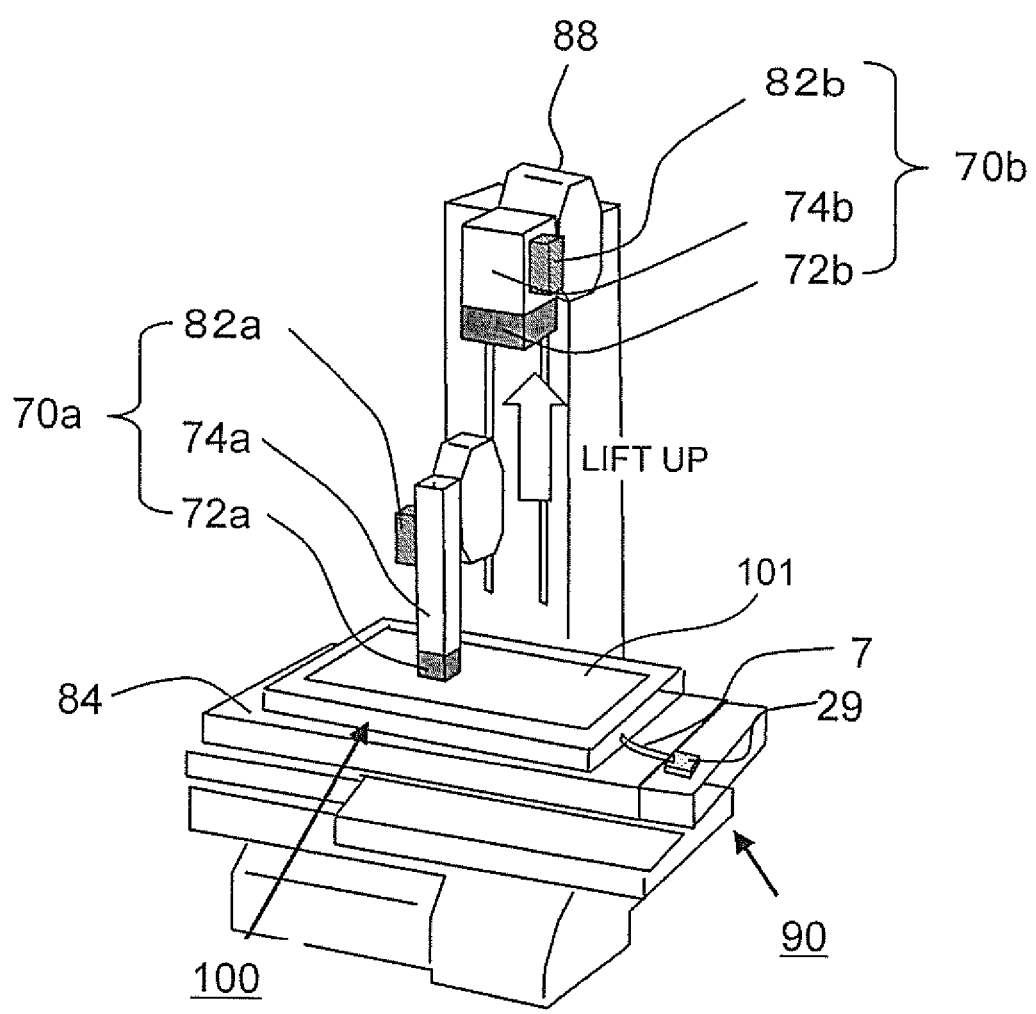
FIG. 32 is a perspective view showing the inspection device at the time of eliminating the influence generated in accordance with the approach of the palm in EXAMPLE 2.

Then, the indicator 70b at the height of Lb=40 mm was brought up to sufficiently move away the indicator 70b from the touch panel 101, while keeping the height of the indicator 70a as La=0 mm (FIG. 32, step 3). At that time, the pointer (the third detected position) was shifted in the X direction for −0.026 to be at 0.274.

Subsequently, the actually measured value of the third detected position and an estimated value acquired next are compared in the state of FIG. 32. First, for each of the algorithms for calculating the detected positions, numerical expressions of the third detected position are derived in the state of FIG. 32. In the state of FIG. 32, the indicator 70b is brought away to eliminate the influence generated due to the approach of the palm. Thus, the third detected position is shifted by $-(\beta*h)/(1+\beta)$ which is a negative number of the position shift $(\beta*h)/(1+(3)$ generated according to the approach of the palm shown in Expression K28.

From Expression K35 calculated by using the algorithm of FIG. 10 and FIG. 11, Xs can be acquired by following Expression K36 provided that the calculated value (the estimated value) of the third detected position is Xs.

$$Xs=Xc-(\beta*h)/(1+\beta) \quad \text{(Expression K36)}$$

When Xc=0.3, h=0.1, and 0=0.34 calculated in FIG. 29 were substituted, the estimated value became Xs=0.274. It was consistent with the actually measured value of the third detected position. That is, the estimated value and the actually measured value were consistent, so that the functions of the FIG. 10 and FIG. 11 were verified.

Further, as the index for quantifying the difference regarding the shift value of the third detected position which is shifted when the second conductor 70b is brought up to be moved away from the touch panel 101, the actually measured value, and the estimated value, used is |(actually measured value−estimated value Xs)/shift value|.

With the algorithms shown of the first exemplary embodiment in FIG. 10 and FIG. 11, acquired was |(actually measured value−estimated value Xs)/shift value|=|(0.274−0.274)/(−0.026)|=0. In the meantime, the position of the pointer (the first detected position) of a case where the algorithms shown in FIG. 10 and FIG. 11 were unapplied was measured. As shown in FIG. 30, when the indicator 70a touched the position Xo=0.6, the first detected position was 0.626. As shown in FIG. 31, when the indicator 70a was dragged to the position Xc=0.3, the first detected position was 0.326. As shown in FIG. 32, when the indicator 70b was brought up to be moved away from the touch panel 101 sufficiently, the first detected position was 0.3 which was not consistent with Xs=0.274 calculated from Expression K36 and the measured value of FIG. 29. Further, the shift value was −0.026. Note here that acquired was |(actually measured value−estimated value)/shift value|=|(0.3−0.274)/(−0.026)|=1.

Then, the position of the pointer (the second detected position) of a case where the algorithms of Patent Document 3 were used was measured. As shown in FIG. 30, when the indicator 70a touched the position Xo=0.6, the second detected position became 0.6. Thus, the both were consistent with each other. As shown in FIG. 31, when the indicator 70a was dragged to the position Xc=0.3, the second detected position was 0.197. As shown in FIG. 32, when the indicator 70b is brought up to be moved away from the touch panel 101 sufficiently, the second detected position was 0.171 and the shift value was −0.026, which was not consistent with Xs=0.274 calculated from Expression K36 and the measured value of FIG. 29. Note here that acquired was |(actually measured value−estimated value Xs)/shift value|=|(0.171−0.274)/(−0.026)|=3.96.

With the algorithm of the first exemplary embodiment shown in FIG. 10 and FIG. 11, |(actually measured value−estimated value Xs)/shift value| was zero, and it was 3.96 with the algorithm for calculating the position depicted in Patent Document 3. It was 1 when those two algorithms were unapplied. In order to discriminate the algorithm of the first exemplary embodiment shown in FIG. 10 and FIG. 11 from other algorithms by using the inspective device 90, it is preferable for the value to be smaller than 0.5 that is the intermediate value of 0 and 1 as shown in a following inequality of K37, considering there is a certain measurement error.

|(Actually Measured Value−Estimated Value $Xs$)/
    Shift Value|<0.5                                    (Expression K37)

As described above, in EXAMPLE 2, the position correction function of the touch sensor device 100 on which the algorithm of the first exemplary embodiment shown in FIG. 10 and FIG. 11 was loaded was verified by using the inspective device 90.

Fourth Exemplary Embodiment

Next, a touch sensor device and an electronic apparatus according to a fourth exemplary embodiment will be described. The first to third exemplary embodiments are described by referring to the surface type capacitive type touch sensor device as a way of example. In the meantime, the fourth exemplary embodiment describes a mode to which the algorithm of the present invention is applied to a projection type capacitive type touch sensor device (referred to as "a projection capacitive type touch sensor device" hereinafter) by referring to FIG. 34 to FIG. 38.

Figure 34:
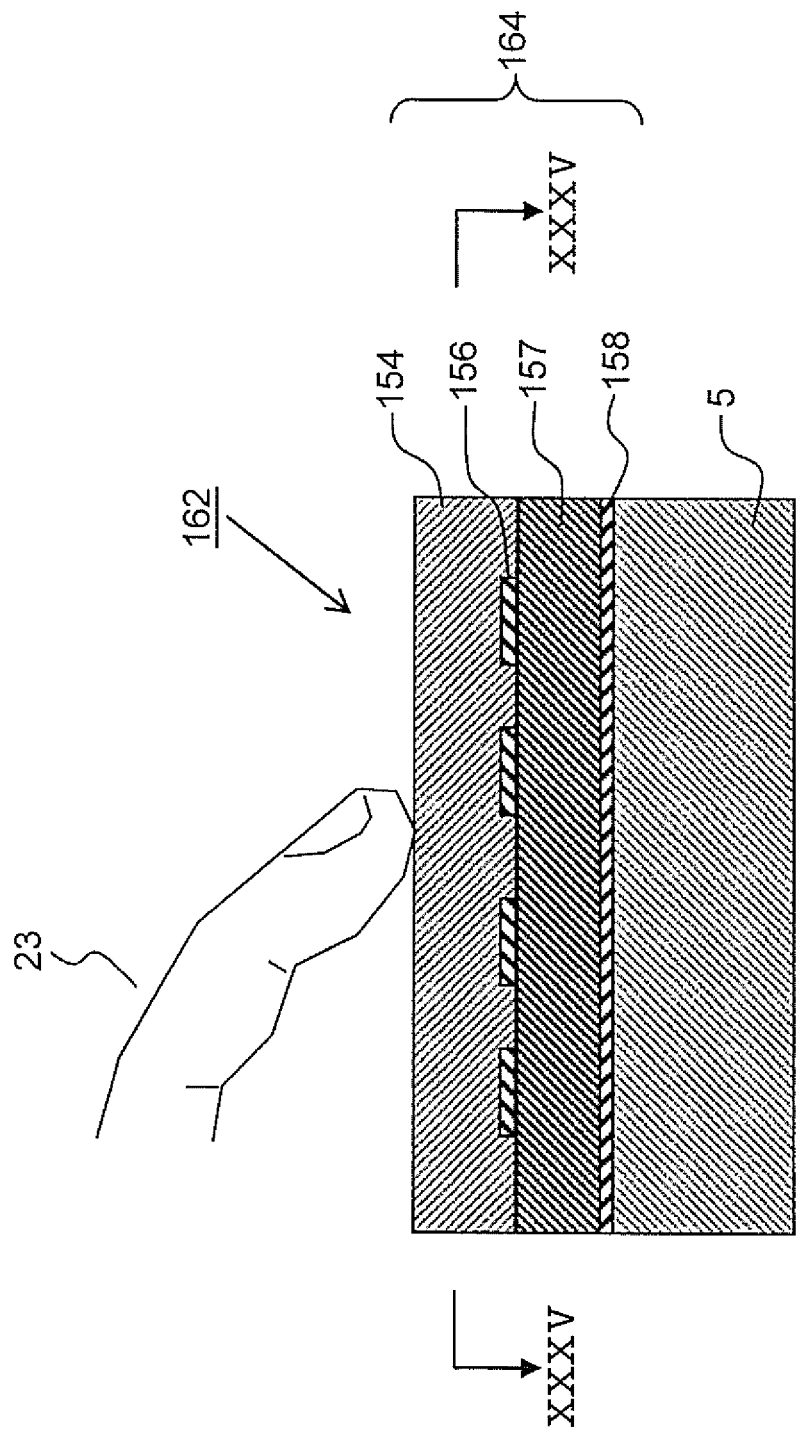
FIG. 34 is a sectional model view showing an LCD provided with a projected capacitive type touch panel taken along a line XXXIV-XXXIV of FIG. 35 according to a fourth exemplary embodiment.
Figure 35:
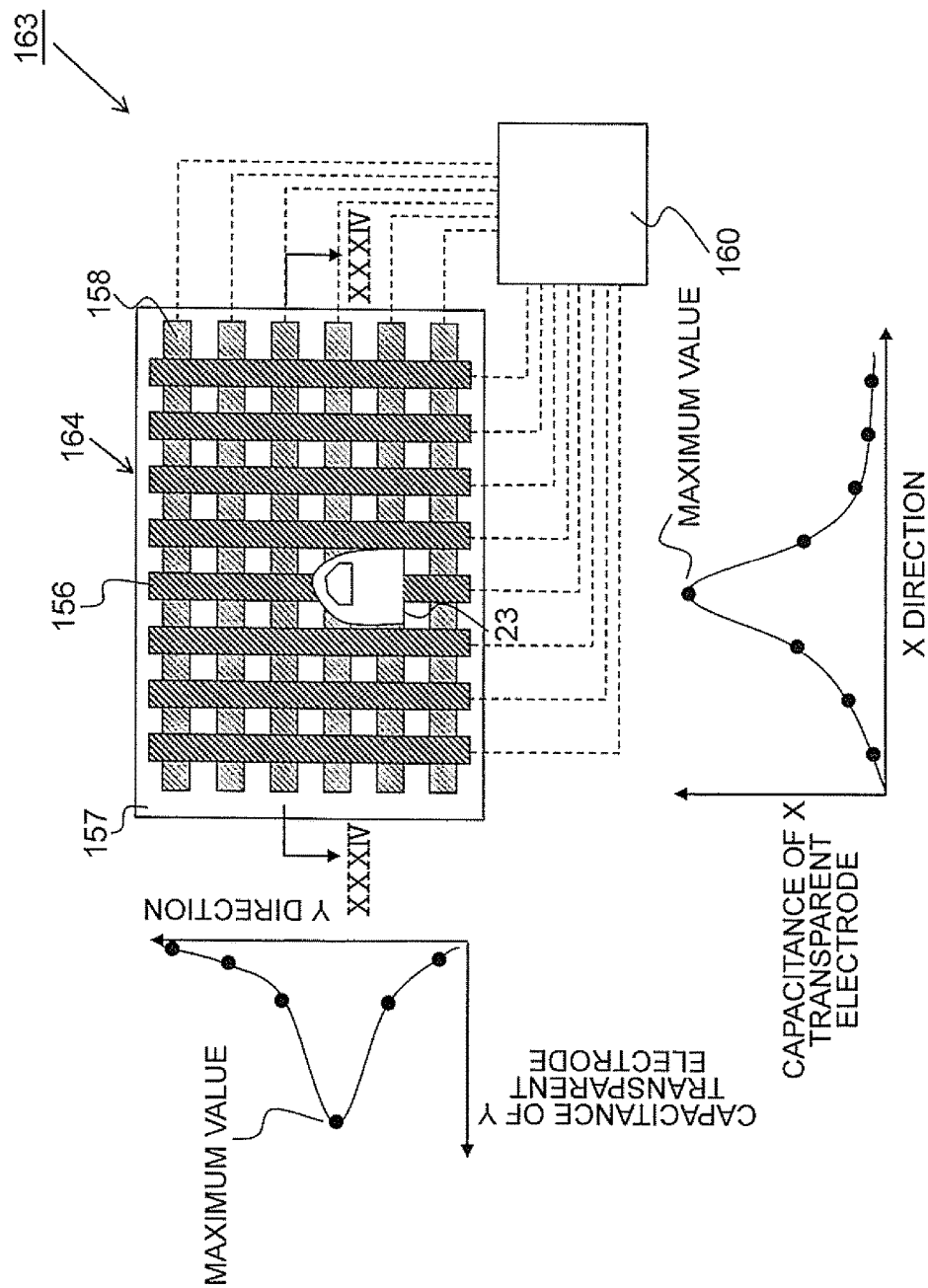
FIG. 35 is a plan model view showing the projected capacitive type touch sensor device in the LCD provided with the projected capacitive type touch sensor device which constitutes an electronic apparatus of the fourth exemplary embodiment.

FIG. 35 is a plan model view which shows a projection capacitive type touch sensor device LCD 162 which constitutes a part of the electronic apparatus according to the fourth exemplary embodiment. FIG. 34 shows a sectional view of the projection capacitive type touch sensor device LCD 162, which is a sectional model view taken along a XXXIV-XXXIV line of FIG. 35.

The film structure of the projection capacitance touch panel according to the fourth exemplary embodiment will be described by referring to the sectional model view of FIG. 34. A transparent conductive film is formed on the top and back sides of a touch panel substrate 157 that is the substrate of the projection capacitance touch panel, and each of the transparent conductive films are patterned to an X transparent electrode 156 and a Y transparent electrodes 158, respectively, to form a projection capacitance touch panel 164. Note here that the touch panel substrate 157 is the supporting substrate for supporting the projection capacitance touch panel 164. Then, a cover glass 154 is laminated to the surface of the X transparent electrode 156, and an LCD 5 is laminated to the surface of the Y transparent electrode 158. An optical adhesive agent is used for the surfaces to be laminated. The touch panel substrate 157 and the cover glass 154 are examples of the insulating substrates, respectively.

Further, as the material for the X transparent electrode 156 and the Y transparent electrode 158, ITO is used, for example. However, those electrodes do not necessarily need to transparent, and copper may be used, for example. Further, the material for the cover glass 154 does not necessarily need to be glass, and acryl may be used, for example.

Next, explanations will be provided by referring to a plan model view (FIG. 35) of the projection capacitive type touch sensor device LCD according to the fourth exemplary embodiment. In FIG. 35, the cover glass 154 and the LCD 5 shown in FIG. 34 are omitted for clearly showing the operation principle of the projection capacitive type touch sensor device. The projection capacitive type touch sensor device of the fourth exemplary embodiment is formed by using the X transparent electrodes 156 and the Y transparent electrodes 158 in a matrix form. When the indicator 23 approaches the X transparent electrode 156 and the Y transparent electrode 158, the capacitance between the X transparent electrode 156 and the Y transparent electrode 158 in the vicinity of the indicator 23 changes. Then, a controller 160 detects the change in the capacitance and detects the position coordinate of the indicator 23. Note here that the controller 160 detects the position coordinate in the X (lateral) coordinate direction by the X transparent electrode 156 and detects the position coordinate in the Y (longitudinal) coordinate direction by the Y transparent electrode 158.

Next, a graph in which the capacitances detected in each of the X transparent electrodes 156 are plotted in the X direction is shown in the bottom center of FIG. 35. A graph is formed also in the Y direction, which is shown on the left of FIG. 35. In both the X transparent electrodes 156 and the Y transparent electrodes 158, the capacitance value becomes the maximum in the transparent electrode closest to the contact point of the indicator 23. However, when the touch coordinate is determined simply based on the coordinate of the transparent electrode whose capacitance value is the maximum, the resolution of the position coordinate becomes the pitch of the transparent electrodes lined in parallel, which may become low. In the meantime, when the touch coordinate is determined based on the capacitances detected in a plurality of transparent electrodes, the resolution of the position coordinate can be increased. For example, the position coordinate can be determined in a more detailed manner by approximating the relations between the coordinates of the plurality of transparent electrodes and the capacitance values, calculating the peak position from an approximation formula, and taking the peak position as the position coordinate.

Here, the X transparent electrodes 156 and the Y transparent electrodes 158 are used as sensor electrodes to detect the capacitance values of the individual transparent electrodes. While the type called a self-capacitive type is described in the projection capacitance touch panel, a mutual capacitive type may be used as well. The mutual capacitive type is a type which applies a voltage by scanning either the X transparent electrodes or the Y transparent electrodes one by one, and detects the current value flown in the other transparent electrodes.

Further, in the plan model view of FIG. 35, shown is a case where the width of the X transparent electrodes 156 or the Y transparent electrodes 158 is constant. However, it is also possible to use a diamond pattern, a jigsaw puzzle pattern, or the like.

Next, FIG. 36 shows explanations regarding the correction of the position coordinate in the projection capacitive type touch sensor device according to the fourth exemplary embodiment. The outline of the correction of the position coordinate in the projection capacitive type touch sensor device will be described by referring to FIG. 36. In FIG. 36, reference numeral 150 is a mouse pointer.

Figure 36B:
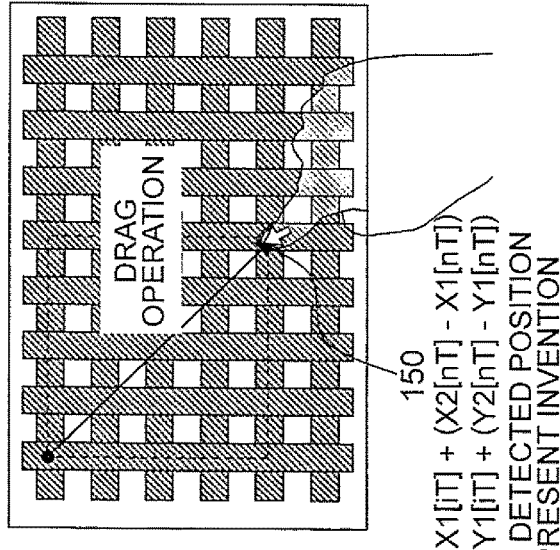
Figure 36A:
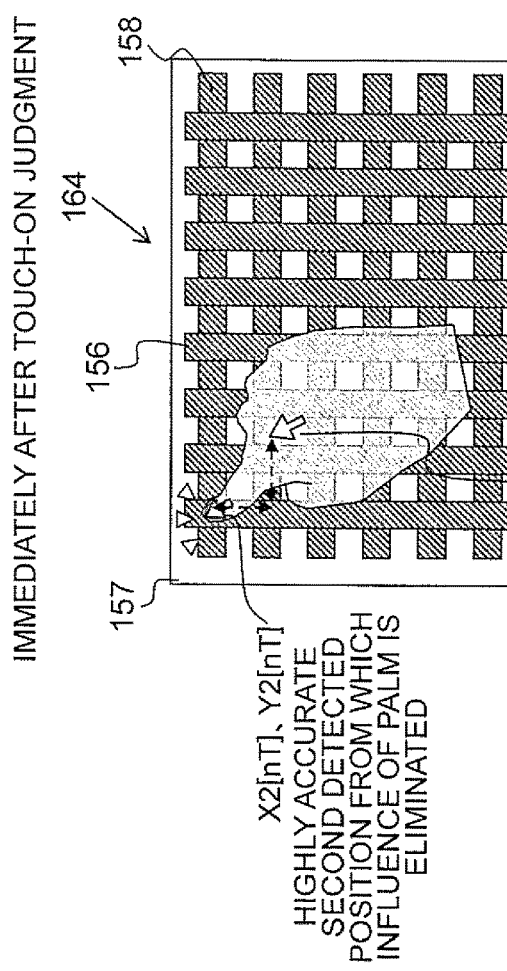

FIG. 36A shows the state immediately after a touch-on judgment. The capacitance detected in the transparent electrode contains a component generated according to the approach of the palm, so that the detected position coordinate is shifted from the actual touch point (the first detected position). Thus, the signal in the state immediately before the touch-on judgment, i.e., the signal under the state where the palm approaches and before the fingertip makes the touch, is subtracted from the measured signal. That subtracted signal is extracted as the signal generated according to the touch of the fingertip, so that the accurate position coordinate can be calculated (the second detected position). At that time, the first detected position (X1[nT], Y1[nT]) and the second detected position (X2[nT], Y2[nT]) immediately after a touch-on judgment are stored to be used for correction of the detected position coordinate from the point where the touch-on is judged to the point where the touch-off is judged. Note here that the index n is the number i of the detection period where the touch is judged. Further, T shows the cycle of the detection period. That is, nT shows the time immediately after the touch-on judgment.

FIG. 36B shows the state from the touch-on judgment to the touch-off judgment. When a drag operation that is an action of the fingertip tracing the surface of the touch panel after a touch, the first detected position (X1[iT], Y1[iT]) calculated by each detection period is calculated once, and the first detected position (X1[nT], Y1[nT]) and the second detected position (X2[nT], Y2[nT]) calculated and stored immediately after the touch-on judgment are used for correcting the detected position. The coordinate corrected in that manner is taken as the third detected position. Note here that the third detected position is (X3[iT]=X1[iT]+(X2[nT]−X1[nT]), (Y3[iT]=Y1[iT]+(Y2[nT]−Y1[nT])).

In FIG. 34 to FIG. 36, the two substrates of the touch panel substrate 157 and the cover glass 154 are used for the projection capacitance touch panel 164. In the meantime, it is also possible to employ a cover-glass unified type in which the touch panel substrate 157 is omitted and the cover glass substrate 154 is used alone. FIG. 38 shows a plan model view of the projection capacitive type touch sensor device LCD using a cover-glass unified projection capacitance touch panel. Further, FIG. 37 is a sectional model view showing an LCD provided with a cover-glass projected capacitive type touch panel taken along a line XXXVII-XXXVII of FIG. 38.

Referring to FIG. 37, on one of the surfaces of the cover glass 154, the X transparent electrode 156, the insulating layer 159, and the Y transparent electrode 158 are stacked in this order in the lower direction of FIG. 37. Note here that the cover glass 154 is the supporting substrate which supports the projection capacitance touch panel 164. As described, the cover-glass unified touch panel has an advantage of making it possible to decrease the thickness of the projection capacitance touch panel LCD 162.

Further, while the projection capacitance touch panel LCD 162 shown in FIG. 34 is an externally-attached structure where the projection capacitance touch panel 164 and the LCD 5 are laminated, it is also possible to employ a built-in type where a transparent conductive layer formed inside the LCD is used for the touch sensor. For example, the counter electrode formed on the top surface of the counter substrate or the back-surface transparent conductive film formed on the back surface of the counter substrate is used for the touch sensor. Alternatively, the transparent conductive layer formed on the thin film transistor substrate is used.

With the fourth exemplary embodiment, it is possible to improve the touch position accuracy through using the algorithm of the present invention for the shift in the detected position coordinate generated according to the approach of the palm caused at the time of a tap operation or a drag operation in the projection capacitive type touch sensor device.

Example 3

In EXAMPLE 3, the effects of the present invention in the first to third exemplary embodiments are described quantitatively through touching the surface of the touch panel of the touch sensor device to which the algorithms used in the first to third exemplary embodiments are loaded and through acquiring the position coordinates detected by the touch sensor device.

(Evaluation Method)

Figure 39:
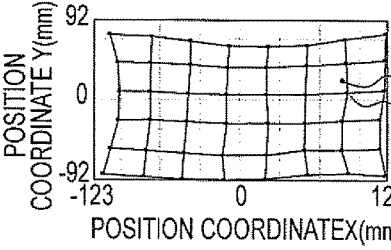
FIG. 39 is a graph (table of lists) showing the position accuracy Pa according to the first exemplary embodiment.

First, a method for evaluating the touch position accuracy will be described. FIG. 39 shows the measurement result of the position accuracy acquired by the touch sensor device according to the first exemplary embodiment. In each row in the longitudinal direction of a list of FIG. 39, the position accuracy of the first exemplary embodiment (the lowermost row), the position accuracy by the touch sensor device to which the technique of Patent Document 3 is loaded (the second row from the bottom), and the position accuracy of a case where the measures for the influence generated by the approach of the palm are loaded (the third row from the bottom) are shown. Further, in each column in the lateral direction of the list of FIG. 39, the position accuracy at the time of a tap operation where a fingertip touches a touch panel and then leaves away from the panel without changing the position of the fingertip (the center column), and the position accuracy at the time of a drag operation where the fingertip touches the touch panel, and changes the position thereof while tracing the surface of the panel (the right column) are shown.

Next, the graphs shown in the list of FIG. 39 will be described. The lateral axis of the graphs shows the x position coordinate, and the longitudinal axis shows the y position coordinate. The point (x position coordinate, y position coordinate)=(0, 0) of the graphs is taken as the center of the display unit. The range of the lateral axis of the graphs is −123 mm to +123 mm, the range of the longitudinal axis is −92 mm to +92 mm, and the range of the graphs corresponds to 12.1-type display unit.

The touch point to be touched is defined as reference coordinate P→[q]=(X[q], Y[q]), which is expressed with a two-dimensional vector having the elements of the x coordinate and the y coordinate. Note here that the index q shows the number of the reference coordinate P→[q], such as 1, 2, - - - , 48. The reference coordinate P→[q] is set at 48 points at regular intervals. In the graph, eight rectangular lattices are illustrated in the lateral direction (the x position coordinate direction) and six rectangular lattices in the longitudinal direction (the y position coordinate direction), i.e., 8 in lateral×6 in longitudinal=48 lattices in total, with dotted lines, and the center of each lattice is defined as the reference coordinate P→[q].

The reference coordinate P→[q] is touched, and the touch sensor device outputs (x[iT], y[iT]) for every detection period. Note here that T is defined as the detection cycle, and i is an integer. Further, (x[iT], y[iT]) shows the final coordinate for determining the coordinate of the pointer, and the first detected position (X1[iT], Y1[iT]) to the third detected position (X3[iT], Y3[iT]) are substituted appropriately.

By setting the detection cycle T=1/60 seconds and the measurement time t=1 second, i.e., by setting the measurement sample number as 60 (=measurement time/detection cycle), (x[(i−59)T], y[(i−59)T]) to (x[iT], y[iT]) are outputted. The average value of the sixty samples is defined as the detected position coordinate p→[q]=(X[q], Y[q]). The coordinate p→[q] is expressed with a two-dimensional vector having the elements of the x coordinate and the y coordinate. The index q corresponds to the reference coordinate P→[q].

The indicator of EXAMPLE 3 was the fingertip of the forefinger of the right hand. For a tap operation, the reference coordinate P→[q] was touched, and the position accuracy Pa was calculated based on following Expression F1.

Position Accuracy $Pa$ (%) = (Expression F1)

$$\left(\sum_{q=1}^{q_{total}} |p \rightarrow [q] - P \rightarrow [q]|\right) / (q_{total} * L_{active} * 100)$$

Note here that the number of the reference coordinate P→[q] was defined as $q_{total}$ (=48). The difference (p→[q]−P→[q]) between the detected position coordinate p→[q] and the reference coordinate P→[q] is the vector showing the position shift, and it is converted to the extent of the vector |p→[q]−P→[q]|. Subsequently, |p→[q]−P→[q]|/$L_{active}$ acquired by dividing it by the diagonal length $L_{active}$ of the active area showing the touchable range shows the position accuracy of each reference coordinate P→[q]. After adding the position accuracies of all the reference coordinates P→[q], the acquired value is divided by $q_{total}$ to be averaged. For expressing it with the unit of "%", it is then divided by 100. The value calculated with Expression F1 is taken as the position accuracy Pa.

For a drag operation, the initial touch coordinate was taken as the center (x position coordinate, y position coordinate)=(0, 0) of the display unit. A drag operation was conducted after the touch to move the fingertip to the reference coordinate P→[q], the finger is set still for one second, and the position accuracy Pa was calculated for each reference coordinate P→[q].

(Evaluation Result)

Next, the evaluation result will be described by referring to the chart.

(Corresponding to First Exemplary Embodiment)

Subsequently, the position accuracies Pa will be compared by referring to FIG. 39. In a case where the method taken as the measure is "no measure for the approach of the palm", the calculation methods for the detected position coordinates p→[q] are the same for the case of a tap operation and the case of a drag operation. Thus, a common graph is shown (the upper section of FIG. 39). The detected position coordinate p→[q] is largely shifted roughly in the bottom right direction with respect to the reference coordinate P→[q]. The reason thereof is because the palm and the arm of the right hand are in the bottom right direction with respect to the fingertip of the forefinger of the right hand, and there is a large influence of the capacitance formed between the palm as well as the arm and the transparent conductive layer. The position accuracy Pa of such case was 3.4%.

Next, the result of a case where the technique of Patent Document 3 was loaded will be referred (the middle section of FIG. 39). The position accuracy Pa at the time of the tap operation was improved to 1.1%. Further, the tendency of shift in the bottom right direction observed in the detected position coordinate p→[q] of the case where "no measure for the approach of the palm" is not observed. However, for the case of the drag operation, the position accuracy Pa is extremely high as 11.6%, which was rather deteriorated compared to the position detection accuracy Pa=3.4% of the case of "no measure for the approach of the palm". That is, with the technique of Patent Document 3, the position accuracy Pa for the drag operation is largely deteriorated, while the position accuracy Pa for the tap operation is improved. Thus, it is considered to be unsuitable for the touch sensor device that uses the drag operation.

Next, the result of a case where the technique of Patent Document 1 was loaded will be referred (the lower section of FIG. 39). The position accuracy Pa at the time of the tap operation was 1.1% and the position accuracy Pa at the time of the drag operation was 1.8%. Thus, the position accuracies Pa are improved both for the cases of the tap operation and the drag operation compared to the results of the case of "no measure for the approach of the palm". Further, with respect to the case of using the technique of Patent Document 3, it is considered that the position accuracy Pa is improved from 11.6% to 1.8% for the drag operation, while maintaining the same position accuracy Pa=1.1% for the tap operation.

(Corresponding to Second Exemplary Embodiment)

Figure 40:
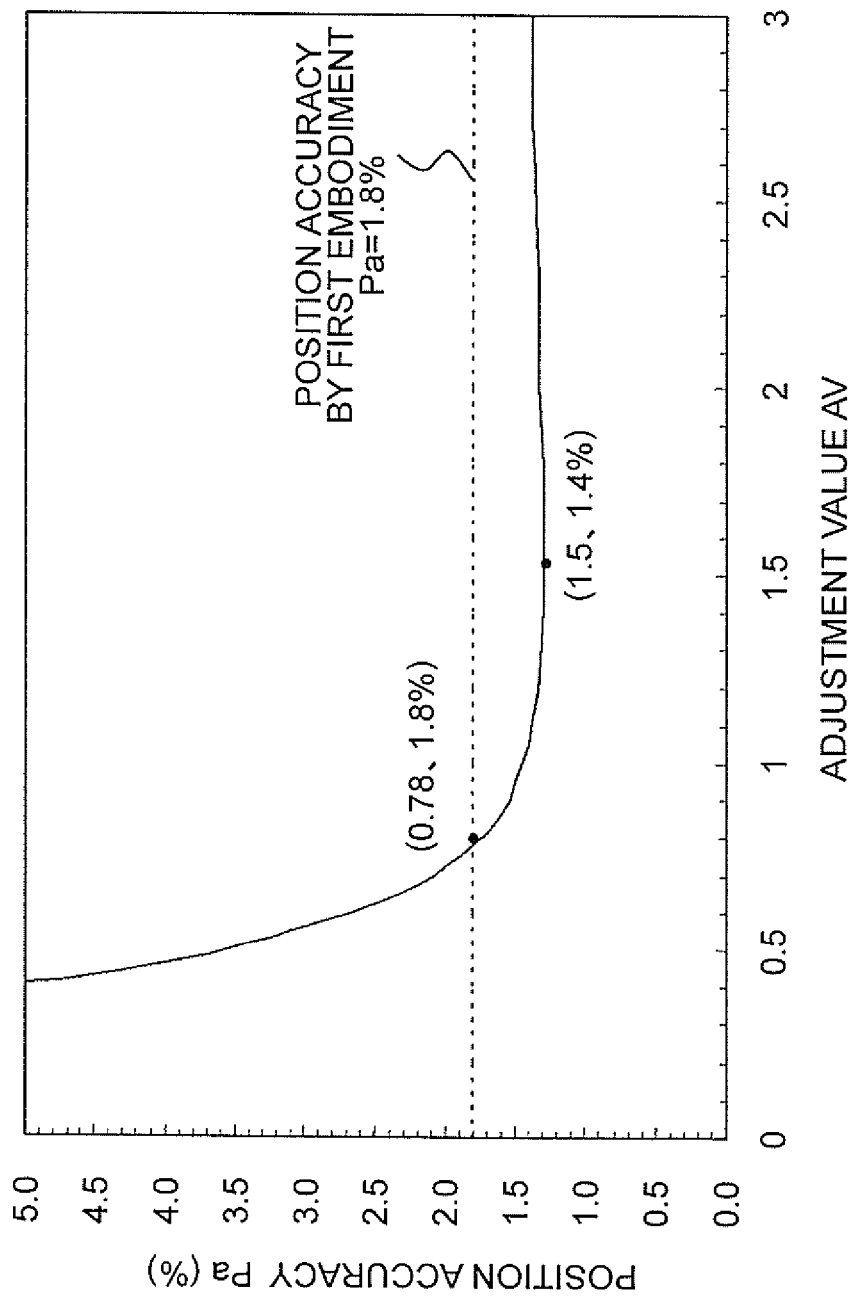
FIG. 40 is a graph showing the relation between the position accuracy Pa and adjustment values AV at the time of conducting drag operations according to the second exemplary embodiment.
Figure 41:
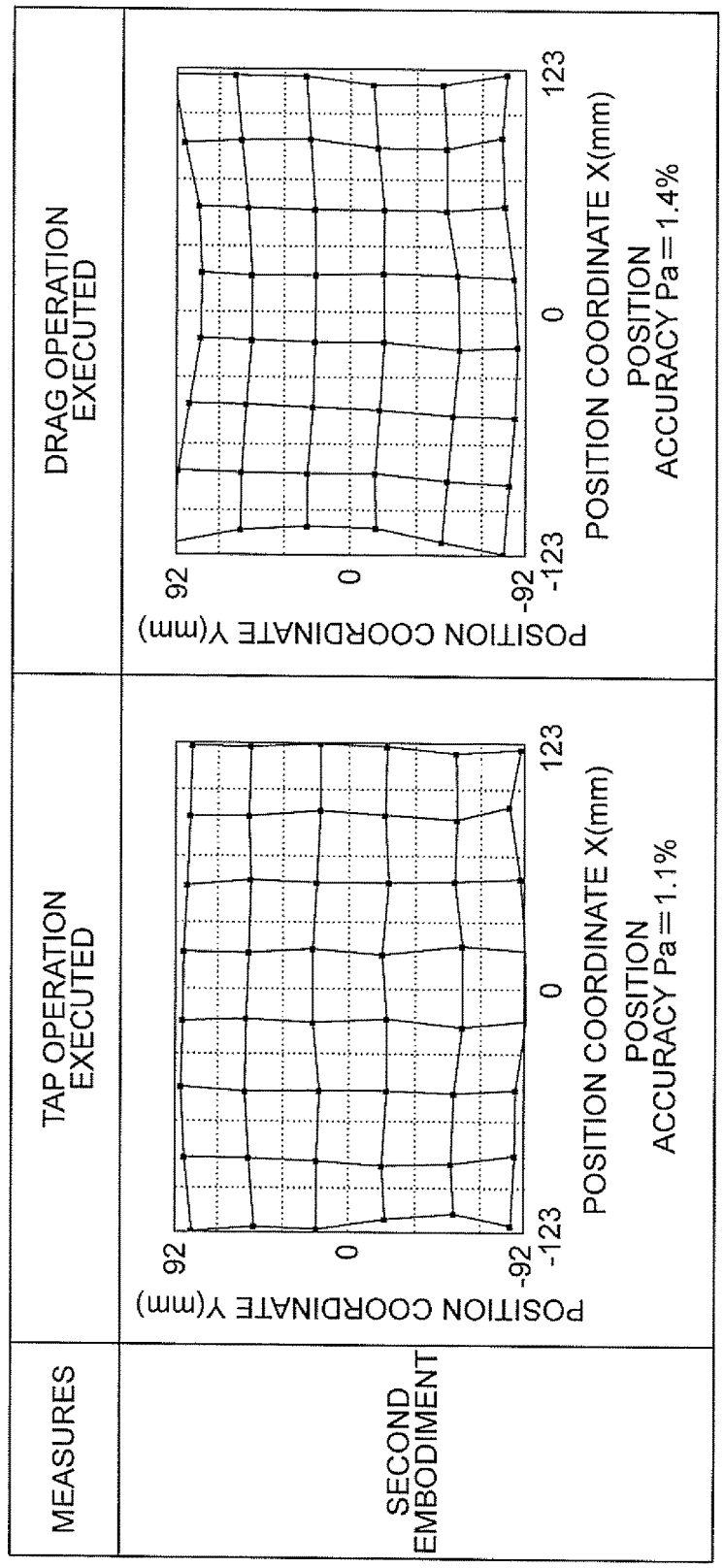
FIG. 41 is a graph (table of lists) showing the position accuracy Pa according to the second exemplary embodiment.

Next, the position accuracy of the touch sensor device to which the algorithm of the second exemplary embodiment is loaded will be described by referring to FIG. 40 and FIG. 41. FIG. 40 shows the relation between the position accuracy Pa and the adjustment value AV of the second exemplary embodiment. FIG. 41 is a list showing the in-panel distribution of the detected position coordinate p→[q] and the position accuracy Pa of the touch sensor device.

The longitudinal axis of the graph of FIG. 40 shows the position accuracy Pa at the time of the drag operation, and the lateral axis shows the adjustment value AV. The adjustment value AV is expressed with Expression F2.

Adjustment value $AV=Xw/Dw$ (Expression F2)

Note here that Xw is the parameter used in X3[iT]=Xw−(Xw−X2[nT])/(Xw−X1[nT])×(Xw−X1[iT]) which is Expression B1 of the second exemplary embodiment. Further, Dw shows the width of the display unit, and it is defined as Dw=264 mm herein.

Further, the adjustment value AV can be also expressed with Expression F3.

Adjustment value $AV=Yw/Dh$ (Expression F3)

Note here that Yw is the parameter used in Y3[iT]=−Yw+(Yw+Y2[nT])/(Yw+Y1[nT])×(Yw+Y1[iT]) which is Expression B3 of the second exemplary embodiment. Further, Dh shows the height of the display unit, and it is defined as Dh=184 mm herein.

For comparison, the position accuracy Pa=1.8% at the time of the drag operation in a case where the algorithm of the first exemplary embodiment in FIG. 39 is equipped with is shown in the graph of FIG. 40 by using a dotted line.

Referring to the graph of FIG. 40, the position accuracy Pa radically drops in the vicinity of the adjustment value AV=0.5, and the position accuracy is better than the position accuracy Pa=1.8% of the first exemplary embodiment in the adjustment value AV≥0.78. Further, the adjustment value AV where the position accuracy Pa takes the minimum value (1.4%) was CV=1.5. The in-panel distribution of the detected position coordinate p→[q] of such case is shown in the graph of FIG. 41. The center column of FIG. 41 shows the case of the tap operation, and the right column shows the case of the drag operation.

(Corresponding to Third Exemplary Embodiment)

Figure 42:
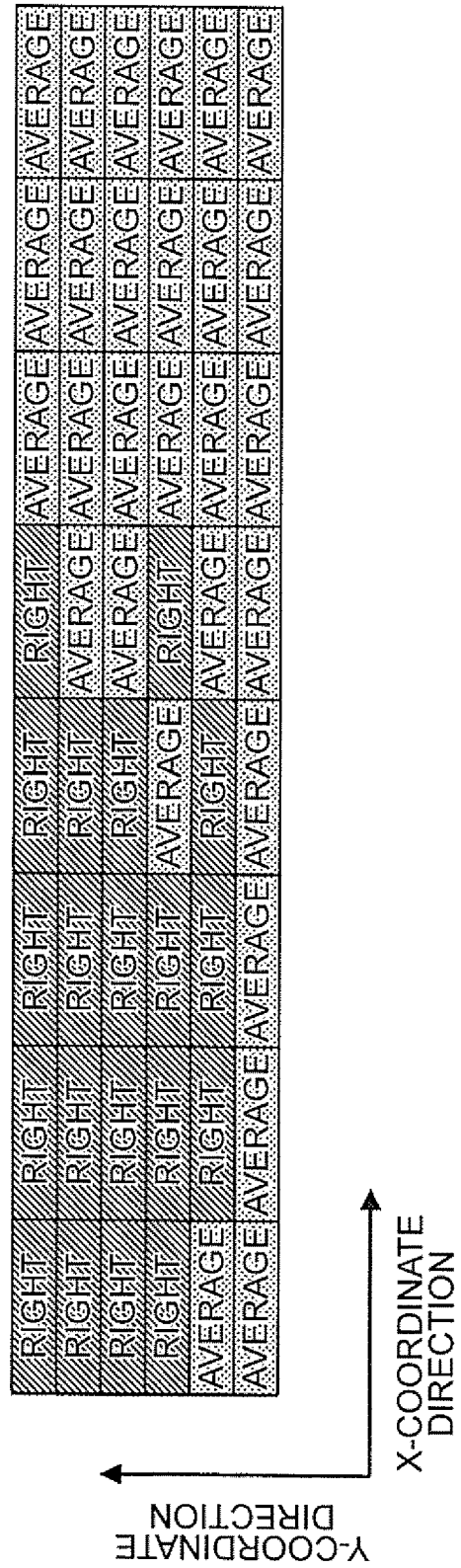
FIG. 42 is a graph showing the result of judgments of the touching hand according to the third exemplary embodiment.
Figure 43:
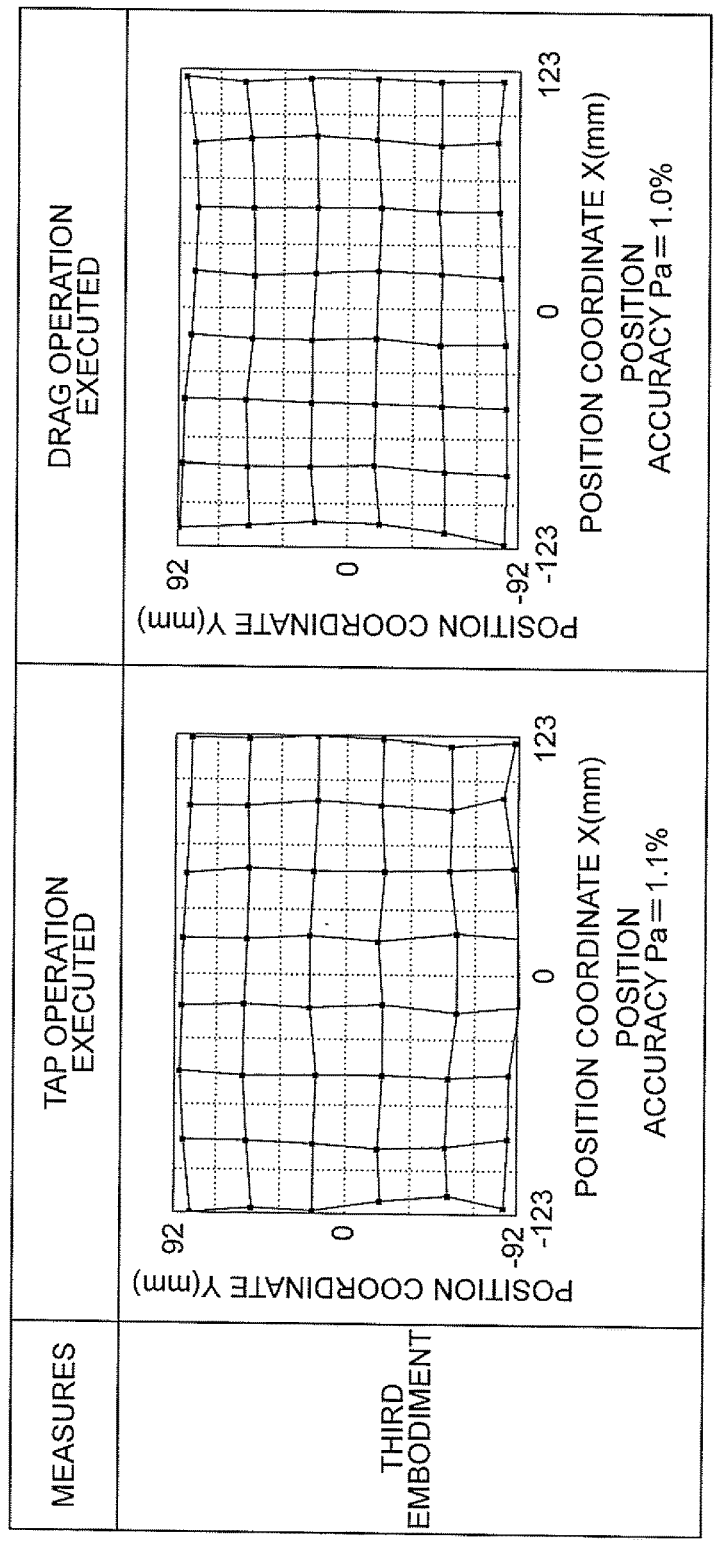
FIG. 43 is a graph (table of lists) showing the position accuracy Pa according to the third exemplary embodiment.

Next, the position accuracy of the touch sensor device to which the algorithm of the third exemplary embodiment is loaded will be described by referring to FIG. 42 and FIG. 43. FIG. 42 shows the judgment result of the touching hand according to the third exemplary embodiment. FIG. 43 is a list showing the in-panel distribution of the detected position coordinate p→[q] and the position accuracy Pa according to the third exemplary embodiment. In this case, the fingertip of the forefinger of the right hand touched the surface of the touch panel.

The in-panel distribution of the judgment result of the touching hand shown in FIG. 42 is referred. There are eight columns in the lateral direction and six columns in the longitudinal direction as the columns to which the judgment result is written. The lateral direction is the X-coordinate direction and the longitudinal direction is the Y coordinate direction, which correspond to the reference coordinate P→[q].

Next, the judging method will be described. As depicted in the third exemplary embodiment, after calculating the first detected position X1[nT] and the second detected position X2[nT] in steps SA16 and SA17 of FIG. 18, the difference between those is acquired as in (X2[nT]−X1[nT]), and then the difference is compared with Xth (steps SC01, SC02) of FIG. 18). It was set in advance as Xth=5 mm (corresponding to Xth/Dw=5 mm/123 mm≈1.9%, comparing to the width Dw of the display unit).

In a case where |X2[nT]−X1[nT]|<Xth is satisfied in step SC01 of FIG. 18, "average" is written in the entry section corresponding to the touched reference coordinate P→[q] shown in FIG. 42. In a case where X2[nT]<X1[nT] is satisfied in step SC02 of FIG. 18, it is judged that the touching hand is the right hand and "right" is written in the entry section corresponding to the touched reference coordinate P→[q]. If not, it is judged that the touching hand is the left hand and "left" is written. Regarding the judgment result, there are twenty points judged as "right" among the forty-eight reference coordinates P→[q], twenty-eight points judged as "average", and 0 point judged as "left". That is, the forefinger of the right hand is the touching hand and there is no judgment of "left" that is the opposite judgment.

Based on the judgment result of the touching hand, the relation between the used signals and the coordinate (constants k1 to k4) were selected automatically and the position coordinates p→[q] were detected in steps SC03 and SC04 of FIG. 18.

The in-panel distribution of the detected position coordinate p→[q] of such case is shown in FIG. 43. The position accuracy Pa of the drag operation (right section) was 1.0%, which was about the same as the position accuracy Pa=1.1% of the tap operation. The reason is because the effect of the correction by the third exemplary embodiment is great even though the position shift at the point where the touching hand is judged as "right" is large.

(Summarization)

The means for overcoming the issues of the present invention can also be expressed as follows. According to the first viewpoint of the present invention, provided is the touch sensor device which includes a touch sensor having a capacitance formed between with an indicator, and a plurality of detection signals acquired successively from the touch sensor by each cycle, wherein: a first detected position influenced by a palm and a second detected position from which the influence of the palm is eliminated are calculated; a correction value is calculated by using the first detected position and the second detected position calculated immediately after a touch-on is judged; the first detected position is calculated successively from a point at which the touch-on is judged to a point at which a touch-off is judged; and a third detected position is calculated by correcting the first detected position calculated successively with the correction value.

According to the second viewpoint of the present invention, provided is a touch sensor device with which a first conductor imitating a fingertip is brought in contact with the surface of the touch sensor device and a second conductor imitating a palm is brought close to the surface of the touch sensor device, wherein: immediately after changing the position by conducting a drag operation of the first conductor on the surface of the touch sensor device, the second conductor is brought up to be isolated from the surface of the touch sensor device sufficiently, and an actually measured value of the detected position at that time is acquired; an estimated value of the third detected position is acquired by using a first capacitance measured by bringing the first conductor to be in contact with the surface of the touch sensor device and a second capacitance measured by bringing the second conductor to be close to the touch sensor device; and the actually measured value is consistent with the estimated value.

According to the third viewpoint of the present invention, provided is an electronic apparatus which includes the touch sensor device according to the first viewpoint.

While the present invention has been described above by referring to each of the exemplary embodiments and EXAMPLES, the present invention is not limited only to each of the exemplary embodiments and EXAMPLES described above. Regarding the structures and details of the present invention, various changes and modifications occurred to those skilled in the art can be applied. Further, the present invention includes the structures acquired by properly and mutually combining a part of or a whole part of the structures of each of the above-described exemplary embodiments and EXAMPLES.

While a part of or a whole part of the exemplary embodiments and EXAMPLES can be summarized as follows, the present invention is not limited only to the following structures.

(Supplementary Note 1)

A touch sensor device which includes:

a touch panel whose impedance changes according to existence of a touch of an indicator having an accompanying part and a touch position of the indicator;

a detection circuit which outputs a detection signal based on the impedance of the touch panel for every specific time;

a touch-on judging unit which judges a touch-on showing that the indicator touched the touch panel based on the detection signal outputted from the detection circuit;

a touch-off judging unit which judges a touch-off showing that the indicator detached from the touch panel based on the detection signal outputted from the detection circuit;

a first position calculating unit which calculates a first detected position that is the touch position influenced by the accompanying part based on the detection signal outputted from the detection circuit;

a second position calculating unit which calculates a second detected position that is the touch position from which the influence of the accompanying part is eliminated based on the detection signal outputted from the detection circuit;

a correction value calculating unit which calculates a correction value for acquiring the touch position from which the influence of the accompanying part is eliminated based on the first and second detected positions calculated by the first and second position calculating units; and a third position calculating unit which calculates a third detected position by correcting the first detected position by using the correction value calculated by the correction value calculating unit while calculating the first detected position based on the detection signal outputted from the detection circuit during a period from a point at which the touch-on is judged by the touch-on judging unit to a point at which the touch-off is judged by the touch-off judging unit.

(Supplementary Note 2)

The touch sensor device as depicted in Supplementary Note 1, wherein
the first and third position calculating units: take the detection signal under a state where the indicator is sufficiently away from the touch panel as a baseline; calculate a first signal acquired by subtracting the baseline from the detection signal after the touch-on is judged by the touch-on judging unit; and calculate the first detected position based on the first signal.

(Supplementary Note 3)

The touch sensor device as depicted in Supplementary Note 1 or 2, wherein
the second position calculating unit: calculates a signal according to approach of the accompanying part based on a change in the detection signal caused due to a gradual increase of a capacitance contained in the impedance immediately before the touch-on is judged by the touch-on judging unit; calculates a second signal by subtracting the signal according to the approach of the accompanying part from the detection signal immediately after the touch-on is judged by the touch-on judging unit; and calculates the second detected position based on the second signal.

(Supplementary Note 4)

The touch sensor device as depicted in any one of Supplementary Notes 1 to 3, wherein
the first and second detected positions used when the correction value calculating unit calculates the correction value are calculated based on the detection signals outputted from the detection circuit at a same timing.

(Supplementary Note 5)

The touch sensor device as depicted in any one of Supplementary Notes 1 to 3, wherein
the first and second detected positions used when the correction value calculating unit calculates the correction value are calculated based on the detection signals outputted from the detection circuit at the same timing to the detection signals outputted in a sixth detection period counted from the same timing.

(Supplementary Note 6)

The touch sensor device as depicted in Supplementary Note 2, wherein
the first detected position used when the correction value calculating unit calculates the correction value is calculated based on an average value of the first signals calculated based on the detection signals outputted from the detection circuit at the same timing to the detection signals outputted in a sixth detection period counted from the same timing.

(Supplementary Note 7)

The touch sensor device as depicted in Supplementary Note 3, wherein
the second detected position used when the correction value calculating unit calculates the correction value is calculated based on an average value of the second signals calculated based on the detection signals outputted from the detection circuit at the same timing to the detection signals outputted in a sixth detection period counted from the same timing.

(Supplementary Note 8)

The touch sensor device as depicted in any one of Supplementary Notes 1 to 7, wherein:
the first and second position calculating units calculate the first detected position ($X1[nT]$, $Y1[nT]$) and the second detected position ($X2[nT]$, $Y2[nT]$) based on the detection signals;
the nT is time immediately after the touch-on is judged;
the correction value calculating unit calculates the correction value ($X2[nT]-X1[nT]$, $Y2[nT]-Y1[nT]$) based on the first detected position ($X1[nT]$, $Y1[nT]$) and the second detected position ($X2[nT]$, $Y2[nT]$);
the third position calculating unit calculates the third detected position ($X3[iT]$, $Y3[iT]$) by following expressions for correcting the first detected position ($X1[iT]$, $Y1[iT]$) by using the correction value ($X2[nT]-X1[nT]$, $Y2[nT]-Y1[nT]$), while calculating the first detected position ($X1[iT]$, $Y1[iT]$) based on an i-th detection signal from a point at which the touch-on is judged by the touch-on judging unit:

$$X3[iT]=X1[iT]+(X2[nT]-X1[nT])$$

$$Y3[iT]=Y1[iT]+(Y2[nT]-Y1[nT]).$$

(Supplementary Note 9) (Second Exemplary Embodiment)

The touch sensor device as depicted in any one of Supplementary Notes 1 to 8, wherein:
the correction value calculating unit adjusts the correction value by using a preset adjustment value which corresponds to the first detected position; and
the third position calculating unit calculates the third detected position by correcting the first detected position calculated by the third position calculating unit by using the adjusted correction value.

(Supplementary Note 10) (Third Exemplary Embodiment)

The touch sensor device as depicted in any one of Supplementary Notes 1 to 9, wherein:
a pair of first constants for a case where the indicator is an ideal indicator which does not include the accompanying part and a plurality of pairs of second constants for a case where the indicator is a human finger are defined in advance;
the first and second position calculating units calculate the first and second detected positions based on the detection signals by using the pair of first constants; and
the third position calculating unit selects a pair of second constants from the plurality of pairs of second constants according to a relation regarding values of the first and second detected positions calculated by the first and second position calculating units, and calculates the first detected position based on the detection signals by using the pair of second constants.

(Supplementary Note 11) (Example 2)

The touch sensor device as depicted in any one of Supplementary Notes 1 to 10, wherein
in a case where: a first conductor imitating a fingertip is used as the indicator, and a second conductor imitating a palm is used as the accompanying part; the first conductor is brought to be in contact with the surface of the touch panel while the second conductor is brought close to the surface of the touch panel, a drag operation of the first conductor is executed on the surface of the touch panel to change the position of the first conductor, and the third detected position calculated in that state is defined as an estimated value; and a change in the third detected position calculated by sufficiently isolating the second conductor from the surface of the touch panel from that state is defined as a shift value, a following inequality applies regarding an actually measure value of the third detected position, the estimated value, and the shift value:

|(Actually Measured Value−Estimated Value)/Shift value|<0.5.

(Supplementary Note 12)

An electronic apparatus which includes the touch sensor device depicted in any one of Supplementary Notes 1 to 11.

(Supplementary Note 13)

A position calculation method used in a touch sensor device which includes a touch panel whose impedance changes according to existence of a touch of an indicator having an accompanying part and a touch position of the indicator, and a detection circuit which outputs a detection signal based on the impedance of the touch panel for every specific time, the method comprising:
  a touch-on judging step which judges a touch-on showing that the indicator touched the touch panel based on the detection signal outputted from the detection circuit;
  a touch-off judging step which judges a touch-off showing that the indicator detached from the touch panel based on the detection signal outputted from the detection circuit;
  a first position calculating step which calculates a first detected position that is the touch position influenced by the accompanying part based on the detection signal outputted from the detection circuit;
  a second position calculating step which calculates a second detected position that is the touch position from which the influence of the accompanying part is eliminated based on the detection signal outputted from the detection circuit;
  a correction value calculating step which calculates a correction value for acquiring the touch position from which the influence of the accompanying part is eliminated based on the first and second detected positions calculated in the first and second position calculating steps immediately after the touch-on is judged in the touch-on judging step; and
  a third position calculating step which calculates a third detected position by correcting the first detected position by using the correction value calculated by the correction value calculating step while calculating the first detected position based on the detection signal outputted from the detection circuit during a period from a point at which the touch-on is judged in the touch-on judging step to a point at which the touch-off is judged in the touch-off judging step.

(Supplementary Note 14)

A position calculation program used in a touch sensor device which includes a touch panel whose impedance changes according to existence of a touch of an indicator having an accompanying part and a touch position of the indicator, a detection circuit which outputs a detection signal based on the impedance of the touch panel for every specific time, and a computer, the program causing the computer to execute:
  a touch-on judging step which judges a touch-on showing that the indicator touched the touch panel based on the detection signal outputted from the detection circuit;
  a touch-off judging step which judges a touch-off showing that the indicator detached from the touch panel based on the detection signal outputted from the detection circuit;
  a first position calculating step which calculates a first detected position that is the touch position influenced by the accompanying part based on the detection signal outputted from the detection circuit;
  a second position calculating step which calculates a second detected position that is the touch position from which the influence of the accompanying part is eliminated based on the detection signal outputted from the detection circuit;
  a correction value calculating step which calculates a correction value for acquiring the touch position from which the influence of the accompanying part is eliminated based on the first and second detected positions calculated in the first and second position calculating steps immediately after the touch-on is judged in the touch-on judging step; and
  a third position calculating step which calculates a third detected position by correcting the first detected position by using the correction value calculated by the correction value calculating step while calculating the first detected position based on the detection signal outputted from the detection circuit during a period from a point at which the touch-on is judged in the touch-on judging step to a point at which the touch-off is judged in the touch-off judging step.

(Supplementary Note 21)

A touch sensor device which includes a touch sensor having a capacitance formed between with an indicator, and a plurality of detection signals acquired successively from the touch sensor by each cycle, wherein:
  a first detected position influenced by a palm and a second detected position from which the influence of the palm is eliminated are calculated;
  a correction value is calculated by using the first detected position and the second detected position calculated immediately after a touch-on is judged;
  the first detected position is calculated successively from a point at which the touch-on is judged to a point at which a touch-off is judged; and
  a third detected position is calculated by correcting the first detected position calculated successively with the correction value.

(Supplementary Note 22)

The touch sensor device as depicted in Supplementary Note 21, wherein:
  the detection signal acquired under a state where the human body is sufficiently away from the touch sensor is taken as a baseline;
  a first signal acquired by subtracting the baseline from the detection signal at the point where the touch-on is judged is calculated; and
  the first detected position is calculated based on the first signal.

(Supplementary Note 23)

The touch sensor device as depicted in Supplementary Note 21, wherein:
  a signal according to approach of the palm is calculated based on the detection signal which gradually increases at the point immediately before the touch-on is judged;
  a second signal acquired by subtracting the signal according to the approach of the palm from the detection signal at the point where the touch-on is judged is calculated; and
  the second detected position is calculated based on the second signal.

(Supplementary Note 24)

The touch sensor device as depicted in Supplementary Note 21, wherein the first detected position and the second detected position are calculated in a same cycle i.

(Supplementary Note 25)

The touch sensor device as depicted in Supplementary Note 24, wherein the first detected position and the second detected position are calculated at a point in a range of cycles from a same cycle i=n−1 to n+6.

(Supplementary Note 26)

The touch sensor device as depicted in Supplementary Note 25, wherein the first detected position or the second detected position is calculated based on an average value of the first signals or the second signal calculated in a range of at a point in a range of cycles i=n−1 to n+6.

(Supplementary Note 27)

The touch sensor device as depicted in Supplementary Note 24, wherein, provided that the third detected position is (X3[iT], Y3[iT]), the third detected position is calculated by using following expressions:

$$X3[iT]=X1[iT]+(X2[nT]-X1[nT])$$

$$Y3[iT]=Y1[iT]+(Y2[nT]-Y1[nT]).$$

Note here that (X1[nT]), Y1[nT]) is the first detected position influenced by the palm calculated immediately after the touch-on is judged, (X2[nT]), Y2[nT]) is the second detected position from which the influence of the palm immediately after the touch-on is judged is eliminated, and (X1[iT]), Y1[iT]) is the first detected position influenced by the palm calculated for each cycle i from the point at which the touch-on is judged to the point at which a touch-off is judged.

(Supplementary Note 28) (Second Exemplary Embodiment)

The touch sensor device as depicted in Supplementary Note 21, wherein:
  the correction value calculated based on the first detected position and the second detected position calculated after the touch-on is judged is adjusted based on the first detected positions calculated successively from the point at which the touch-on is judged to the point at which the touch-off is judged; and the third detected position is calculated by using the adjusted correction value.

(Supplementary Note 29) (Third Exemplary Embodiment)

The touch sensor device as depicted in Supplementary Note 21, which includes a first constant using an ideal indicator and a second constant using a finger, wherein:
  the first detected position and the second detected position are calculated by using the first constant immediately after the touch-on is judged;
  the correction value is calculated based on the first detected position and the second detected position; and
  the third detected position is calculated by using the second constant based on the first detected position from the point at which the touch-on is judged to the point at which the touch-off is judged.

(Supplementary Note 30) (Example 2)

A touch sensor device which includes:
  a first step for bringing a first conductor imitating a fingertip to be in contact with the surface of the touch sensor device and for bringing a second conductor imitating a palm to be close to the surface of the touch sensor simultaneously;
  a second step for conducting a drag operation of the first conductor on the surface of the touch sensor device to change the position;
  a third step for bringing up the second conductor to be isolated from the surface of the touch sensor device sufficiently; and
  a fourth step for acquiring an estimate value of a third detected position after the first step to the third step are executed in this order by using a first capacitance measured by bringing the first conductor to be in contact with the surface of the touch sensor and a second capacitance measured by bringing the second conductor to be close to the touch sensor device, wherein
  an actually measured value as the detected position is acquired after executing the first step to the third step in this order, a shift value of the actually measure value that takes the position coordinate of the first conductor as the reference is calculated, a difference value between the actually measure value and the estimated value is calculated, and a following inequality is satisfied:

|(Actually Measured Value−Estimated Value)/Shift value|<0.5.

(Supplementary Note 31)

An electronic apparatus which includes the touch sensor device depicted in any one of Supplementary Notes 21 to 30.

INDUSTRIAL APPLICABILITY

The present invention can be used for a surface display device which detects a position coordinate indicated by an indicator on the display surface or a surface display device which detects presence of a pointing action. Further, examples of utilizing the present invention may be touch sensor functions used in game machines, mobile information terminals, PDAs, car navigation systems, notebook personal computers, portable DVD players, television game machines attached to passenger seats of airplanes and buses, and factory automation (FA) apparatuses.

What is claimed is:
1. A touch sensor device, comprising:
  a touch panel whose impedance changes according to existence of a touch of an indicator comprising an accompanying part and a touch position of the indicator; and
  at least one hardware processor configured to implement:
    a detection circuit which outputs a detection signal based on the impedance of the touch panel for a plurality of specific times;
    a touch-on judging unit which judges a touch-on showing that the indicator touched the touch panel based on the detection signal output from the detection circuit;
    a touch-off judging unit which judges a touch-off showing that the indicator detached from the touch panel based on the detection signal output from the detection circuit;
    a first position calculating unit which calculates a first detected position that is the touch position influenced by the accompanying part based on the detection signal output from the detection circuit;
    a second position calculating unit which calculates a second detected position that is the touch position from which influence of the accompanying part is eliminated based on the detection signal output from the detection circuit;
    a correction value calculating unit which calculates a correction value for acquiring the touch position from which the influence of the accompanying part is eliminated based on a difference between the first and second detected positions calculated by the first and second position calculating units; and a third position calculating unit which calculates a third detected position by correcting the first detected position by using the correction value calculated by the correction value calculating unit while calculating the first detected position based on the detection signal output from the detection circuit during a period from a point at which the touch-on is judged by the touch-on judging unit to a point at which the touch-off is judged by the touch-off judging unit, during which period the indicator is slid, after the touch-on, while making a contact with the touch panel, wherein the first and second detected positions used when the correction value calculating unit calculates the correction value are calculated based on the detection signal output from the detection circuit at a same timing immediately after the touch-on is judged.

2. The touch sensor device as claimed in claim 1, wherein the first and third position calculating units further:

take the detection signal under a state where the indicator is sufficiently away from the touch panel as a baseline;

calculate a first signal acquired by subtracting the baseline from the detection signal after the touch-on is judged by the touch-on judging unit; and calculate the first detected position based on the first signal.

3. The touch sensor device as claimed in claim 2, wherein the first detected position used when the correction value calculating unit calculates the correction value based on an average value of first signals calculated through averaging the detection signal output from the detection circuit, from a first detection period to a fifth detection period of touch-on determination.

4. The touch sensor device as claimed in claim 1, wherein the second position calculating unit further:

calculates a signal according to an approach of the accompanying part based on a change in the detection signal caused due to a gradual increase of a capacitance contained in the impedance immediately before the touch-on is judged by the touch-on judging unit;

calculates a second signal by subtracting the signal according to the approach of the accompanying part from the detection signal immediately after the touch-on is judged by the touch-on judging unit; and calculates the second detected position based on the second signal.

5. The touch sensor device as claimed in claim 4, wherein the second detected position used when the correction value calculating unit calculates the correction value based on an average value of second signals calculated through averaging the detection signal output from the detection circuit, from a first detection period to a fifth detection period of touch-on determination.

6. The touch sensor device as claimed in claim 1, wherein the first and second detected positions used when the correction value calculating unit calculates the correction value through averaging the detection signal output from the detection circuit, from a first detection period to a fifth detection period of touch-on determination.

7. The touch sensor device as claimed in claim 1, wherein:
the first and second position calculating units calculate the first detected position (X1[nT], Y1[nT]) and the second detected position (X2[nT], Y2[nT]) based on the detection signal output from the detection circuit;

the nT is a time immediately after the touch-on is judged;

the correction value calculating unit calculates the correction value (X2[nT] X1[nT], Y2[nT]−Y1[nT]) based on the first detected position (X1[nT], Y1[nT]) and the second detected position (X2[nT], Y2[nT]);

the third position calculating unit calculates the third detected position (X3[iT], Y3[iT]) by following expressions for correcting the first detected position (X1[iT], Y1[iT]) by using the correction value (X2[nT]−X1[nT], Y2[nT]−Y1[nT]), while calculating the first detected position (X1[iT], Y1[iT]) based on an i-th detection signal from a point at which the touch-on is judged by the touch-on judging unit:

$$X3[iT]=X1[iT]+(X2[nT]-X1[nT])$$

$$Y3[iT]=Y1[iT]+(Y2[nT]-Y1[nT]).$$

8. The touch sensor device as claimed in claim 1, wherein:
the correction value calculating unit adjusts the correction value by using a preset adjustment value (AV) which corresponds to the first detected position; and the third position calculating unit calculates the third detected position by correcting the first detected position calculated by the third position calculating unit by using an adjusted correction value.

9. The touch sensor device as claimed in claim 8, wherein the AV satisfies AV≥0.78.

10. The touch sensor device as claimed in claim 1, wherein the touch panel comprises:
an impedance surface on which the impedance changes;
a plurality of electrodes formed in an outer periphery of the impedance surface; and
a detection circuit which detects a current flown in the electrodes.

11. The touch sensor device as claimed in claim 1, wherein the touch panel comprises:
a supporting substrate;
a plurality of X electrodes extended in a first direction and a plurality of Y electrodes extended in a second direction, which are arranged on the supporting substrate; and
intersections where the X electrodes and the Y electrodes intersect with each other via an insulator.

12. The touch sensor device as claimed in claim 1, wherein the touch sensor device is included in an electronic apparatus comprising at least one component other than the touch sensor.

13. The touch sensor device as claimed in claim 1, wherein the correction value calculating unit calculates the difference between the first and second detected positions calculated by the first and second position calculating units after the touch on judging unit judges the touch-on, and calculates the correction value based on the difference which is calculated.

14. A position calculation method used in a touch sensor device which comprises a touch panel whose impedance changes according to existence of a touch of an indicator having an accompanying part and a touch position of the indicator, and a detection circuit which outputs a detection signal based on the impedance of the touch panel for a plurality of specific times, the method comprising:

a touch-on judging step which judges a touch-on showing that the indicator touched the touch panel based on the detection signal output from the detection circuit;

a touch-off judging step which judges a touch-off showing that the indicator detached from the touch panel based on the detection signal output from the detection circuit;

a first position calculating step which calculates a first detected position that is the touch position influenced by the accompanying part based on the detection signal output from the detection circuit;

a second position calculating step which calculates a second detected position that is the touch position from which an influence of the accompanying part is eliminated based on the detection signal output from the detection circuit;

a correction value calculating step which calculates a correction value for acquiring the touch position from which the influence of the accompanying part is eliminated based on a difference between the first and second detected positions calculated in the first and second position calculating steps immediately after the touch-on is judged in the touch-on judging step;

a third position calculating step which calculates a third detected position by correcting the first detected position by using the correction value calculated by the correction value calculating step while calculating the first detected position based on the detection signal output from the detection circuit during a period from a point at which the touch-on is judged in the touch-on judging step to a point at which the touch-off is judged in the touch-off judging step, during which period the indicator is slide, after the touch-on, while making a contact with the touch panel, wherein the first and second detected positions used when the correction value calculating unit calculates the correction value are calculated based on the detection signal output from the detection circuit at a same timing immediately after the touch-on is judged.

15. A non-transitory computer readable recording medium storing a position calculation program used in a touch sensor device which comprises a touch panel whose impedance changes according to existence of a touch of an indicator having an accompanying part and a touch position of the indicator, a detection circuit which outputs a detection signal based on the impedance of the touch panel for a plurality of specific times, and a computer, the program causing the computer to execute:

a touch-on judging step which judges a touch-on showing that the indicator touched the touch panel based on the detection signal output from the detection circuit;

a touch-off judging step which judges a touch-off showing that the indicator detached from the touch panel based on the detection signal output from the detection circuit;

a first position calculating step which calculates a first detected position that is the touch position influenced by the accompanying part based on the detection signal output from the detection circuit;

a second position calculating step which calculates a second detected position that is the touch position from which an influence of the accompanying part is eliminated based on the detection signal output from the detection circuit;

a correction value calculating step which calculates a correction value for acquiring the touch position from which the influence of the accompanying part is eliminated based on a difference between the first and second detected positions calculated in the first and second position calculating steps immediately after the touch-on is judged in the touch-on judging step, during which period the indicator is slide, after the touch-on, while making a contact with the touch panel; and a third position calculating step which calculates a third detected position by correcting the first detected position by using the correction value calculated by the correction value calculating step while calculating the first detected position based on the detection signal output from the detection circuit during a period from a point at which the touch-on is judged in the touch-on judging step to a point at which the touch-off is judged in the touch-off judging step, wherein the first and second detected positions used when the correction value calculating unit calculates the correction value are calculated based on the detection signal output from the detection circuit at a same timing immediately after the touch-on is judged.

* * * * *